United States Patent

Odle et al.

(10) Patent No.: US 10,429,173 B2
(45) Date of Patent: Oct. 1, 2019

(54) DETERMINING MOVING PROPERTIES OF A TARGET IN AN EXTREME ULTRAVIOLET LIGHT SOURCE

(71) Applicant: ASML Netherlands B.V., Veldhoven (NL)

(72) Inventors: Jesse Quinn Odle, San Diego, CA (US); Vahan Senekerimyan, Kirkland, WA (US); Cèsar Fernandez-Espasa, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/322,002

(22) PCT Filed: Sep. 7, 2017

(86) PCT No.: PCT/US2017/050559
§ 371 (c)(1),
(2) Date: Jan. 30, 2019

(87) PCT Pub. No.: WO2018/052799
PCT Pub. Date: Mar. 22, 2018

(65) Prior Publication Data
US 2019/0186892 A1 Jun. 20, 2019

Related U.S. Application Data

(63) Continuation of application No. 15/265,376, filed on Sep. 14, 2016, now Pat. No. 9,778,022.

(51) Int. Cl.
*G01B 11/00* (2006.01)
*G01P 13/00* (2006.01)
*G01P 3/68* (2006.01)

(52) U.S. Cl.
CPC ............. *G01B 11/002* (2013.01); *G01P 3/68* (2013.01); *G01P 13/00* (2013.01)

(58) Field of Classification Search
CPC .......... G01B 11/002; G01P 3/68; G01P 13/00
See application file for complete search history.

(56) References Cited

U.S. PATENT DOCUMENTS 8,872,144 B1 10/2014 Fomenkov
8,957,356 B2 2/2015 Moriya et al.
(Continued)

FOREIGN PATENT DOCUMENTS

WO 2013174620 A1 11/2013

OTHER PUBLICATIONS

Shane Thomas, U.S. International Searching Authority, International Search Report and Written Opinion, counterpart PCT Application No. PCT/US2017/050559, dated Nov. 8, 2017, 10 pages total.

*Primary Examiner* — Mark R Gaworecki
(74) *Attorney, Agent, or Firm* — DiBerardino McGovern IP Group LLC

(57) ABSTRACT

A method is described for measuring a moving property of a current target as it travels along a trajectory toward a target space. The method includes: detecting a plurality of two-dimensional representations of light that are produced due to an interaction between the current target and each of a plurality of diagnostic probes prior to the current target entering the target space; determining one or more moving properties of the current target based on an analysis of the detected plurality of two-dimensional representations of light, the determining being completed prior to the current target entering the target space; and, if the determined one or more moving properties of the current target are outside an (Continued)

acceptable range, adjusting one or more characteristics of a radiation pulse directed to the target space.

23 Claims, 25 Drawing Sheets

(56) References Cited

U.S. PATENT DOCUMENTS

| | | |
|---|---|---|
| 9,778,022 B1 | 10/2017 | Odle et al. |
| 10,149,375 B2 | 12/2018 | Price et al. |
| 2004/0262545 A1 | 12/2004 | Hartlove et al. |
| 2005/0199829 A1 | 9/2005 | Partlo et al. |
| 2013/0043401 A1 | 2/2013 | Graham et al. |
| 2014/0246607 A1 | 9/2014 | Bykanov et al. |
| 2015/0083936 A1 | 3/2015 | Wehrens |
| 2015/0179401 A1 | 6/2015 | Gambino et al. |
| 2015/0189728 A1 | 7/2015 | Tao et al. |
| 2015/0250045 A1 | 9/2015 | Tao et al. |
| 2015/0342016 A1 | 11/2015 | Rafac et al. |
| 2016/0192468 A1 | 6/2016 | Rafac et al. |
| 2016/0234920 A1 | 8/2016 | Suzuki et al. |
| 2016/0255708 A1 | 9/2016 | Tao et al. |
| 2017/0048957 A1 | 2/2017 | Riggs et al. |
| 2017/0048958 A1 | 2/2017 | Riggs et al. |

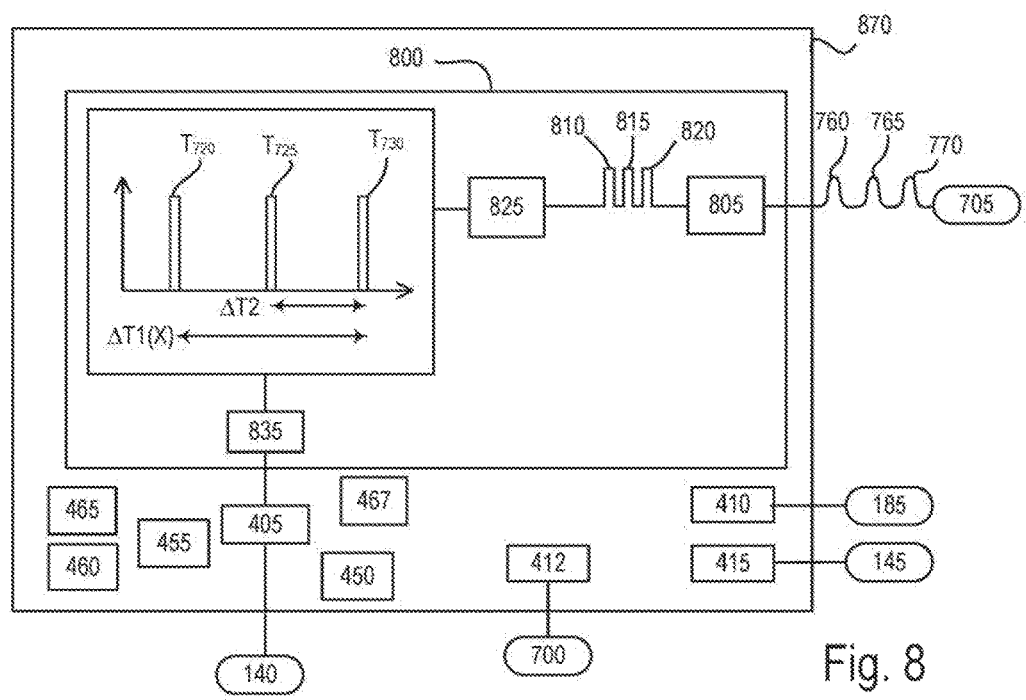
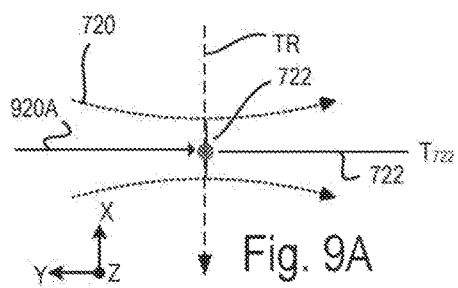
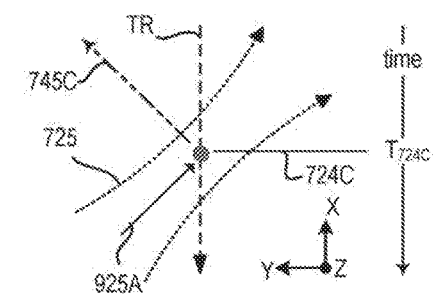
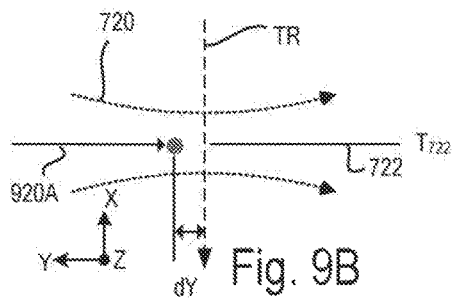
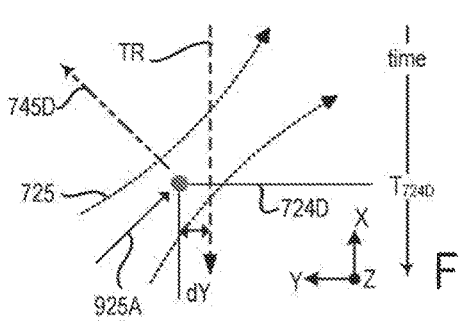

DETERMINING MOVING PROPERTIES OF A TARGET IN AN EXTREME ULTRAVIOLET LIGHT SOURCE

CROSS REFERENCE TO RELATED APPLICATION

This application claims the benefit of U.S. application Ser. No. 15/265,376 which was filed on Sep. 14, 2016 and which is incorporated herein in its entirety by reference.

TECHNICAL FIELD

The disclosed subject matter relates to a system and method for measuring aspects of a target along its trajectory in a laser produced plasma extreme ultraviolet light source.

BACKGROUND

Extreme ultraviolet (EUV) light, for example, electromagnetic radiation having wavelengths around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In some general aspects, a method is performed for measuring a moving property of a current target as it travels along a trajectory toward a target space. The method includes: detecting a plurality of two-dimensional representations of light that are produced due to an interaction between the current target and each of a plurality of diagnostic probes prior to the current target entering the target space; determining one or more moving properties of the current target based on an analysis of the detected plurality of two-dimensional representations of light, the determining being completed prior to the current target entering the target space, and, if the determined one or more moving properties of the current target are outside an acceptable range, adjusting one or more characteristics of a radiation pulse directed to the target space.

Implementations can include one or more of the following features. For example, the method can also include interacting the radiation pulse with a present target in the target space, wherein the present target is either the current target that has entered the target space or another target that has entered the target space, and wherein the other target enters the target space at a time that follows the time when the current target enters the target space. The other target can be adjacent to the current target along the trajectory. The other target can be adjacent to an intermediate target that is between the other target and the current target along the trajectory.

The radiation pulse can convert at least part of the present target into plasma that emits extreme ultraviolet light when the radiation pulse interacts with the present target. The radiation pulse can deliver energy to the present target to modify a geometric distribution of the present target.

The method can include releasing the current target along the trajectory toward the target space, which is defined within a laser-produced plasma extreme ultraviolet light source.

The two-dimensional representation of the light that is detected can be a two-dimensional image of the light.

The method can include directing at least one diagnostic probe toward the current target along a plane defined by a first direction perpendicular to an axial direction and the axial direction, wherein the current target travels along a direction that has a component along the axial direction. The radiation pulse can be directed toward the target space along a second direction perpendicular to the axial direction and to the first direction.

The method can also include directing the diagnostic probes toward to the current target so that each diagnostic probe interacts with the current target at a distinct diagnostic location prior to the current target entering the target space.

Each diagnostic probe can be a diagnostic light beam. The light that is produced due to the interaction between the current target and each diagnostic probe can include the diagnostic light beam scattering off a surface of the current target. The light that is produced due to the interaction between the current target and the diagnostic probe can include a shadow of the current target obscuring at least a portion of the diagnostic light beam.

The one or more moving properties of the current target can be determined by determining one or more of a position, a velocity, and an acceleration of the current target. The one or more moving properties of the current target can be determined by determining one or more moving properties of the current target along each dimension of a three dimensional coordinate system. The one or more characteristics of the radiation pulse can be adjusted by adjusting one or more of a timing of a release of a radiation pulse and a direction at which the radiation pulse travels.

The method can include detecting a plurality of one-dimensional values of the light that are produced due to the interaction between the current target and each diagnostic probe prior to the current target entering the target space.

The current target can interact with the plurality of diagnostic probes after a prior and adjacent target has interacted with a prior radiation pulse in the target space. The current target can interact with the plurality of diagnostic probes while the current target is being influenced at least in part by plasma pushback forces.

The method can include analyzing the detected plurality of two-dimensional representations of light, the analyzing including: identifying one or more regions of interest within each representation, each region of interest corresponding to a location of the current target along the trajectory; for each region of interest, determining a central area of the region of interest; a deriving a position of the current target in three dimensions based on the determined central areas.

In other general aspects, a method is performed for measuring one or more moving properties of each target in a plurality of targets as each target travels along its trajectory toward a target space. The method includes: prior to each target of the plurality reaching the target space, and after a prior and adjacent target has entered the target space, interacting a plurality of diagnostic probes with each target of the plurality of targets at diagnostic locations along that target's trajectory. For each target in the plurality of targets: a plurality of two-dimensional representations of light produced due to the interactions between that target and the diagnostic probes are detected; the detected two-dimensional representations are analyzed; one or more moving properties of that target are determined along each dimension of a three dimensional coordinated system based on the analysis of the detected two-dimensional representations; and it is determined whether one or more characteristics of a radiation pulse directed to the target space need to be adjusted based on the determined one or more moving properties.

Implementations can include one or more of the following features. For example, the method can include, for each target in the plurality of targets: detecting a time associated with each interaction between that target and a diagnostic probe; analyzing the detected times; and determining one or more moving properties of the target along at least one of the dimensions of the three dimensional coordinate system based on the analysis of the detected times.

The one or more moving properties of a target can be determined by determining one or more of a position, a velocity, and an acceleration of the target.

The two-dimension representation of the light can be detected by detecting a two-dimensional image of the light. The detected two-dimensional image can be analyzed by identifying one or more regions of interest within the image and calculating a centroid for each identified region of interest.

Determining whether one or more characteristics of the radiation pulse need to be adjusted can include determining that one or more characteristics of the radiation pulse need to be adjusted if the determined one or more moving properties of the target are outside an acceptable range. The one or more characteristics of the radiation pulse can be adjusted by adjusting one or more of a timing of a release of the radiation pulse and a direction at which the radiation pulse travels.

The two-dimensional representations of light can be detected prior to the target entering the target space. The detected two-dimensional representations can be analyzed prior to the target entering the target space. And, the one or more moving properties of the target can be determined prior to the target entering the target space.

The target can interact with the plurality of diagnostic probes while the target is being influence at least in part by plasma pushback forces.

In other general aspects, an apparatus includes: a target delivery system configured to release a target toward a target space, the target including a material that emits extreme ultraviolet (EUV) light when converted to plasma; a chamber that defines the target space and region between the target delivery system and the target space, the target space positioned to receive a plurality of radiation pulses, each radiation pulse that interacts with a target in the target space causing at least part of that target to be converted into plasma that emits EUV light; a diagnostic system; and a control system. The diagnostic system includes: a probe module that produces a plurality of diagnostic probes, each probe interacting with the target in the region prior to the target entering the target space; and a detection module that detects a plurality of two-dimensional representations of light that is produced from the interaction between the diagnostic probes and the target. The control system is connected to the diagnostic system and is configured to: receive the plurality of two-dimensional representations from the detection module; analyze the received two-dimensional representations; and determine one or more moving properties of the target based on the analysis.

Implementations can include one or more of the following features. For example, the control system can be configured to adjust one or more characteristics of a radiation pulse directed to the target space if the determined one or more moving properties of the target are outside an acceptable range. Each diagnostic probe can be a diagnostic light beam. The light produced due to the interaction between the target and each diagnostic probe can include the diagnostic light beam scattering off a surface of the target. The light produced due to the interaction between the target and each diagnostic probe can include a shadow of the target obscuring at least a portion of the diagnostic light beam.

DRAWING DESCRIPTION

FIG. 8 is a block diagram of an exemplary control system of the EUV light source of FIG. 1;

FIG. 9A is a schematic diagram showing a close up of the interaction between a diagnostic radiation beam and a current target in which the diagnostic radiation beam axis is generally perpendicular to a trajectory of the current target and the current target trajectory is aligned with an X direction;

FIG. 9B is a schematic diagram showing a close up of the interaction between a diagnostic radiation beam and a current target in which the diagnostic radiation beam axis is generally perpendicular to a trajectory of the current target and the current target trajectory is offset from an X direction along a Y direction;

FIG. 9C is a schematic diagram showing a close up of the interaction between a diagnostic radiation beam and a current target in which the diagnostic radiation beam is directed along an axis that is in the XY plane and the current target trajectory is aligned with the X direction;

FIG. 9D is a schematic diagram showing a close up of the interaction between a diagnostic radiation beam and a current target in which the diagnostic radiation beam is directed along an axis that is in the XY plane and the current target trajectory is offset from the X direction along the Y direction;

Figure 20A:
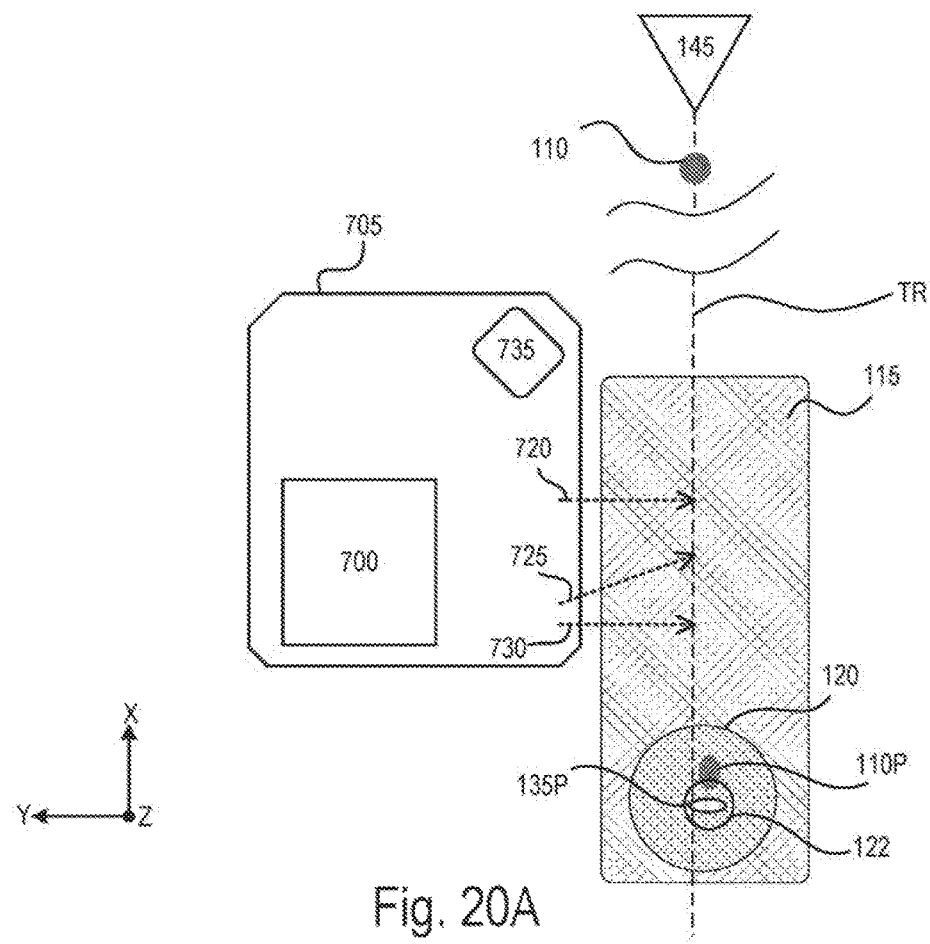
Figure 20B:
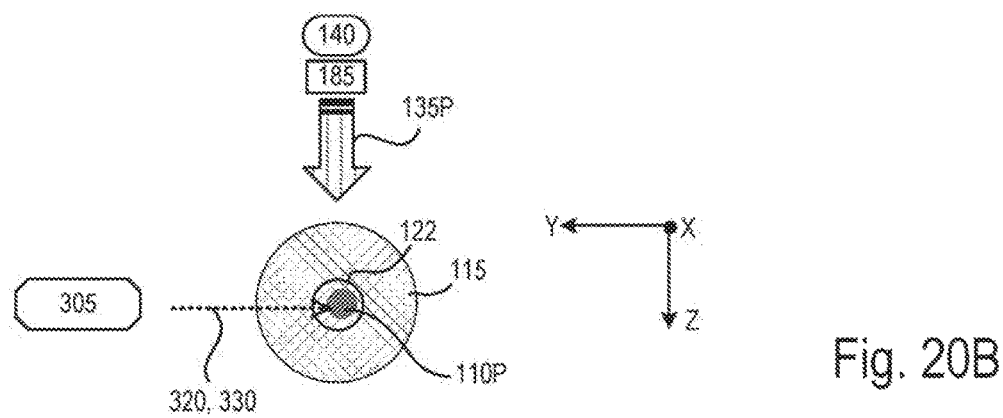
Figure 21A:
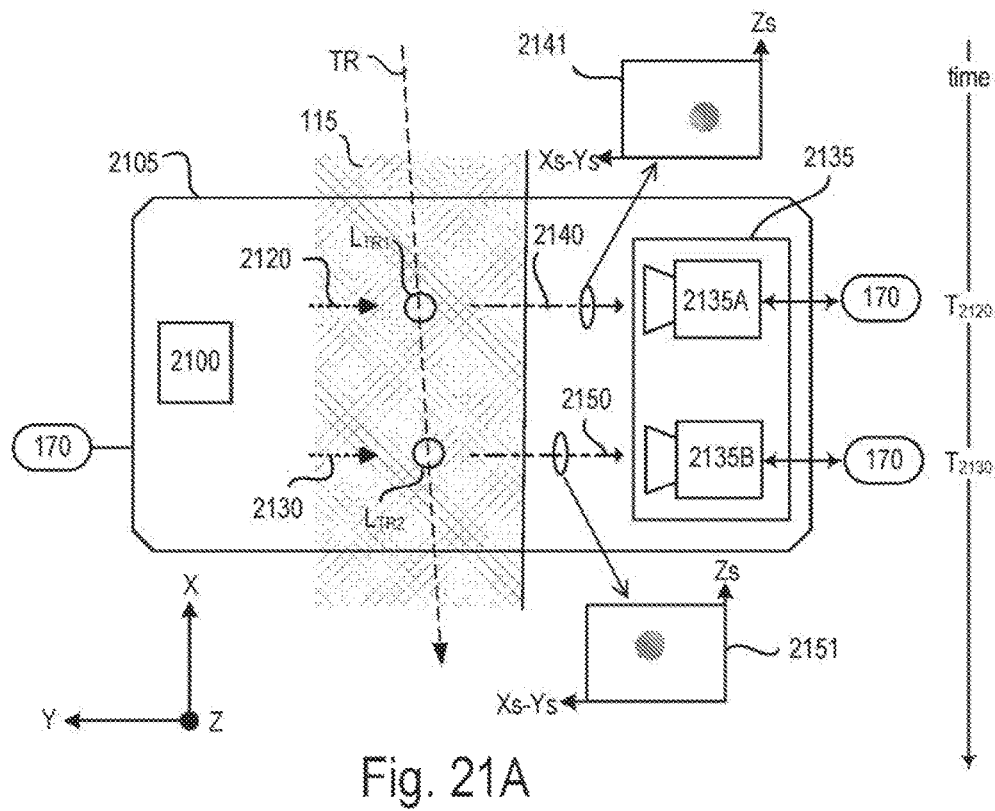
Figure 21B:
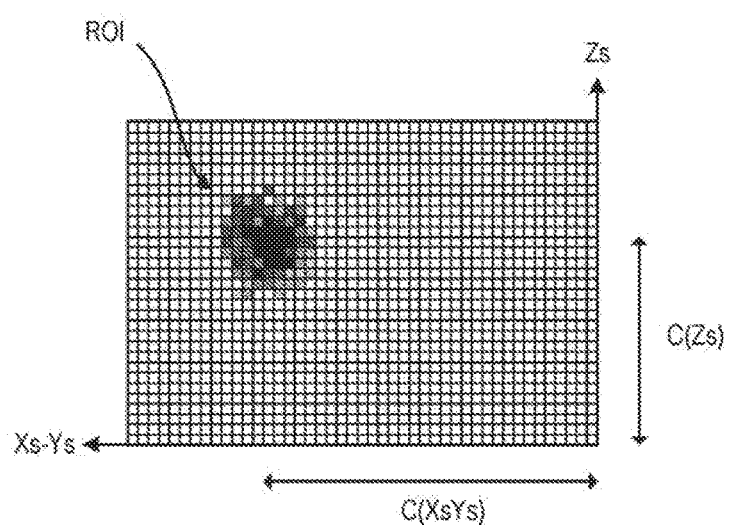
Figure 22:
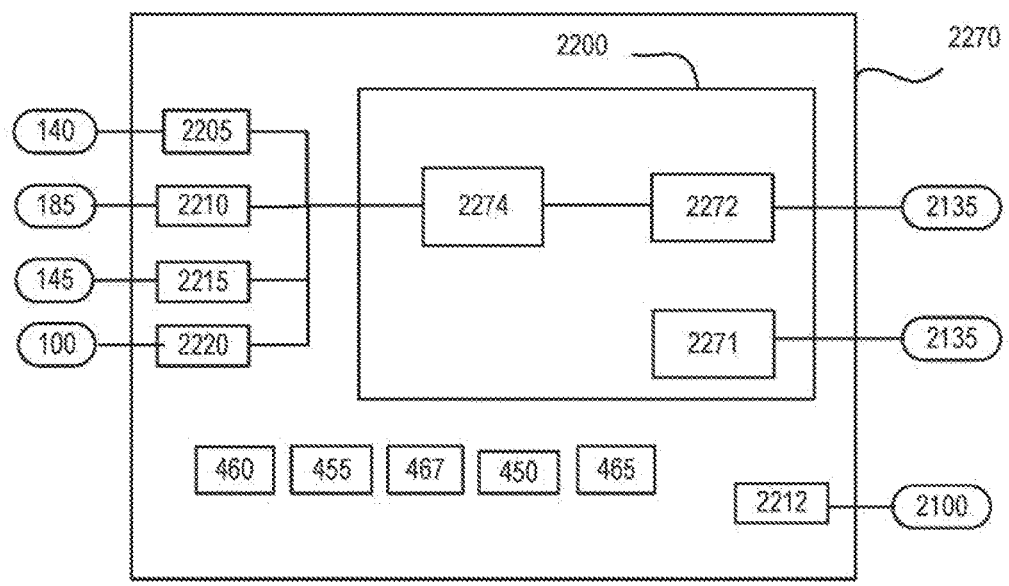
Figure 23:
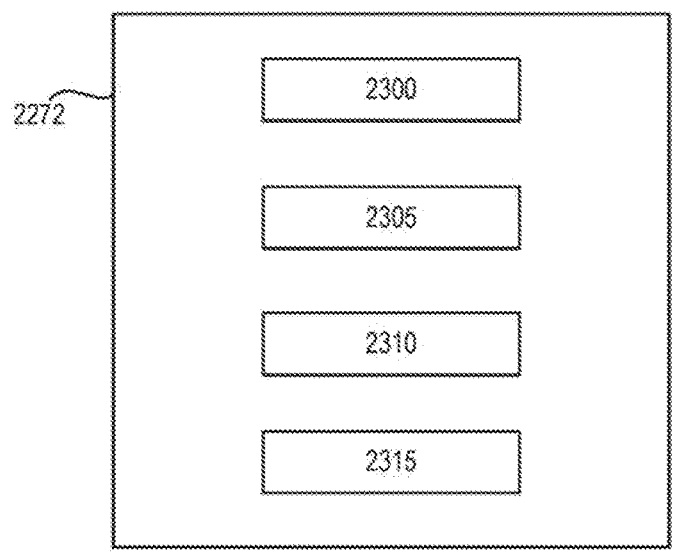
Figure 24:
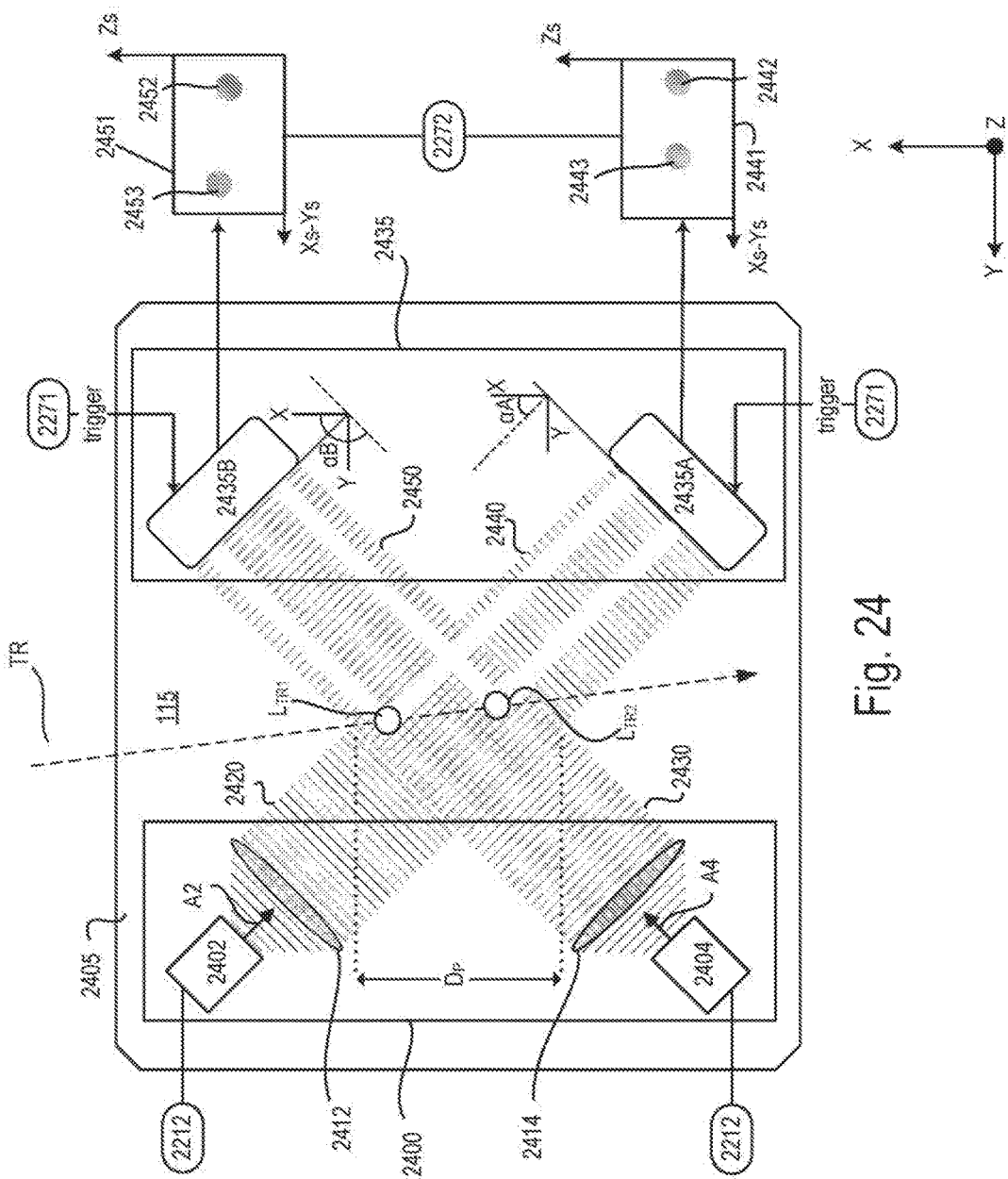
Figure 25:
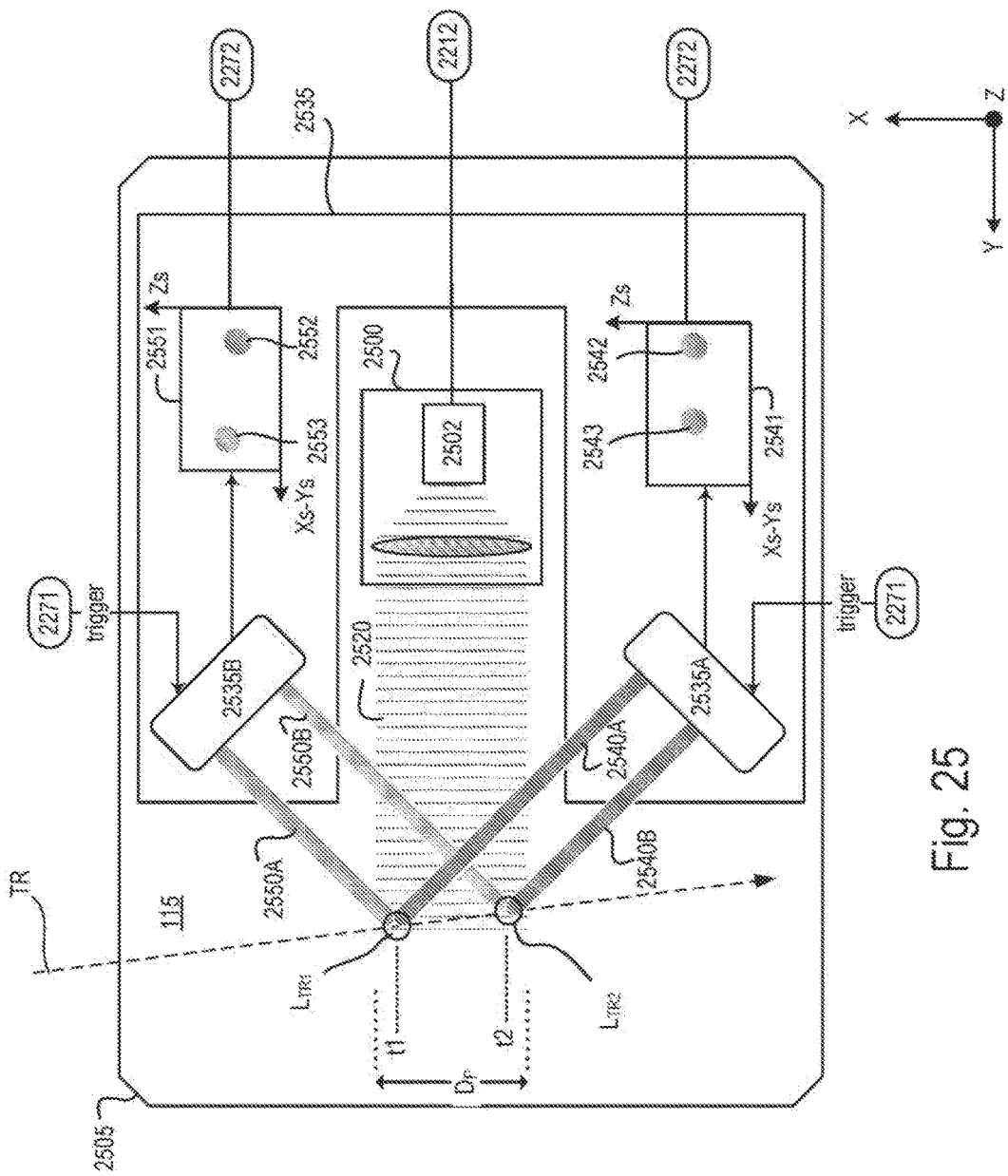
Figure 26:
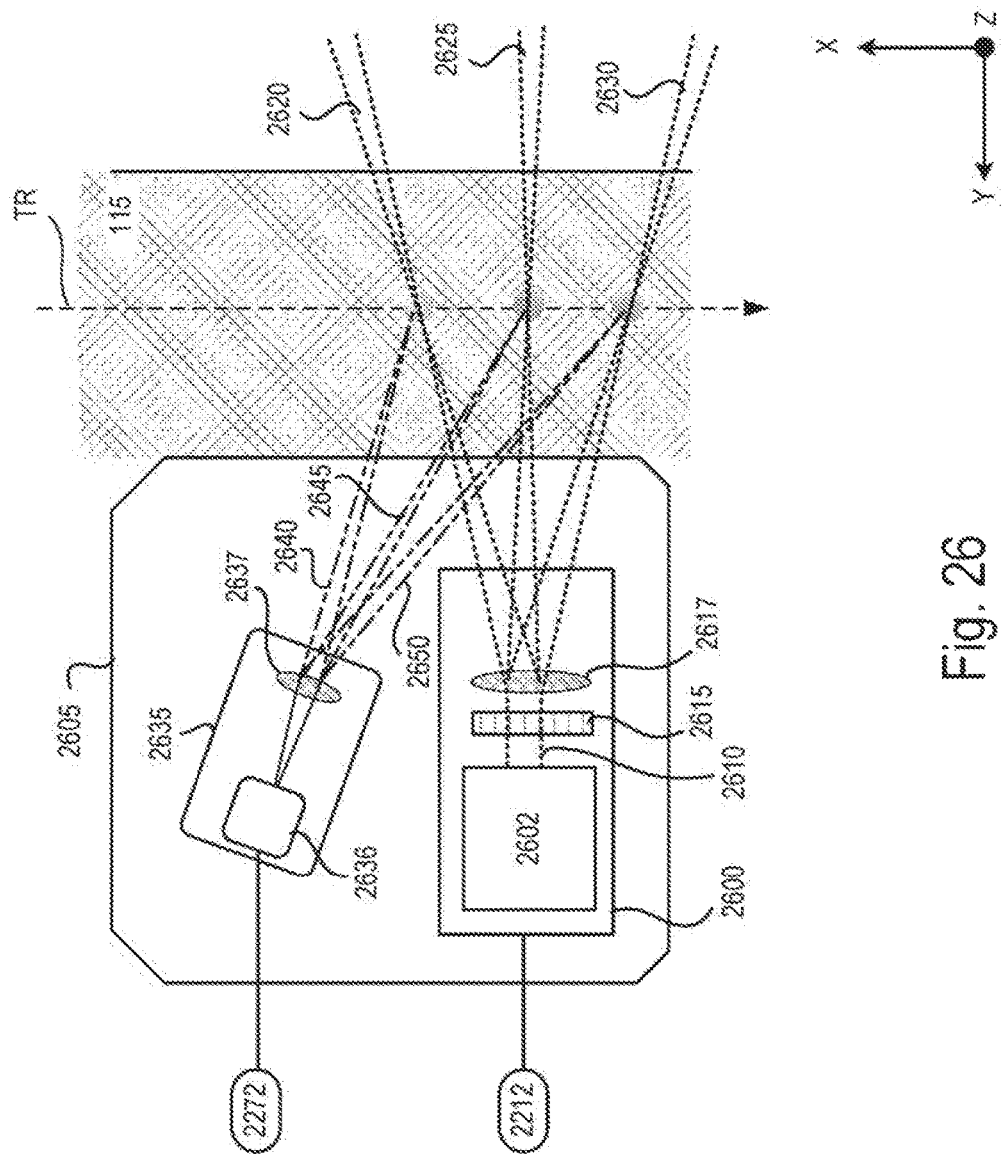
Figure 27:
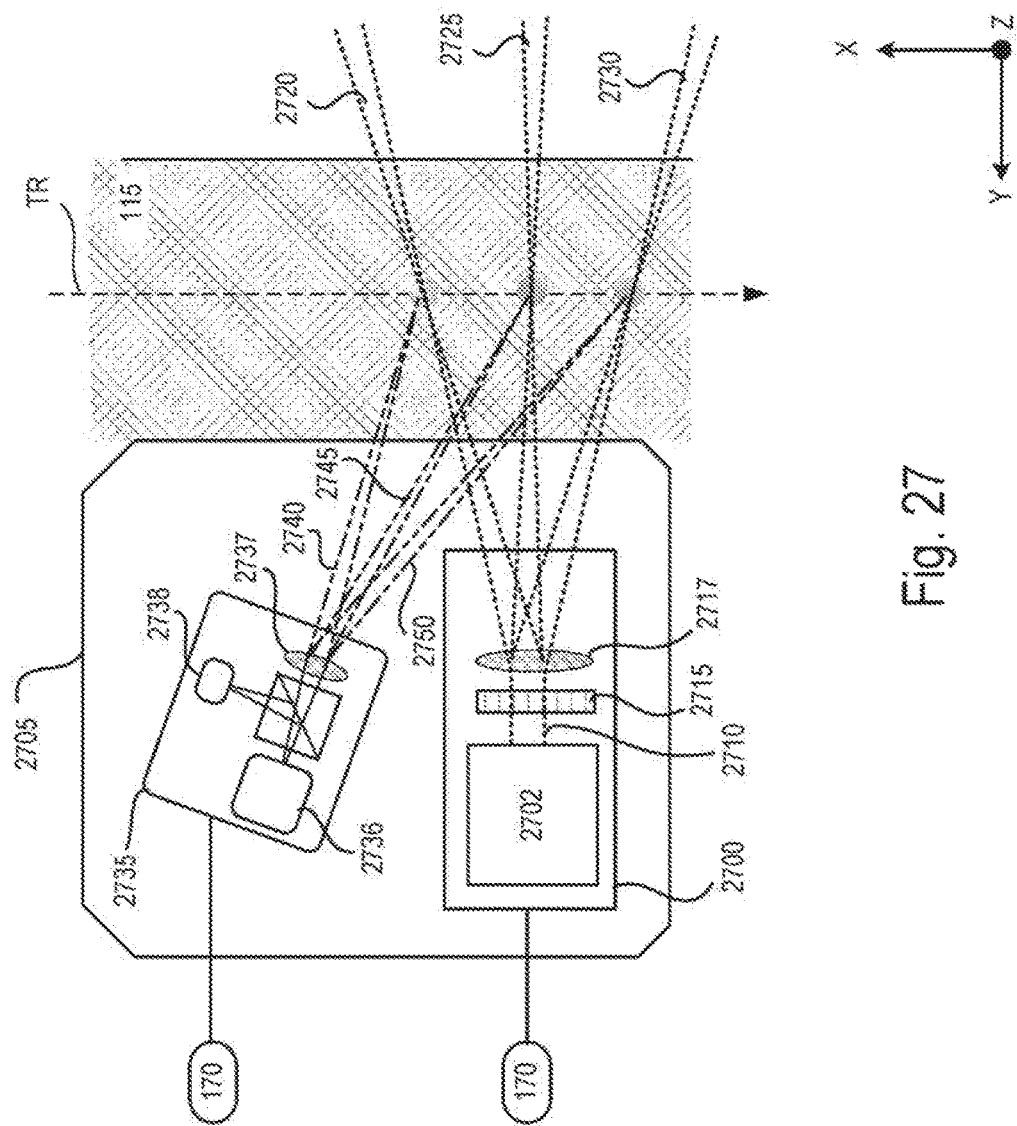
Figure 28:
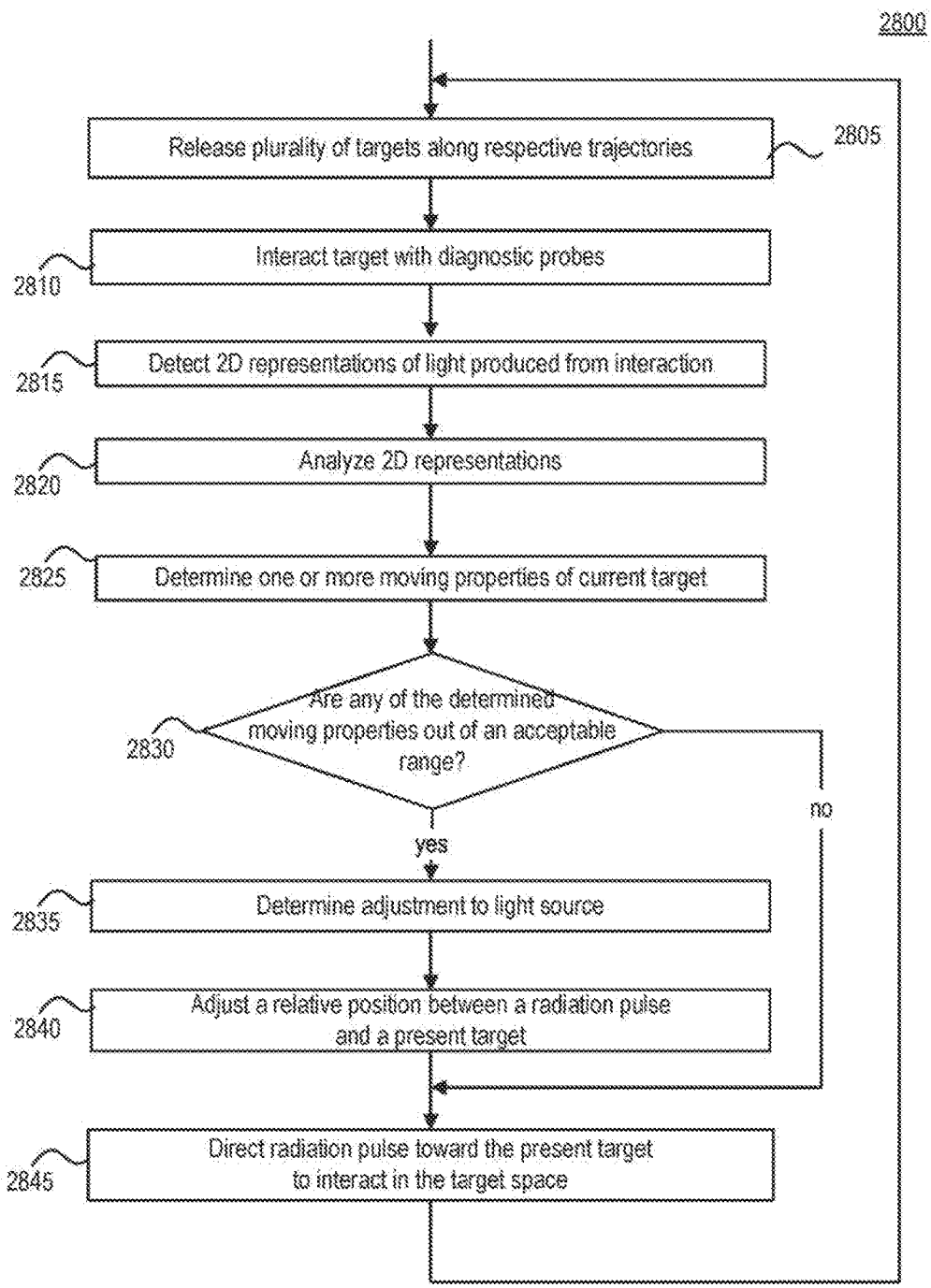

FIG. 20A is a schematic diagram of an exemplary diagnostic system, extended target region, and target space as viewed along the Z direction of the EUV light source of FIG. 1, showing a point in time after a current target has interacted with three diagnostic light beams of the diagnostic system in the extended target region and during which the current radiation pulse is being directed to the target space;

FIG. 20B is a schematic diagram of the exemplary diagnostic system, extended target region, and target space of FIG. 20A as viewed along the X direction, showing the same point in time as FIG. 20A;

FIG. 21A is a block diagram of an exemplary diagnostic system of the EUV light source of FIG. 1;

FIG. 21B is an exemplary image that is recorded using a two-dimensional recording device of the diagnostic system of FIG. 21A;

FIG. 22 is a block diagram of a control system that can be used in conjunction with the diagnostic system of FIG. 21A for processing images such as that shown in FIG. 21B;

FIG. 23 is a block diagram of an analysis module within the control system of FIG. 22;

FIG. 24 is a schematic diagram of an exemplary diagnostic system in which shadows of a target are imaged using two or more two-dimensional recording devices;

FIG. 25 is a schematic diagram of an exemplary diagnostic system in which light scattered off a target is imaged using two or more two-dimensional recording devices;

FIG. 26 is a schematic diagram of an exemplary diagnostic system in which light reflected from a target is imaged using a two-dimensional recording device;

FIG. 27 is a block diagram of an exemplary diagnostic system that records both one-dimensional aspects and two-dimensional images of light produced from the interaction between a target and diagnostic probes;

FIG. 28 is a flow chart of an exemplary procedure performed by the control system of FIG. 22.

DESCRIPTION

Figure 1A:
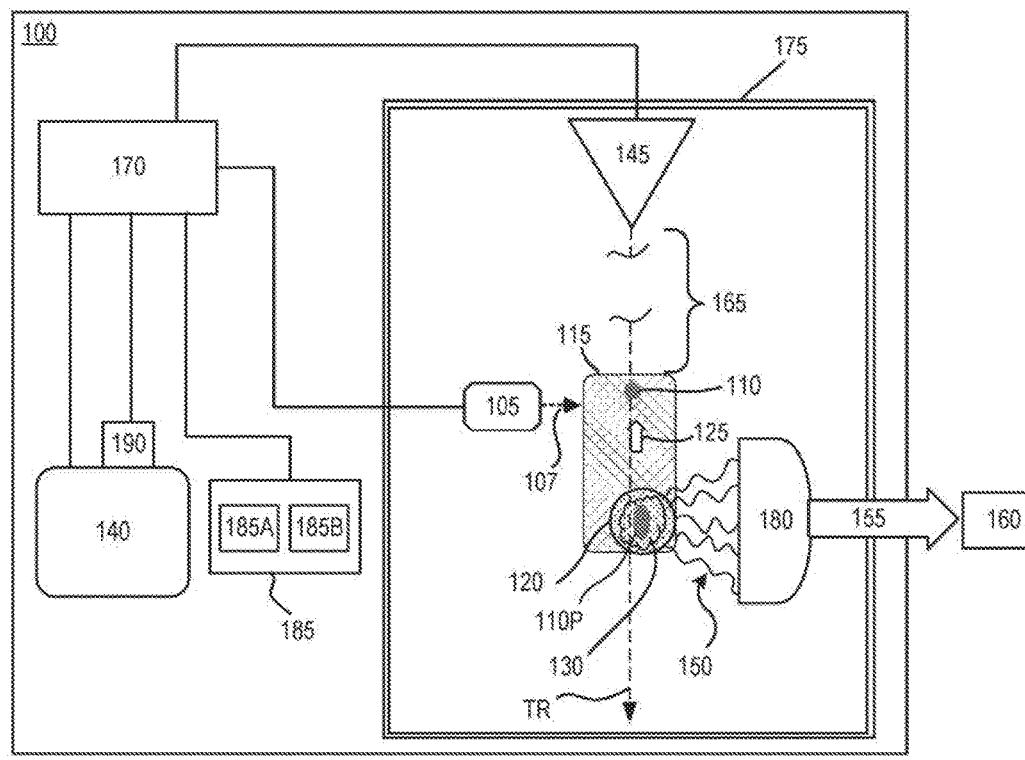
FIG. 1A is a block diagram of a laser produced plasma extreme ultraviolet light source including a diagnostic system for detecting a moving property of a target traveling in an extended target region toward a target space along the −X direction.
Figure 1B:
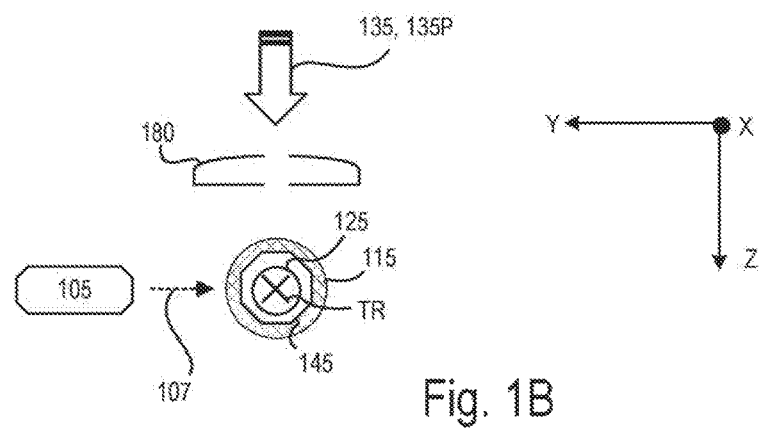
FIG. 1B is a schematic diagram showing a view of the light source of FIG. 1A in which the X direction is coming out of the page and the target trajectory is into the page.

Referring to FIGS. 1A and 1B, an extreme ultraviolet (EUV) light source 100 supplies EUV light 155 that has been produced by an interaction between a target and a radiation pulse to an output apparatus 160. The EUV light source 100 includes features or components that measure and analyze one or more moving properties (such as speed, velocity, and acceleration) of a current target 110 as the current target 110 travels in an extended target region 115.

The current target 110 travels generally along a trajectory TR, the direction of which can be considered as a target (or axial) direction $A_T$, toward a target space 120 that is defined within a chamber 175. The axial direction $A_T$ of the current target 110 lies in a three dimensional coordinate system, that is, X, Y, Z coordinate system defined by the chamber 175. The axial direction $A_T$ of the current target 110 generally has a component that is parallel with the −X direction of the coordinate system of the chamber 175. However, the axial direction $A_T$ of the current target 110 also can have components along one or more of the directions Y and Z that are perpendicular to the −X direction.

Figure 2A:
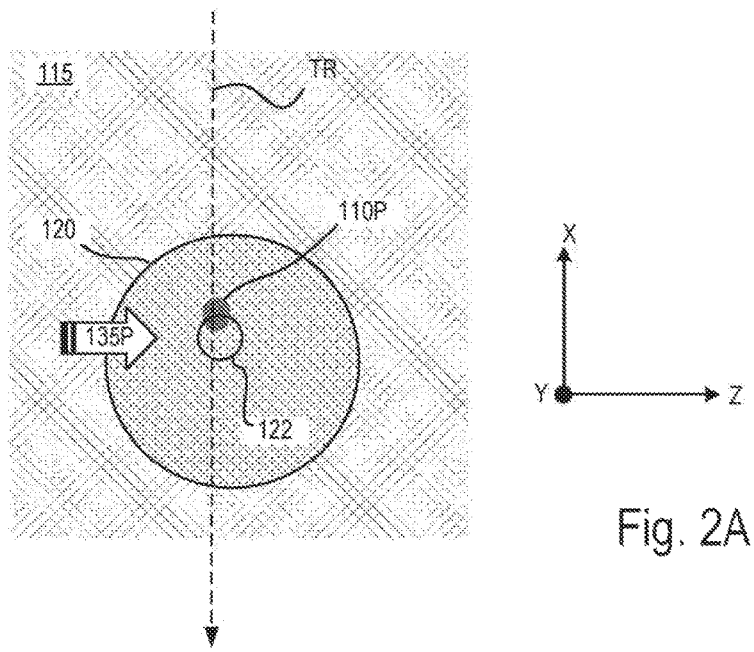
FIG. 2A is a schematic diagram showing a point in time just before a prior radiation pulse and a prior target interact with each other at a target location within a target space of the EUV light source of FIG. 1.
Figure 2B:
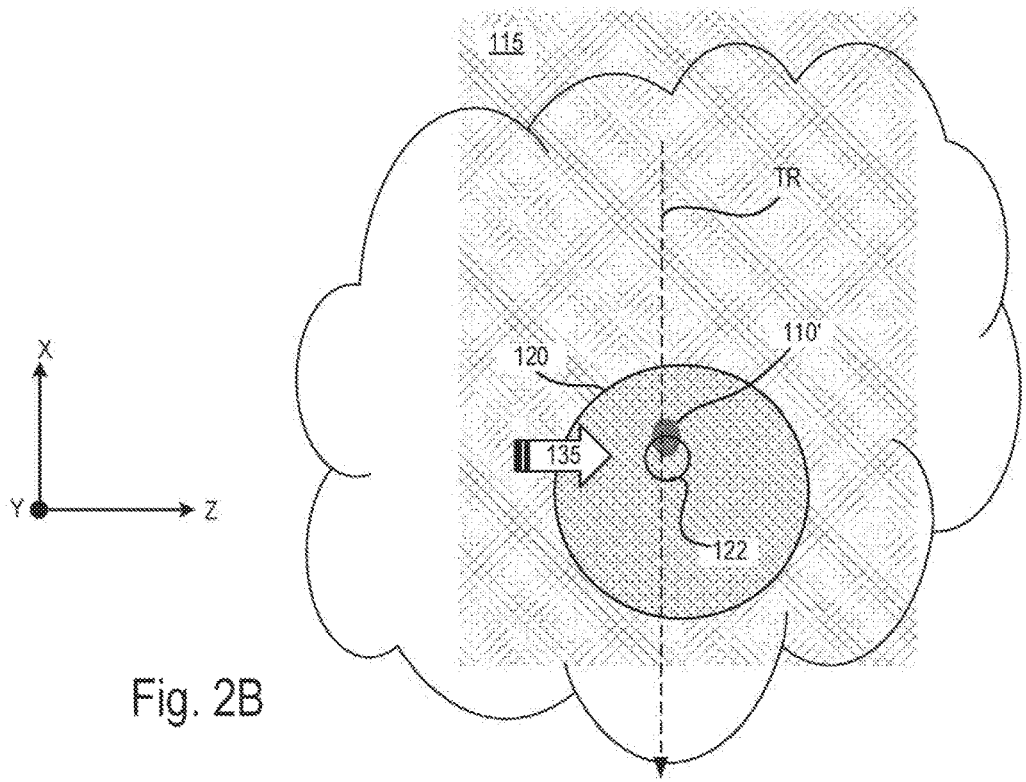
FIG. 2B is a schematic diagram showing a point in time just before a current radiation pulse and a current target interact with each other at the target location within the target space of the EUV light source of FIG. 1.

With reference to FIGS. 1B and 2B, the EUV light source 100 adjusts one or more characteristics of a radiation pulse 135 that is directed toward the target space 120 based on the analysis of the determined moving property of the current target 110. The adjustment to the one or more characteristics of the radiation pulse 135 improves a relative alignment between a present target 110' and the radiation pulse 135 at the target location 122 in the target space 120. The present target 110' is the target that has entered the target space 120 at the time that the radiation pulse 135 (which has just been adjusted) arrives in the target space 120. Such adjustment to the one or more characteristics of the radiation pulse 135 improves the interaction between the present target 110' and the radiation pulse 135 and increases the amount of EUV light 150 (such as shown in FIG. 1A) produced by such interaction.

In some implementations, the present target 110' is the current target 110. In these implementations, the adjustment to the one or more characteristics of the radiation pulse 135 happens in a relatively shorter time frame. A relatively shorter time frame means that the one or more characteristics of the radiations pulse 135 are adjusted during the time after the analysis of the moving properties of the current target 110 is completed to the time that the current target 110 enters the target space 120. Because the one or more characteristics of the radiation pulse 135 are able to be adjusted in the relatively shorter time frame, there is enough time to effect the interaction between the current target 110 (the moving properties of which have just been analyzed) and the radiation pulse 135.

In other implementations, the present target 110' is another target, that is, a target other than the current target 110, and following the current target 110 in time. In these implementations, the adjustment to the one or more characteristics of the radiation pulse 135 happens in a relatively longer time frame such that it is not feasible to effect the interaction between the current target 110 (the moving properties of which have just been analyzed) and the radiation pulse 135. On the other hand, it is feasible to effect the interaction between the other (or later) target and the radiation pulse 135. A relatively longer time frame is a time frame that is greater than the time after the analysis of the moving properties of the current target 110 is completed to the time that the current target 110 enters the target space 120. Depending on the relatively longer time frame, the other target could be adjacent to the current target 110. Or, the other target could be adjacent to an intermediate target that is adjacent to the current target 110.

The EUV light source 100 is able to determine the moving property of the current target 110 and each target directed toward the target space 120, and also to adjust the characteristic (or characteristics) of the radiation pulse 135 in a short window of time. Specifically, the moving property of the current target 110 is determined after a prior and adjacent target 110P has interacted with a prior radiation pulse 135P (FIG. 2A) but before the next target enters the extended target region 115. In this way, the moving property of every or nearly every target that is being directed to the target space 120 can be determined so that a specific adjustment to a particular radiation pulse can be tailored to the determined moving property of the target that the particular radiation pulse will interact with.

By measuring and analyzing the moving property of the current target 110 in this extended target region 115 and in the short window of time, it is possible determine the impact or effect of various forces and effects applied to the current target 110 as it travels toward the target space 120. For example, forces and effects that are applied to the current target 110 include plasma pushback forces 125 that are applied to the current target 110 due to the remaining plasma 130 that is formed from an interaction at the target location 122 within the target space 120 between the prior target 110P (as shown in FIG. 2A) and the prior radiation pulse 135P (shown in FIG. 2A) that is supplied by an optical source 140. Such plasma pushback forces 125 can become larger as the plasma power increases, and the plasma power depends on the power of the prior radiation pulse 135P and the efficiency of the interaction between the prior radiation pulse 135P and the prior target 110P. Thus, it becomes important as these output powers are increased to account for and make adjustments to reduce the impact of the plasma pushback forces 125. Other forces and effect applied to the current target 110 include instabilities in the generation and transport of the current target 110 as it travels toward the target space 120 and disruptions to the target trajectory due to the current target 110 interacting with other gas flow (such as hydrogen gas) as it travels toward the target space 120.

The current target 110 (as well as the prior target 110P and targets released earlier and later than these targets) is produced by a target delivery system 145 and is directed toward the target space 120 along a trajectory or path TR and the current target 110 is directed along its own axial direction $A_T$ at each point along the trajectory TR. In such implementations, the axial direction $A_T$ of the current target 110 upon immediate release from the target delivery system 145, aligns or is parallel with the −X direction of the three dimensional coordinate system X, Y, Z. The current target 110 moves at a velocity and along its axial direction $A_T$ and such motion can be predicted based on the properties at the target delivery system 145. Each target released by the target delivery system 145 can have a slightly different actual trajectory and the trajectory depends on the physical properties of the target delivery system 145 at the time of release of the target as well as environment within the chamber 175.

However, as discussed above, various forces and effects (such as the plasma pushback forces 125 applied along the X direction as well the Y and Z directions) applied to the current target 110 can cause the motion of the current target 110 to divert or change from the predicted motion. For example, the plasma pushback forces 125 can slow the current target 110 (as well as the present target 110') along the X direction or cause the current target 110 to move along the Y or Z directions in an unpredictable manner. Without taking into account the impact of these forces and effects (such as the plasma pushback forces 125) on the movement of the present target 110' (which can be the current target 110), the radiation pulse 135 produced by the optical source 140 and directed toward the target location 122 within the target space 120 may miss the present target 110' completely or may not efficiently interact with the present target 110' when the present target 110' reaches the target location 122. This inefficient interaction can lead to a reduction in the amount of EUV light 150 produced by the present target 110', and thus can lead to a reduction in the amount of EUV light 155 that is output from the light source 100 toward an output apparatus 160 such as a lithography exposure apparatus. Additionally, this inefficient interaction can produce excess debris from the material of the present target 110' after it has interacted with the radiation pulse 135. This debris contaminates an interior of or optics within the chamber 175, and the contamination of the chamber interior and/or optics within the chamber 175 can force stoppage of the EUV light source 100 in order to clean the interior and/or optics or to replace optics.

The current target 110 can experience plasma pushback forces 125 that change its velocity (an exemplary moving property), for example, on the order of 0.1 to 10 m/s. To resolve such a change to the velocity of the current target 110, the EUV light source 100 should be able to detect changes in the velocity to within a level that can be less than or equal to about 0.1 m/s (for example, less than or equal to about 0.04 m/s or 0.02 m/s) to ensure an acceptable accuracy in a relative position between the radiation pulse and the present target 110' at the target location 122, for example, a relative position of less than 5 μm.

Referring again to FIG. 1A, the extended target region 115 is that region in which the plasma pushback forces 125 affect the current target 110 and cause the motion of the current target 110 to deviate from a desired motion. By quantifying this deviation, it is possible to determine how to adjust the radiation pulse 135 to ensure that the radiation pulse 135 efficiently interacts with the present target 110' within the target space 120. If the present target 110' is a target other than the current target 110, then an assumption can be made that the effect of the various forces on the current target 110 is similar to the effect of the various forces on the present target 110' so that the analysis can be applied to adjust the radiation pulse 135 that interacts with the target other than the current target 110.

The extended target region 115 therefore can include remaining plasma 130 formed from the interaction of the prior target 110P (as shown in FIG. 2A) and the prior radiation pulse 135P (as shown in FIG. 2A). A first region 165 between the extended target region 115 and the target delivery system 145 can be considered as a region in which the plasma pushback forces 125 have a much lower effect of the current target 110. Thus, it is expected that a moving property (such as a speed or direction) of the current target 110 in the extended target region 115 will be different from the moving property of the current target 110 in the first region 165. Such a difference may make it difficult to efficiently interact the radiation pulse 135 with the present target 110' when it reaches the target location 122 within the target space 120 because the present target 110' may arrive at a different location than planned within the target space 120 and thus the radiation pulse 135 may not fully or partly intercept the present target 110'.

In order to measure the moving property of the current target 110, the EUV light source 100 includes a diagnostic system 105 that provides one or more diagnostic probes 107 that interact with the current target 110 in the extended target region 115, as shown in FIG. 1A. Specifically, the one or more diagnostic probes 107 interact with the current target 110 in the extended target region 115 only after the prior and adjacent target 110P has already interacted with the prior radiation pulse 135P in the target space 120. The one or more diagnostic probes 107 can be directed along a direction that is in a plane of the −X direction and the −Y direction, for example, along the −Y direction. Moreover, the one or more diagnostic probes 107 can be configured to interact with each and every target 110 that passes through the extended target region 115 so that the diagnostic system 105 analyzes information about each and every target 110.

The interaction between the current target 110 and the one or more diagnostic probes 107 releases information (such as light or photons) that can be detected by the diagnostic system 105. The diagnostic system 105 outputs data based on the released information, and that data can be used to determine the moving property of the current target 110. The EUV light source 100 also includes a control system 170 that receives this data from the diagnostic system 105. The control system 170 analyzes this data and determines the moving property of the current target 110 based on this analysis.

The EUV light source 100 performs the measurement and analysis on the moving property of the current target 110 in the extended target region 115 and also makes a change to one or more characteristics of the radiation pulse 135 that will interact with the present target 110' at the target location 122 within the target space 120 so that the present target 110' and the radiation pulse 135 efficiently interact with each other to produce EUV light 150. The radiation pulse 135 that interacts with the present target 110' at the target location 122 within the target space 120 may or may not be the very next radiation pulse that is produced by the optical source 140 after the production of the prior radiation pulse 135P.

The time frame during which the EUV light source 100 performs the measurement and analysis as well as the adjustment or change to the radiation pulse 135 is constrained by one or more of the rate at which the target delivery system 145 generates and releases each target along the trajectory TR and a distance between the target delivery system 145 and the target space 120. For example, if the target delivery system 145 generates targets at a repetition rate of 50 kHz, and a velocity of a target is 70 meters per second (m/s) as it is released from the target delivery system 145, then each target in the trajectory TR is physically separated or spaced by about 1.4 millimeters (mm) along the trajectory TR. Given these exemplary conditions, each target crosses the path of the diagnostic probe(s) 107 of the diagnostic system 105 every 20 microseconds (μs). In this example, the EUV light source 100 must perform the measurement and analysis on the current target 110 as well as affect the change to the radiation pulse 135 all within a time frame of 20 μs just after the prior target 110P and the prior radiation pulse 135P interact, and also within distances that are less than the spacing between the targets (which would be 1.4 mm in this example).

The plasma pushback forces 125 extend out from the target space 120 and the size of the forces drop with the distance from the target space 120. For example, the plasma pushback forces 125 can drop with a linear multiple of the distance or with a square of the distance. For example, the plasma pushback forces 125 generated within the target space 120 can affect the current target 110 as far out as 1.0 to 1.5 mm or even up to 10 mm from the target space 120 along any of the directions, and for example, along the X direction. By contrast, the distance between the target space 120 and the target delivery system 145 is about 1 meter (m).

The EUV light source 100 includes the chamber 175 that defines the target space 120, the first region 165, and the extended target region 115, which is closer to the target space 120 than the first region 165, all within the three dimensional coordinate system X, Y, Z. The target delivery system 145 is configured to release the current target 110 along the trajectory or path TR that overlaps both the first region 165 and the extended target region 115. As discussed above, the target delivery system 145 releases a stream of targets at a particular rate, and the EUV light source 100 must take this rate into account when determining the total amount of time needed to perform the measurement and analysis on the moving property (or properties) of the current target 110 as well as affecting a change to the radiation pulse 135 that interacts with the present target 110' at the target location 122 within the target space 120.

The EUV light source 100 includes a light collector 180 that collects as much EUV light 150 emitted from the plasma as possible and redirects that EUV light 150 as collected EUV light 155 toward the output apparatus 160.

The EUV light source 100 includes a beam delivery system 185 that directs the beam of radiation pulse or pulses 135P, 135 from the optical source 140 to the target space 120 and generally along the Z direction (though the beam or beams 135, 135P can be at an angle relative to the Z direction). The beam delivery system 185 can include optical steering components 185A that change a direction or angle of the beam of radiation pulses 135, 135P and a focus assembly 185B that focuses the beam of radiation pulses 135, 135P to the target space 120. Exemplary optical steering components 185A include optical elements such as lenses and mirrors that steer or direct the beam of radiation pulses by refraction or reflection, as needed. The beam delivery system 185 can also include an actuation system that controls or moves the various features of the optical components 185A and the focus assembly 185B.

Each of the targets (such as the present target 110' the current target 110, the prior target 110P, and all other targets produced by the target delivery system 145) includes a material that emits EUV light when converted to plasma. Each target is converted at least partially or mostly to plasma through interaction with the radiation pulse 135 produced by the optical source 140 at the target location 122 within the target space 120.

Each target (including the current target 110 and the prior target 110P) produced by the target delivery system 145 is a target mixture that includes a target substance and optionally impurities such as non-target particles. The target substance is the substance that is capable of being converted to a plasma state that has an emission line in the EUV range. The target substance can be, for example, a droplet of liquid or molten metal, a portion of a liquid stream, solid particles or clusters, solid particles contained within liquid droplets, a foam of target material, or solid particles contained within a portion of a liquid stream. The target substance can include, for example, water, tin, lithium, xenon, or any material that, when converted to a plasma state, has an emission line in the EUV range. For example, the target substance can be the element tin, which can be used as pure tin (Sn); as a tin compound such as SnBr4, SnBr2, SnH4; as a tin alloy such as tin-gallium alloys, tin-indium alloys, tin-indium-gallium alloys, or any combination of these alloys. In the situation in which there are no impurities, then each target includes only the target substance. The discussion provided herein is an example in which each target is a droplet made of molten metal such as tin. However, each target produced by the target delivery system 145 can take other forms.

The current target 110 can be provided to the target space 120 by passing molten target material through a nozzle of the target delivery system 145, and allowing the current target 110 to drift into the target space 120. In some implementations, the current target 110 can be directed to the target space 120 by force. The current target 110 can be a material that has already interacted with one or more radiation pulses 135 or the current target 110 can be a material that has not yet interacted with one or more radiation pulses 135.

The optical source 140 is configured to produce a plurality of radiation pulses that are directed toward the target space 120 by way of the beam delivery system 185. Each radiation pulse that interacts with a target at the target location 122 within the target space 120 converts at least a part of that target into plasma that emits EUV light 150.

The EUV light source 100 also includes an adjustment system 190 coupled to the optical source 140 and to the control system 170. The control system 170 is configured to control a relative position between a radiation pulse 135 and the present target 110' by sending a control signal to the adjustment system 190. The control signal causes the adjustment system 190 to adjust one or more of a timing of a release of the radiation pulse 135 and a direction at which the radiation pulse 135 travels.

Figure 3:
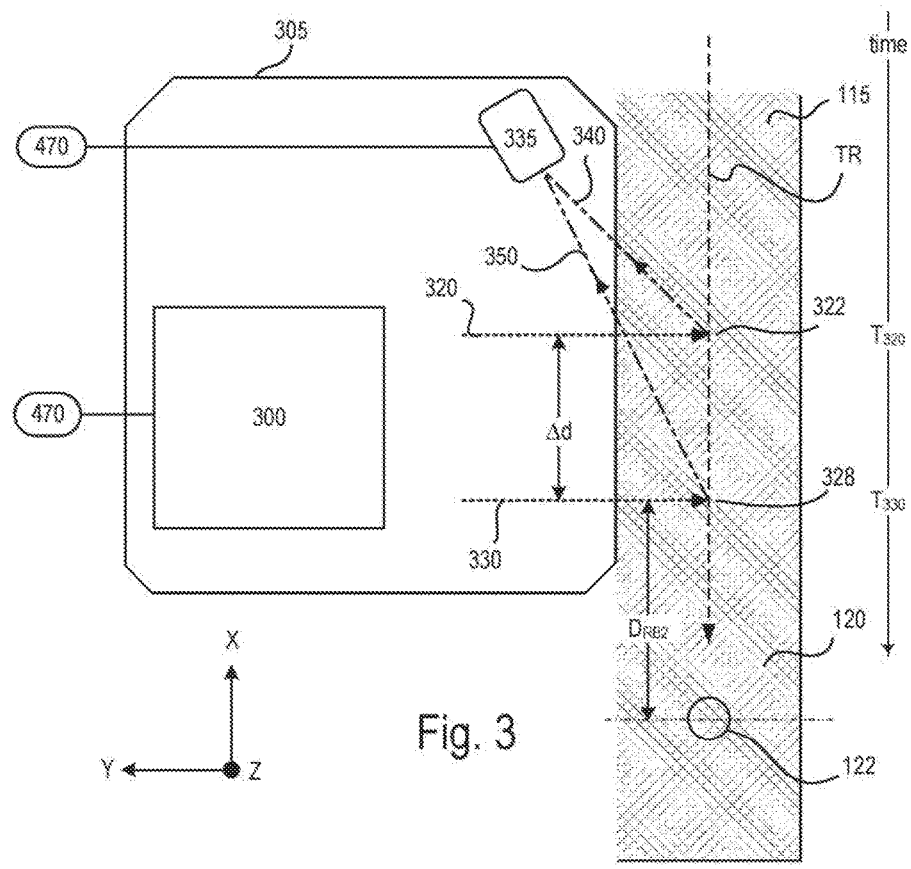
FIG. 3 is a block diagram of an exemplary diagnostic system of the EUV light source of FIG. 1.

Referring to FIG. 3, an exemplary diagnostic system 305 is shown. The diagnostic system 305 includes a probe module 300 which can be an illumination module 300 that produces, under control of the control system 170 or control system 470 (discussed below), as the diagnostic probe 107 at least two diagnostic light beams 320, 330 that are directed toward the trajectory TR of the current target 110. As discussed above, the diagnostic probe 107 (in this case, the diagnostic light beams 320, 330) interacts with the current target 110 in the extended target region 115. Accordingly, the diagnostic light beam 320 is directed to interact with the current target 110 at a location 322 and a time $T_{320}$ in the extended target region 115, and the diagnostic light beam 330 is directed to interact with the current target 110 at a location 328 and at a time $T_{330}$ in the extended target region 115. The time $T_{330}$ is after the time $T_{320}$. The diagnostic light beams 320, 330 form laser curtains through which the current target 110 traverses. In some implementations, such as shown in FIG. 3, the diagnostic light beams 320, 330 can be directed along a path that crosses the trajectory TR at a right angle (an angle of approximately 90°) to the −X direction.

Moreover, the diagnostic light beams 320, 330 are separated from each other along the X direction by a known distance, for example, a value that can be referred to as Δd. For example, separation Δd can be less than the spacing between the targets and it can be determined or set based on the spacing between the targets to provide for greater precision in the measurements that are performed based on the interactions between the diagnostic light beams 320, 330 and the current target 110. Up to a point and in general, the larger the separation Δd the higher the precision in the measurements that are performed. For example, the separation Δd can be between about 250 μm and 800 μm.

The interactions between the diagnostic light beams 320, 330 and the current target 110 enable the control system 170 or 470 to determine a moving property such as a velocity V of the current target 110 along the −X direction. It is possible to determine trends in the velocity V or the changing velocity V over many targets. It is also possible to determine a change in a moving property of the current target 110 along the −X direction using only the diagnostic light beams 320, 330 if some assumptions about the motion of the current target 110 are made.

Figure 5:
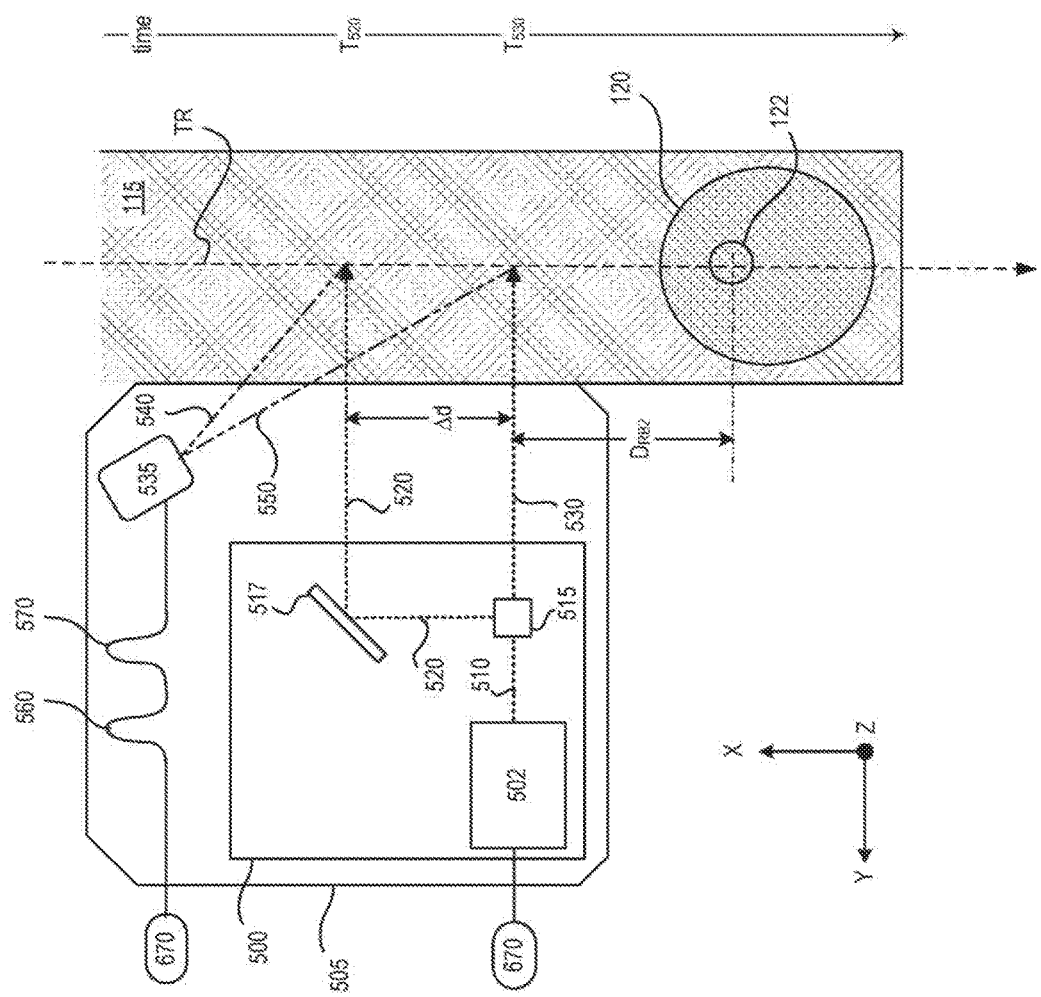
FIG. 5 is a block diagram of an exemplary diagnostic system of the EUV light source of FIG. 1.

In some implementations, the illumination module 300 includes a single light source that produces a light beam that is split into two diagnostic light beams (such as exemplary design is shown in FIG. 5). For example, a single light source can be a solid-state laser such as a YAG laser, which can be neodymium-doped YAG (Nd:YAG) laser operating at 1070 nm and at 50 W power. In this example, the illumination module 300 also includes one or more optical elements (such as a beam splitter or mirrors) that split the light beam from the YAG laser into two separate diagnostic light beams that are directed toward the trajectory TR of the target 110 as diagnostic light beams 320, 330. In other implementations, the illumination module 300 includes a pair of light sources such as two lasers, each producing its own diagnostic light beam 320, 330.

The diagnostic system 305 also includes a detection module 335. The detection module 335 is configured to detect the data that results from the interaction between the current target 110 and the respective diagnostic light beam 320, 330 within the extended target region 115, and then output the detected data to the control system 170 or 470. For example, the detection module 335 can detect each interaction by detecting a one-dimensional aspect or characteristic such as the intensity of the light 340, 350 that is reflected from the current target 110 as the respective diagnostic light beam 320, 330 strikes the target 110. Moreover, the control system 170 or 470 can analyze the data from the detection module 335 and, based on the analysis, detect the time at which the maximum intensity of the light 340, 350 that is reflected from the current target 110 reaches the detection module 335. The light 340, 350 that is reflected from the current target 110 can be a portion of the respective diagnostic light beam 320, 330 that is reflected from the current target 110. The accuracy with which the EUV light source 100 can detect the changes to the trajectory of the current target 110 is limited to the resolution of the detection module 335.

In some implementations, the detection module 335 includes a photo detector and one or more optical components such as reflective or refractive optics, filters, apertures to direct and modify the light 340, 350 prior to entering the photo detector.

The wavelength of the diagnostic probe (and the diagnostic light beams 320, 330) produced by the illumination module 300 should be distinct enough from the wavelength of the radiation pulses 135 produced by the optical source 140 so that the detection module 335 can distinguish between the light 340, 350 reflected from the current target 110 and stray light from the radiation pulses 135. In some implementations, the wavelength of the diagnostic light beams 320, 330 is 532 nm or 1550 nm.

It is also possible that the diagnostic system 105, 305 includes an optic that changes a polarization state of one or more of the diagnostic light beams 320, 330.

Figure 7:
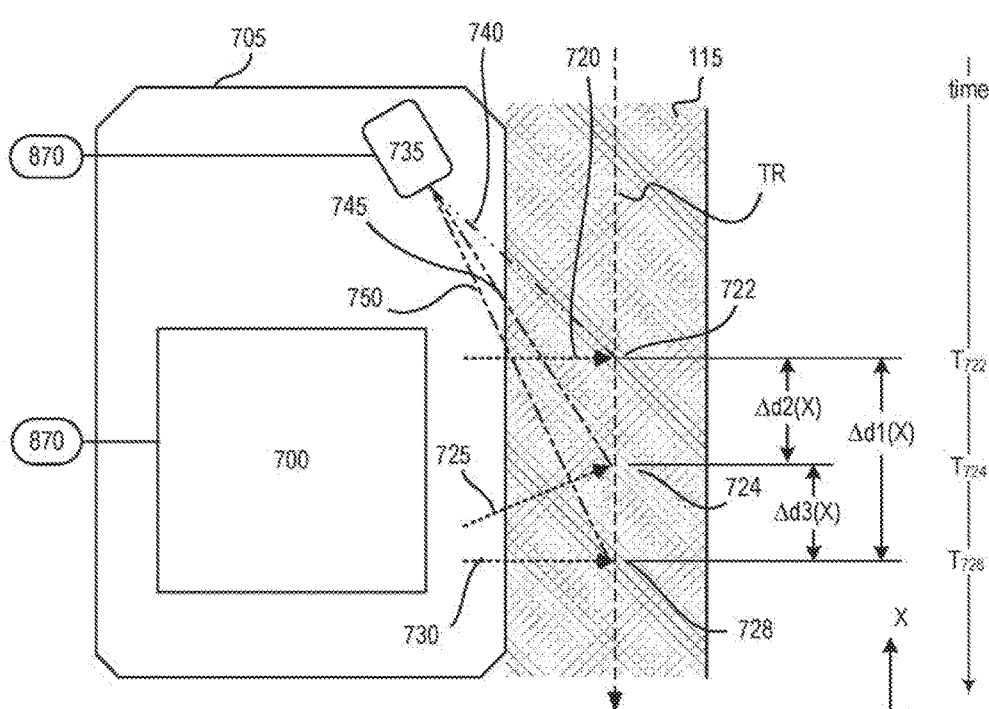
FIG. 7 is a block diagram of an exemplary diagnostic system of the EUV light source of FIG. 1.

In some implementations, the diagnostic light beams 320, 330 produced by a laser source are Gaussian beams, and thus the transverse profile of the optical intensity of each diagnostic light beam 320, 330 can be described with a Gaussian function. In such a function, the optical intensity correlates with the transverse distance from the axis of the light beam 320 or 330. The transverse profile of the diagnostic light beam 320, 330 also determines how the detection module 335 measures the light 340, 350 reflected from the current target 110 because the different transverse profiles of the diagnostic light beam 320, 330 can alter one or more aspects of the light 340, 350 detected by the detection module 335. The transvers profile of the diagnostic light beam 320 or 330 could be used to determine a moving property of the current target 110 that has a component in the Y direction if the diagnostic light beam 320, 330 were to be directed along a path that subtends a non-right angle with the trajectory TR of the current target 110, such as shown in FIG. 7.

Figure 4:
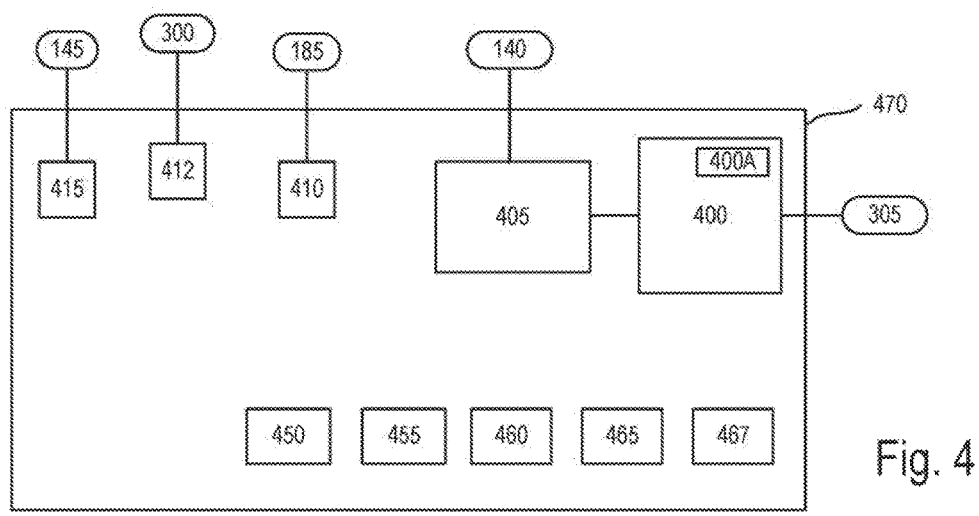
FIG. 4 is a block diagram of an exemplary control diagnostic system of the EUV light source of FIG. 1.

The control system 170 or 470 is configured to analyze the data output from the diagnostic system 105, 305 and control a relative position between the radiation pulse 135 and the present target 110' based on the analysis. To this end, and with reference to FIG. 4, an exemplary control system 470 includes a detection sub-controller 400 that receives the output from the diagnostic system 305. The detection sub-controller 400 analyzes the output from the detection module 335 of the diagnostic system 305, and determines one or more moving properties of the current target 110 based on this analysis. The detection sub-controller 400 also determines whether an adjustment needs to be made to the radiation pulse 135 output from the optical source 140 based on this determination; and if an adjustment is needed, the detection sub-controller 400 sends an appropriate signal to an optical source sub-controller 405, which interfaces with the optical source 140.

In some implementations, the detection module 335 of the diagnostic system 305 outputs a one-dimensional signal such as a voltage signal that is generated when photons of the light 340, 350 are detected. Thus, the detection module 335 detects a one-dimensional aspect (such as the photons) of the light 340, 350. The detection sub-controller 400 converts the output (such as the voltage signal) from the detection module 335 into a value associated with the light 350 produced from the interaction between the current target 110 and the diagnostic light beam 320, and a value associated with the light 350 produced from the interaction between the current target 110 and the diagnostic light beam 330. These two values can be used to determine the one or more moving properties of the target 110.

For example, the detection sub-controller 400 can convert the voltage signal from the detection module 335 into a first value that corresponds to a maximum intensity of the light 340 produced from the interaction between the current target 110 and the diagnostic light beam 320, and a second value that corresponds to the maximum intensity of the light 350 produced from the interaction between the current target 110 and the diagnostic light beam 330. These two values of the maximum intensity can be digitally time stamped and then used to determine the one or more moving properties of the target 110, as discussed below in greater detail.

The sub-controller 400 can include a field-programmable hardware circuit 400A, such as a field-programmable gate array (FPGA), which is an integrated circuit designed to be configured by a customer or a designer after manufacturing. The circuit 400A can be dedicated hardware that receives the values of the time stamps from the detection module 335, performs a calculation on the received values, and uses one or more lookup tables to estimate a time of arrival of the present target 110' at the target location 122. In particular, the circuit 400A can be used to quickly perform a calculation to enable the adjustment to the one or more characteristics of the radiation pulse 135 in the relatively shorter time frame to enable the adjustment of the one or more characteristics of the radiation pulse 1335 that interacts with the current target 110, the moving properties of which have just been analyzed by the circuit 400A.

For example, the circuit 400A can perform a subtraction step on the time stamps to determine the value of the difference $\Delta T$. The circuit 400A accesses the stored the values of the separation $\Delta d$, and the value of the distance $D_{RB2}$ between the crossing of the diagnostic light beam 330 with the trajectory TR of the current target 110 and the target location 122 along the X direction. The circuit 400A can therefore rapidly perform a calculation using a simple and fast technique that does not require the use of other software within the sub-controller 400 or within other components of the control system 470. For example, the circuit 400A can access a flight time lookup table that stores a set of velocities V for specific values of the difference ΔT given the value of the separation Δd, and a set of times of arrival to the target location 122 that correlate with various values of $D_{RB2}$ divided by velocity V to quickly output the time of arrival to the sub-controller 400, for use by other components of the control system 470.

The control system 470 also includes a sub-controller 410 specifically configured to interface with the beam delivery system 185, a sub-controller 412 specifically configured to interface with the probe module 300, and a sub-controller 415 specifically configured to interface with the target delivery system 145. Moreover, the control system 470 can include other sub-controllers specifically configured to interface with other components of the light source 100 not shown in FIG. 1.

The control system 470 generally includes one or more of digital electronic circuitry, computer hardware, firmware, and software. The control system 470 can also include memory 450, which can be read-only memory and/or random access memory. Storage device suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The control system 470 can also include one or more input devices 455 (such as keyboard, touch screen, microphone, mouse, hand-held input device, etc.) and one or more output devices 460 (such as speakers and monitors).

The control system 470 includes one or more programmable processors 465, and one or more computer program products 467 tangible embodied in a machine-readable storage device for execution by a programmable processor (such as the processors 465). The one or more programmable processors 465 can each execute a program of instructions to perform desired functions by operating on input data and generating appropriate output. Generally, the processor 465 receives instructions and data from memory 450. Any of the foregoing may be supplemented by, or incorporated in, specially designed ASICs (application-specific integrated circuits).

Moreover, any one or more of the sub-controllers 400, 405, 410, 412, 415 can include their own digital electronic circuitry, computer hardware, firmware, and software as well as dedicated memory, input and output devices, programmable processors, and computer program products. Likewise, any one or more of the sub-controllers 400, 405, 410, 412, 415 can access and use the memory 450, the input devices 455, the output devices 460, the programmable processors 465, and the computer program products 467.

Although the control system 470 is shown as a separate and complete unit, it is possible for each of the components and sub-controllers 400, 405, 410, 412, 415 to be separate units within the light source 100.

Referring to FIG. 5, an exemplary diagnostic system 505 is shown as having a probe module such as an illumination module 500 that includes a single light source 502 that produces, under control of the control system 170, 470, 670, a light beam 510, a set of optical components 515, 517, and a pair of diagnostic light beams 520, 530 that serve as the diagnostic probe 107. The optical components 515, 517 of the set are configured and designed to split the light beam 510 into the two diagnostic light beams 520, 530 as well as direct the diagnostic light beams 520, 530 toward the trajectory TR of the current target 110. In some examples, the optical component is a beam splitter 515 that splits the light beam 510 into diagnostic light beams 520, 530. For example, the beam splitter 515 can be a dielectric mirror, a beam splitter cube, or a polarizing beam splitter. One or more optical components 517 such as reflective optics can be placed to redirect either or both of the diagnostic light beams 520, 530 so that both diagnostic light beams 520, 530 are directed toward the trajectory TR of the current target 110. The set of optical components 515, 517 can include other optical components not shown or in a different configuration from what is shown.

The diagnostic system 505 includes the detection module 535, which is configured to detect the light 540, 550 reflected from the current target 110 as the respective diagnostic light beam 520, 530 strikes the target 110. The detection module 535 can include a device such as a photodiode that converts the light (in the form of photons) into a current, and outputs a voltage that is related to the current. Thus, in this example, the output from the detection module 535 constitutes a one-dimensional voltage signal, which is output to the control system 670. The detection module 535 can also include optical filters, amplifiers, and built-in lenses, as needed. The photodiode generates the current when photons from the light 540, 550 are absorbed in the photodiode and outputs a voltage signal that corresponds to the generated current. The detection module 535 generates as the voltage signal an analog pulse 560 when the light 540 is detected and an analog pulse 570 when the light 550 is detected. These pulses 560, 570 are output from the detection module 535 to the control system 670 for further processing.

As shown, the detection module 535 includes a single device such as a photodiode detector that is able to detect both of the interactions (that is, both the light 540, 550). Such a design that uses a single device reduces complexity and also enables the data to be more efficiently analyzed. In other implementations, the detection module 535 includes one or more photo-transistors, light-dependent resistors, and photomultiplier tubes. In other implementations, the detection module 535 includes one or more thermal detectors such as a pyroelectric detector, a bolometer, or a calibrated charged coupled device (CCD) or CMOS.

Figure 6:
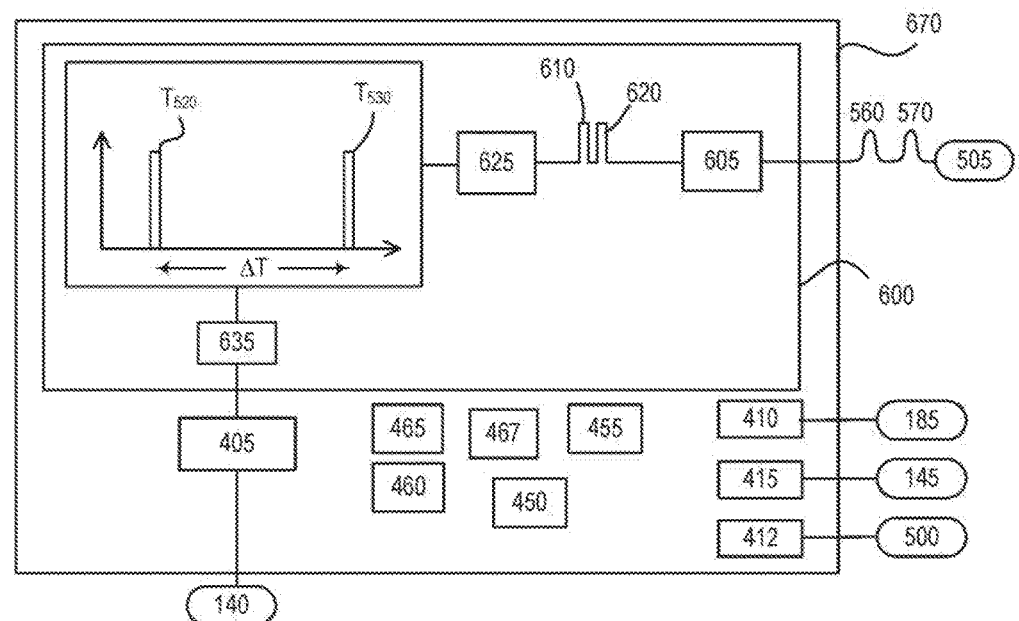
FIG. 6 is a block diagram of an exemplary control system of the EUV light source of FIG. 1.

Referring to FIG. 6, an exemplary control system 670 is shown for processing the output from the diagnostic system 505 to determine a value of the velocity (moving property) of the current target 110 along the X direction. The exemplary control system 670 includes a detection sub-controller 600 that receives the pules 560, 570 from the diagnostic system 505. The detection sub-controller 600 includes a discriminator module 605 that receives the pulses 560, 570 and filters this signal, amplifies this signal, and differentiates it, as needed. At a zero-crossing of the derivative of each current target 110 signal (generated from the pulses 560, 570), the discriminator module 605 generates a digital trigger pulse 610, 620, respectively. The discriminator module 605 can be an electrical circuit that includes a filter and a gain circuit as well as a peak predict circuit with differentiation capabilities.

The detection sub-controller 600 also includes a time module 625 that receives the digital trigger pulses 610, 620 and digitally time stamps each individual trigger pulse 610, 620 as $T_{520}$ and $T_{530}$. The difference between the time stamps $T_{520}$ and $T_{530}$ is given as ΔT. The detection sub-controller 600 includes a moving property module 635 to which the value of ΔT is input. Thus, the detection sub-controller 600 converts the signals associated with the respective light 540, 550 reflected from the current target 110 into respective single data values such as time stamps that can be used for further analysis.

The moving property module 635 also accesses the value of Δd from memory 450, which can be internal to external to the moving property module 635. The moving property module 635 determines the value of the velocity of the current target 110 in the extended target region 115. For example, the moving property module 635 could use the determined value of ΔT and the value of Δd, and compare those values to a set of pre-determined values stored in memory such as memory 450 to determine a value of the velocity of the current target 110. As another example, the moving property module 635 could calculate the average velocity V of the current target 110 along the X direction as Δd/ΔT.

The moving property module 635 can also estimate or determine an acceleration of the current target 110 if assumptions are made about the motion of the current target 110. It is possible to determine trends in the velocity V or the changing velocity V over many targets.

The moving property module 635 also determines the predicted time that the present target 110' (which can be the current target 110) will be at the target location 122 within the target space 120. The moving property module 635 is able to determine the predicted time of arrival of the current target 110 at the target location 122 because the value of the velocity V of the current target 110 has been determined as well as other information about the current target 110 and the diagnostic radiation beam 530 relative to the target location 122. Specifically, the moving property module 635 knows the distance $D_{RB2}$ between the crossing of the diagnostic light beam 530 with the trajectory TR of the current target 110 an the target location 122 along the X direction. The moving property module 635 also knows the time that the current target 110 passed through the path of the diagnostic light beam 530. Thus, it is possible to estimate or determine the arrival of the current target 110 at the target location 120 as being the distance $D_{RB2}$ divided by the velocity V (or $D_{RB2}/V$).

The output from the moving property module 635 is a control signal and is directed to the optical source sub-controller 405, which interfaces with the adjustment system 190 coupled to the optical source 140. The control signal from the moving property module 635 provides instructions that cause the adjustment system 190 to adjust aspects of the optical source 140 to thereby adjust one or more of a timing of a release of the radiation pulse 135 and a direction at which the radiation pulse 1335 travels.

Referring to FIG. 7, in other implementations, an exemplary diagnostic system 705 includes an illumination module 700 that produces as the diagnostic probe 107 three diagnostic light beams 720, 725, 730. The diagnostic light beams 720, 725, 730 are directed toward respective locations 722, 724, 728 along the trajectory TR of the current target 110 to interact with the current target 110 at respective times $T_{722}$, $T_{724}$, $T_{728}$. The respective interactions between the diagnostic light beams 720, 725, 730 and the current target 110 produce light 740, 745, 750. The diagnostic system 705 therefore includes the detection module 735, which is configured to detect the light 740, 745, 750 reflected from the current target 110 as the respective diagnostic light beam 720, 725, 730 interacts with the current target 110. The detection module 735 can include a device such as a photodiode that converts the light into current. The diagnostic system 705 can be coupled to a control system 870, which is a specific implementation of the control system 170 and will be discussed with reference to FIG. 8.

By including a third diagnostic light beam 725, it is possible to determine not only a moving property such as velocity V of the current target 110 along the −X direction, but also to determine a change in the moving property of the current target 110 along the −X direction. Thus, the use of the third diagnostic light beam 725 enables the control system 170 to determine both the velocity V and the acceleration A of the current target 110 along the −X direction.

Additionally, because the third diagnostic light beam 725 is directed toward the trajectory TR at a non-right angle relative to the trajectory TR, the control system 870 is able to determine one or more moving properties (such as the velocity or trajectory) of the current target 110 along a direction that is perpendicular to the −X direction, for example along the Y direction, as discussed below.

The diagnostic light beams 720, 730 are directed along a path that crosses the trajectory TR of the current target 110 at a right (90°) or approximately right angle relative to the −X direction. The diagnostic light beam 725 is directed along a path that crosses the trajectory TR of the current target 110 at a non-right angle (for example, at an angle of approximately 45°) relative to the −X direction. Thus, the diagnostic light beams 720, 730 generally travel along the −Y direction while the diagnostic light beam 725 travels along a direction in a plane defined by the X and Y (generally along −Y and either −X or X directions).

As discussed above, the diagnostic light beams 720, 725, 730 interact with the current target 110 as the current target 110 travels toward the target space 120 and while in the extended target region 115. The diagnostic light beams 720, 725, 730 are separated from each other along the X direction by known distances, as discussed below, and this known information can be used to determine one or more moving properties of the current target 110. For example, the velocity and acceleration of the current target 110 along the −X direction can be determined. Additionally, information about a displacement or motion along the Y direction can also be determined.

Referring to FIG. 8, an exemplary detection sub-controller 800 can be designed as a part of the control system 870 in order to analyze the data obtained from the interaction between the diagnostic system 705 and the current target 110. For example, the detection sub-controller 800 receives pulses 760, 765, 770 output from the diagnostic system 705. The pulses 760, 765, 770 correspond to the analog pulses produced by the detection module 735 when respective light 740, 745, 750 is detected.

The distance between the diagnostic light beams 720, 730 along the X direction is known and can be denoted as Δd1(X). In one example, the separation Δd1(X) is 100 μm. Thus, the diagnostic light beams 720, 730 can be used by the control system 870 to determine the velocity V1 of the current target 110 along the −X direction in the extended target region 115 using, for example, the method discussing above with respect to FIGS. 5 and 6. Specifically, control system 170 determines time stamps $T_{722}$ and $T_{728}$ associated with the light 740, 750 produced from the interaction between the respective diagnostic light beams 720, 730 and the current target 110 at respective locations 722, 728 along the trajectory TR. The control system 870 calculates the difference between these time stamps ΔT1(X). The control system 870 determines the value of the velocity V1 of the current target 110 along the −X direction in the extended target region 115 based on the determined values of ΔT1(X) and Δd1(X). For example, the control system 870 can calculate the velocity V1 of the current target 110 along the X direction as Δd1(X)/ΔT1(X).

Additionally, the control system 870 determines a time stamp $T_{724}$ associated with the light 745 produced from the interaction between the diagnostic light beam 725 and the current target at the location 724 along the trajectory TR. The distance along the −X direction between the diagnostic light beams 720 and 725 at the locations 722, 724 is known and can be denoted as Δd2(X). The distance along the −X direction between the diagnostic light beams 725 and 730 at the locations 724, 728 is also known and can be denoted as Δd3(X). Using this additional information, the control system 870 can calculate a time difference ΔT2(X) between the time stamps $T_{724}$ and $T_{722}$ and a time difference ΔT3(X) between the time stamps $T_{728}$ and $T_{724}$. The control system 870 can therefore determine the velocity V2 of the current target along the −X direction as it travels between location 722 and 724 as Δd2(X)/ΔT2(X), and the velocity V3 of the current target along the −X direction as it travels between location 724 and 728 as Δd3(X)/ΔT3(X).

The diagnostic light beam 725 can be used in combination with one or more of the diagnostic light beams 720, 730 to determine a change in a moving property (for example, an acceleration A) of the current target 110 along the −X direction. Specifically, the control system 870 determines the time stamp $T_{724}$ associated with the light 745 produced from the interaction of the diagnostic light beam 725 and the current target 110 at the location 724. In this way, the velocity V2(X) can be determined for the current target 110 between the diagnostic light beam 720 and the diagnostic light beam 725 based on a difference ΔT2(X) between the time stamps $T_{722}$ and $T_{724}$ and a distance Δd2(X) between the locations 722 and 724. Moreover, the velocity V3(X) can be determined for the current target 110 between the diagnostic light beam 725 and the diagnostic light beam 730 based on a difference ΔT3(X) between the time stamps T724 and T728 and a distance Δd3(X) between the locations 728 and 728. The difference between these two velocities (V2(X)−V3(X)) can be divided by the time difference to obtain the acceleration of the current target 110 along the −X direction. For example, it can be assumed that the current target 110 has the velocity V2(X) at time $T_{724}$ and the velocity V3(X) at time $T_{728}$ and thus the acceleration A can be determined to be (V2(X)−V3(X)/($T_{724}$·$T_{728}$).

As discussed above, the diagnostic light beams 720, 725, 730 produced by the laser source within the illumination module 700 can be Gaussian beams. In this case, the transverse profile of the optical intensity of each diagnostic light beam 720, 725, 730 can be described with a Gaussian function. In such a function, the optical intensity correlates with the transverse distance from the axis of the light beam 720, 725, or 730. Because the Gaussian shape is relatively simple, this particular aspect of the diagnostic light beam 725 can be used to process data obtained from the interaction between the diagnostic light beams 720, 725, 730 and the current target 110.

The diagnostic light beam 725 can be used by the control system 870 to determine a trajectory of the current target 110, specifically, to determine a distance or a velocity that the current target 110 travels along the Y direction. This can be determined because the diagnostic light beam 725 is directed at an angle in a plane defined by the X and Y directions.

As shown in FIG. 9A, the diagnostic light beam 720 crosses the trajectory TR at the location 722. The diagnostic light beam 720 travels along a direction defined by its axis 920A, which generally aligns with the −Y direction. In FIG. 9A, the current target 110 generally aligns with the X direction (is that Y=0) and thus the current target 110 does not have a measurable Y direction component to it. By contrast, in FIG. 9B, the current target 110 is offset from the X direction along the −Y direction by an amount dY. However, because this offset still aligns with the axis 920A of the diagnostic light beam 720, the reflected light 740 from the current target will not change by a significant amount. Moreover, the time at which the reflected light 740 is detected in both examples (FIGS. 9A and 9B) is the same or nearly the same because the interaction between the target 110 and the diagnostic light beam 720 occurs at approximately the same time. It is noted that the intensity of the diagnostic light beam 720 does not change by an amount depending on the distance from the beam waist, but that change may not significant enough to be measurable or to show up as a change in the intensity of the reflected light 740.

By contrast, as shown in FIG. 9C, the diagnostic light beam 725 crosses the trajectory TR at the location 724C and the current target 110 interacts with the diagnostic light beam 725 at the time $T_{724C}$. In this case, the diagnostic light beam 725 travels along a direction that is in the XY plane and its axis 925A has components in both the X and Y directions. Thus, the intensity of the beam 725 decreases according to the Gaussian function along both the X and Y directions. The current target 110 aligns with the −X direction and does not have any appreciable motion along the Y direction. By contrast, as shown in FIG. 9D, the current target 110 is shifted along the Y direction by the distance dY. In FIG. 9D, the diagnostic light beam 725 is directed such that its axis 925A has components in both the X and Y directions, and the offset current target 110 would be interacting with the highest intensity of the light beam 725 at a different location 724D and also at a time $T_{724D}$, which is later than the time $T_{724C}$. Therefore, the detection module 735 detects the reflected light 745D in FIG. 9D at a later time than it would detect the reflected light 745C in FIG. 9C. This difference in time at which the reflected light 745C or 745D is detected by the detection module 735 can be used to determine how far the current target 110 has shifted along the Y direction.

Specifically, if the time difference ΔT2(X) for a current target 110 is greater than the time difference ΔT2(X) for a prior target 110P then this means that the current target 110 has moved along the Y direction relative to the prior target 110P. By contrast if the time difference ΔT2(X) for a current target 110 is less than the time difference ΔT2(X) for a prior target 110P then this means that the current target 110 has moved along the −Y direction relative to the prior target 110P.

Figure 10:
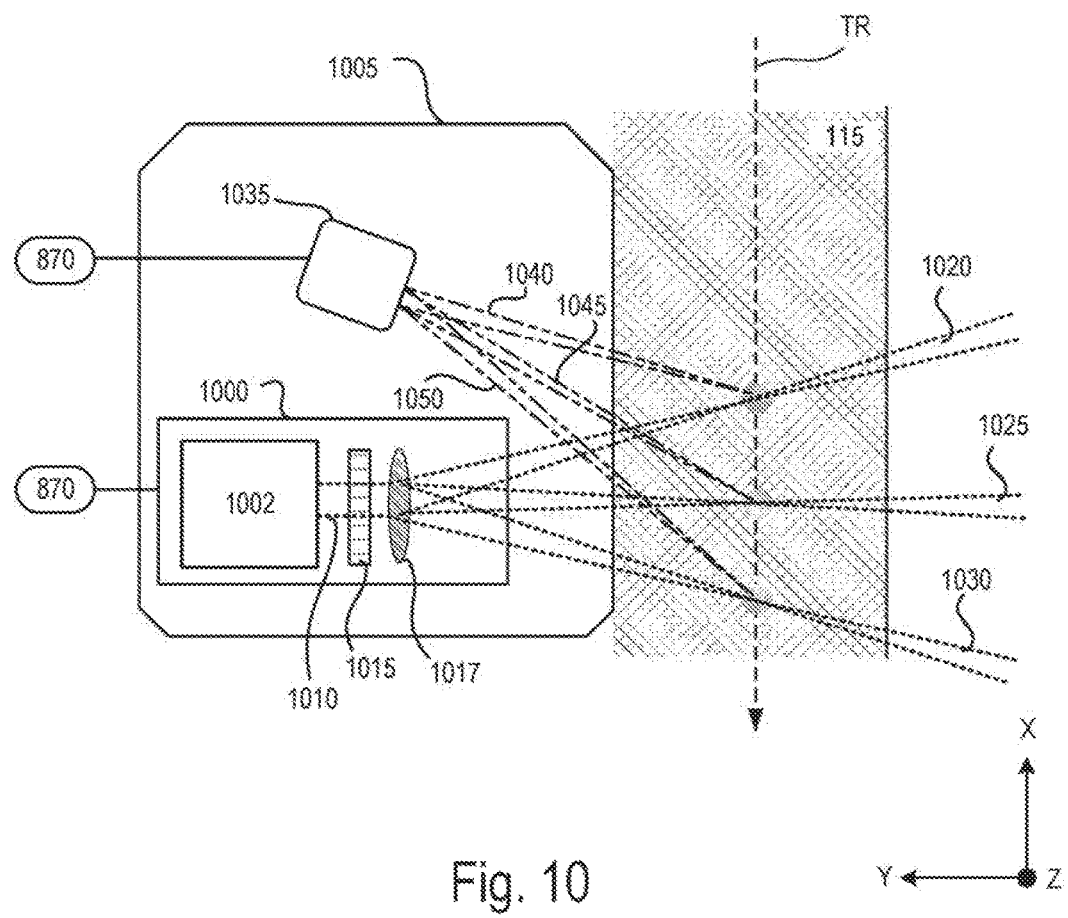
FIG. 10 is a block diagram of an exemplary diagnostic system of the EUV light source of FIG. 1.

Referring to FIG. 10, in other implementations, an exemplary diagnostic system 1005 includes an illumination module 1000 that includes a single light source 1002 that produces a light beam 1010. The diagnostic system 1005 produces a plurality of diagnostic light beams 1020, 1025, 1030 that serve as the diagnostic probe or probes 107. To this end, the illumination module 1000 also includes a diffractive optic 1015 and a refractive optic 1017 such as a focusing lens. The light beam 1010 is directed though the diffractive optic 1015, which spits the light beam 100 into a plurality of light beams, which travel along distinct directions and are directed through the refractive optic 1017 to produce the diagnostic light beams 1020, 1025, 1030. The diagnostic light beams 1020, 1025, 1030 are directed toward the trajectory TR of the current target 110. The diffractive optic 1015 can split the light beam 1010 so that the diagnostic light beams 1020, 1025, 1030 are separated by a set distance (for example, 0.65 mm) at the trajectory TR. Moreover, the refractive optic 1017 can ensure that the foci (or beam waist) of each of the diagnostic light beams 1020, 1025, 1030 overlaps the trajectory TR.

Because of the design of the diffractive optic 1015 and the refractive optic 1017, the diagnostic light beams 1020, 1025, 1030 are directed so that they fan out toward the trajectory TR and intersect the trajectory TR at different and distinct angles. For example, the diagnostic light beam 1025 can intersect the trajectory TR at a right or approximately right angle to the −X direction. The diagnostic light beam 1020 can intersect the trajectory TR at an angle that is less than 90° relative to the −X direction and the diagnostic light beam 1030 can intersect the trajectory TR at an angle that is greater than 90° relative to the −X direction. Each of the diagnostic light beams 1020, 1025, 1030 can be Gaussian beams so that the transverse profile of the optical intensity of each diagnostic light beam 1020, 1025, 1030 can be described with a Gaussian function. The beam waist of each diagnostic light beam 1020, 1025, 1030 can be configured to overlap at the trajectory TR or the −X direction.

The diffractive optic 1015 can be a rectangular or binary phase diffraction grating that produces discrete and spatially spaced replicas of the input light beam 1010. The separation between the diagnostic light beams 1020, 1025, 1030 can be adjusted or customized depending on the rate at which the targets are released from the target delivery system 145 as well as the size and material of the targets. It is also possible to produce more than three diagnostic light beams 1020, 1025, 1030 with the diffractive optic 1015. By producing so many diagnostic light beams, it is possible to record or detect the position of the current target 110 through the extended target region 115, thus allowing for a more accurate determination of the velocity and acceleration of the current target 110 and also provided a tool for understanding the dynamics of the current target 110 as a result of the plasma pushback forces 125.

In some implementations, the diffractive optic 1015 is a binary phase diffraction grating.

The diagnostic system 1005 also includes a detection module 1035 that receives the light 1040, 1045, 1050 reflected from the current target 110 as it passes across the respective diagnostic light beams 1020, 1025, 1030. The detection module 1035 can include a detection device that converts the photons of the light 1040, 1045, 1050 into a current, and outputs a one-dimensional voltage signal based on the current. For example, the detection module 1035 can include a photon detection device such as a photodiode that converts the light 1040, 1045, 1050 into an electrical signal.

Figure 11:
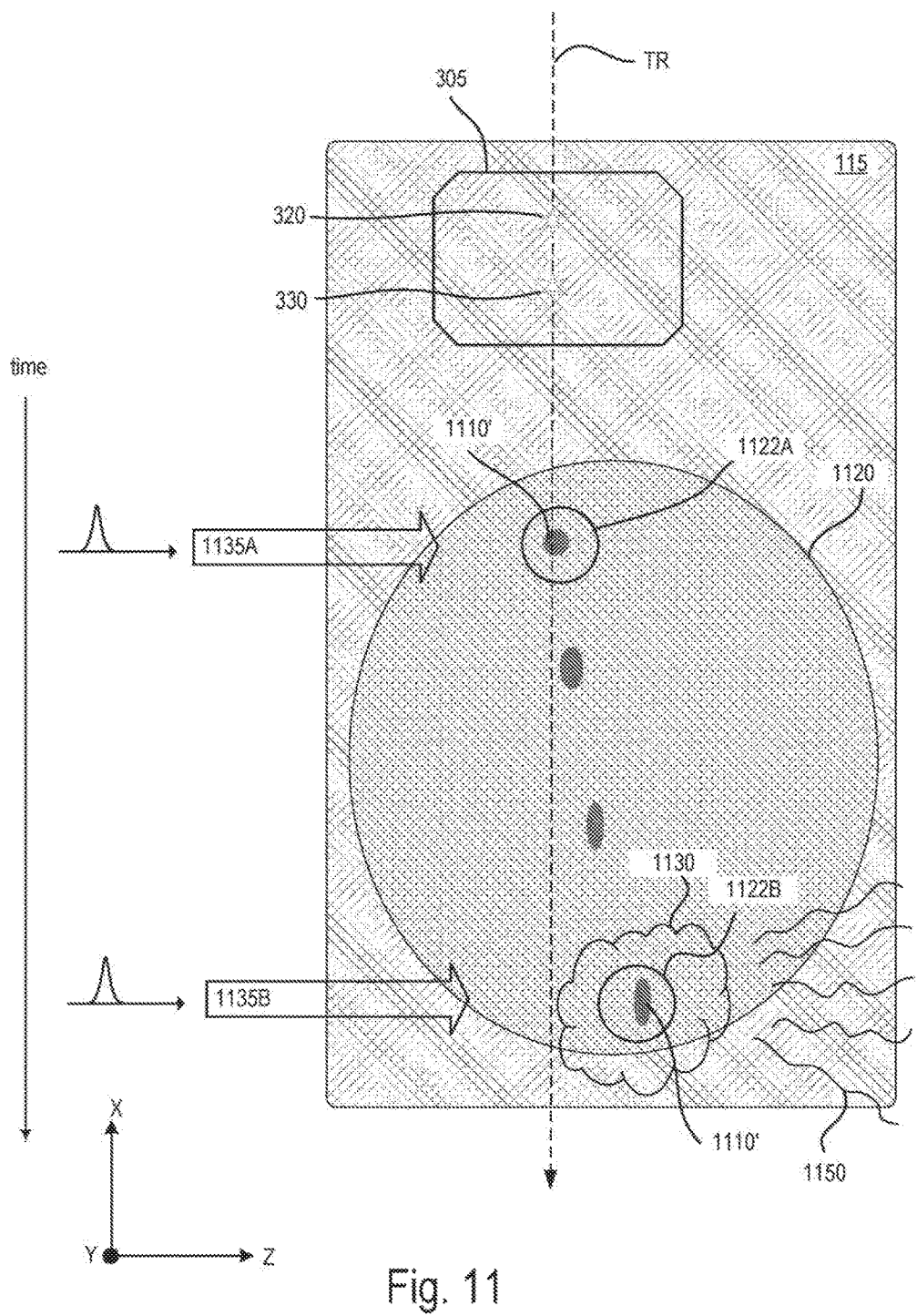
FIG. 11 is a schematic diagram showing a preliminary radiation pulse directed to a first target location and a main radiation pulse directed to a second target location for interaction with the current target of the EUV light source of FIG. 1.

Referring to FIG. 11, in some implementations, the present target 110' interacts with two radiation pulses within the target space 120. For example, the optical source 140 can be configured to supply a preliminary radiation pulse 1135A to a first target location 1122A within a target space 1120 and a main radiation pulse 1135B to a second target location 1122B within the target space 1120. The radiation pulses 1135A, 1135B can be directed along the Z direction.

The interaction between the preliminary radiation pulse 1135A and the present target 1110' at the first target location 1122A causes the present target 1110' to modify its shape so as to deform and to geometrically expand as it moves through the target space 1120. The interaction between the main radiation pulse 1135B and the modified present target 1110' at the second target location 1122B converts at least part of the modified present target 1110' into plasma 1130 that emits EUV light 1150. It is possible for some of the material of the present target 1110' to be converted into plasma when it interacts with the preliminary radiation pulse 1135A. However, the properties of the preliminary radiation pulse 1135A are selected and controlled so that the predominant action on the present target 110' by the preliminary radiation pulse 1135A is the deformation and modification of the geometric distribution of the present target 1110'.

The interaction between the preliminary radiation pulse 1135A and the present target 1110' causes material to ablate from the surface of the present target 1110' and this ablation provides a force that deforms the present target 1110' so that it has a shape that is different than the shape of the present target 1110' prior to interaction with the preliminary radiation pulse 1135A. For example, prior to interacting with the preliminary radiation pulse 1135A, the present target 1110' can have a shape that is similar to a droplet upon exiting the target delivery system 145, while after interaction with the preliminary radiation pulse 1135A, the shape of the present target 1110' deforms so that its shape is closer to the shape of a disk (such as a pancake shape) when it reaches the second target location 1122B. After interaction with the preliminary radiation pulse 1135A, the present target 1110' can be a material that is not ionized (a material that is not a plasma) or that is minimally ionized. After interaction with the preliminary radiation pulse 1135A, the present target 1110' can be, for example, a disk of liquid or molten metal, a continuous segment of target material that does not have voids or substantial gaps, a mist of micro- or nano-particles, or a cloud of atomic vapor.

Additionally, the interaction between the preliminary radiation pulse 1135A and the present target 1110' that causes the material to ablate from the surface of the present target 1110' can provide a force that can cause the present target 1110' to acquire some propulsion or speed along the Z direction, as shown in FIG. 11. The expansion of the present target 1110' as it travels from the first target location 1122A to the second target location 1122B in the X direction and the acquired speed in the Z direction depend on an energy of the preliminary radiation pulse 1135A, and in particular, on the energy delivered to (that is, intercepted by) the present target 1110'.

The optical source 140 can be designed to produce a beam of preliminary radiation pulses 1135A and a beam of main radiation pulses 1135B directed to respective target locations 1122A, 1122B. Moreover, as discussed above, the EUV light source 100 adjusts one or more characteristics of the radiation pulse 135 that is directed to the target space 120 based on the analysis of the determined moving property or properties of the current target 110. Accordingly, it is possible for the EUV light source 100 to adjust one or more characteristics of the preliminary radiation pulse 1135A, one or more characteristics of the main radiation pulse 1135B, or one or more characteristics of both of the preliminary radiation pulse 1135A and the main radiation pulse 1135B.

Figure 12:
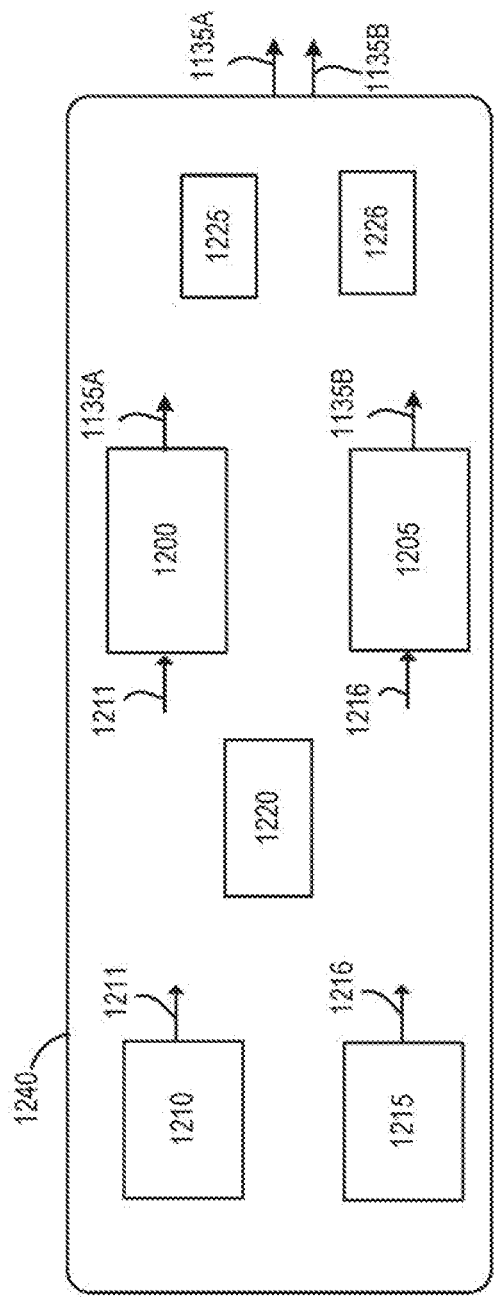
FIG. 12 is a block diagram of an exemplary optical source for use in the EUV light source of FIG. 1.

Referring to FIG. 12, an exemplary optical source 1240 is designed to produce the beam of preliminary radiation pulses 1135A and the beam of main radiation pulses 1135B directed toward their respective target locations 1122A, 1122B within the target space 1120.

The optical source 1240 includes a first optical amplifier system 1200 that includes a series of one or more optical amplifiers through which the beam of preliminary radiation pulses 1135A is passed, and a second optical amplifier system 1205 that includes a series of one or more optical amplifiers through which the beam of main radiation pulses 1135B is passed. One or more amplifiers from the first system 1200 can be in the second system 1205; or one or more amplifiers in the second system 1205 can be in the first system 1200. Alternatively, it is possible that the first optical amplifier system 1200 is entirely separate from the second optical amplifier system 1205.

Additionally, though not required, the optical source 1240 can include a first light generator 1210 that produces a first pulsed light beam 1211 and a second light generator 1215 that produces a second pulsed light beam 1216. The light generators 1210, 1215 can each be, for example, a laser, a seed laser such as a master oscillator, or a lamp. An exemplary light generator that can be used as the light generator 1210, 1215 is a Q-switched, radio frequency (RF) pumped, axial flow, carbon dioxide ($CO_2$) oscillator that can operate at a repetition rate of, for example, 100 kHz.

The optical amplifiers within the optical amplifier systems 1200, 1205 each contain a gain medium on a respective beam path, along which a light beam 1211, 1216 from the respective light generator 1210, 1215 propagates. When the gain medium of the optical amplifier is excited, the gain medium provides photons to the light beam, amplifying the light beam 1211, 1216 to produce the amplified light beam that forms the preliminary radiation pulse beam 1135A or the main radiation pulse beam 1135B.

The wavelengths of the light beams 1211, 1216 or the radiation pulse beams 1135A, 1135B can be distinct from each other so that the radiation pulse beams 1135A, 1135B can be separated from each other, if they are combined at any point within the optical source 1240. If the radiation pulse beams 1135A, 1135B are produces by $CO_2$ amplifiers, then the preliminary radiation pulse beam 1135A can have a wavelength of 10.26 micrometers ($\mu m$) or 10.207 $\mu m$, and the main radiation pulse beam 1135B can have a wavelength of 10.59 $\mu m$. The wavelengths are chosen to more easily enable separation of the beams 1135A, 1135B using dispersive optics or dichroic mirror or beamsplitter coatings. In the situation in which both beams 1135A, 1135B propagate together in the same amplifier chain (for example, a situation in which some of the amplifiers of optical amplifier system 1200 are in the optical amplifier system 1205), then the distinct wavelengths can be used to adjust a relative gain between the two beams 1135A, 1135B even though they are traversing through the same amplifiers.

For example, the beams 1135A, 1135B, once separated, could be steered or focused to two separate locations (such as the first and second target locations 1122A, 1122B, respectively) within the chamber 175. In particular, the separation of the beams 1135A, 1135B also enables the target 1110 to expand after interacting with the beam of preliminary radiation pulses 1135A while it travels from the first target location 1122A to the second target location 1122B.

The optical source 1240 can include a beam path combiner 1225 that overlays the beam of preliminary radiation pulses 1135A and the beam of main radiation pulses 1135B and places the beams 1135A, 1135B on the same optical path for at least some of the distance between the optical source 1240 and the beam delivery system 185. Additionally, the optical source 1240 can include a beam path separator 1226 that separates the beam of preliminary radiation pulses 1135A from the beam of main radiation pulses 1135B so that the two beams 1135A, 1135B can be separately steered and focused within the chamber 175.

Additionally, the beam of preliminary radiation pulses 1135A can be configured to have less pulse energy than the pulse energy of the beam of main radiation pulses 1135B. This is because the preliminary radiation pulses 1135A is used to modify the geometry of the present target 1110' while the main radiation pulse 1135B is used to convert the modified present target 1110' into plasma 1130. For example, the energy of the preliminary radiation pulse 1135A can be 5-100 times less than the energy of the main radiation pulse 1135B.

In some implementations, each optical amplifier system 1200, 1205 includes a set of three optical amplifiers, though as few as one amplifier or more than three amplifiers can be used. In some implementations, each of the optical amplifiers in each system 1200, 1205 includes a gain medium that includes $CO_2$ and can amplify light at a wavelength of between about 9.1 $\mu m$ and about 11.0 $\mu m$, and in particular, at about 10.6 $\mu m$, at a gain greater than 1000. It is possible for the optical amplifiers in each system 1200, 1205 to be operated similarly or at different wavelengths. Suitable amplifiers and lasers for use in the optical amplifier systems 1200, 1205 can include a pulsed laser device such as a pulses gas-discharge $CO_2$ amplifier producing radiation at about 9.3 $\mu m$ or about 10.6 $\mu m$, for example, with DC or RF excitation, operating at relatively high power, for example, 10 kW or higher and high pulse repetition rate, for example, 50 kHz or more. Exemplary optical amplifiers that can be used in each of the systems 1200, 1205 are axial flow high-power $CO_2$ lasers with wear-free gas circulation and capacitive RF excitation.

Additionally, though not required, one or more of the optical amplifier systems 1200 and 1205 can include a first amplifier that acts as a pre-amplifier. The pre-amplifier, if present, can be a diffusion-cooled $CO_2$ laser system.

The optical amplifier system 1200, 1205 can include optical elements that are not shown in FIG. 12 for directing and shaping the respective light beams 1211, 1216. For example, the optical amplifier systems 1200, 1205 can include reflective optics such as mirrors, partially-transmissive optics such as beam splitters or partially-transmissive mirrors, and dichroic beam splitters.

The optical source 1240 also includes an optical system 1220 that can include one or more optics (such as reflective optics such as mirrors, partially reflective and partially transmissive optics such as beamsplitters, refractive optics such as prisms or lenses, passive optics, active optics, etc.) for directing the light beams 1211, 1216 through the optical source 1240.

Although the optical amplifiers can be separate and dedicated systems, it is possible for at least one of the amplifiers of the optical amplifier system 1200 to be in the optical amplifier system 1205 and for at least one of the amplifiers of the optical amplifier system 1205 to be in the optical amplifier system 1200. In such a system in which at least some of the amplifiers and optics overlap between the optical amplifier systems 1200, 1205, it is possible that the beam of preliminary radiation pulses 1135A and the beam of main radiation pulses 1135B are coupled together such that changes of one or more characteristics of the beam 1135A can cause changes to one or more characteristics of the beam 1135B, and vice versa.

Figure 13:
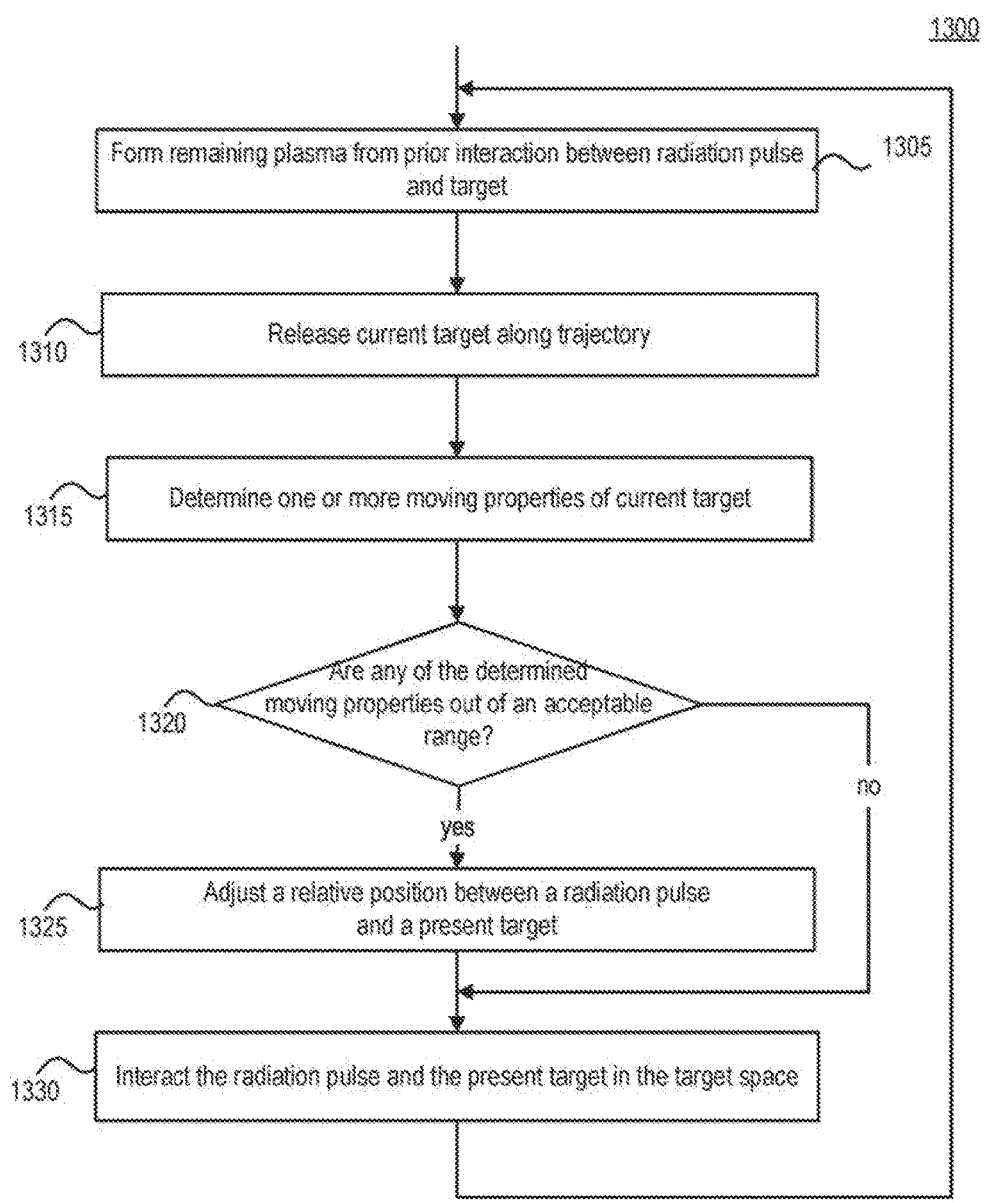
FIG. 13 is a flow chart of an exemplary procedure performed by the EUV light source (under control of the control system) for determining a moving property of a current target in the extended target region.
Figure 14A:
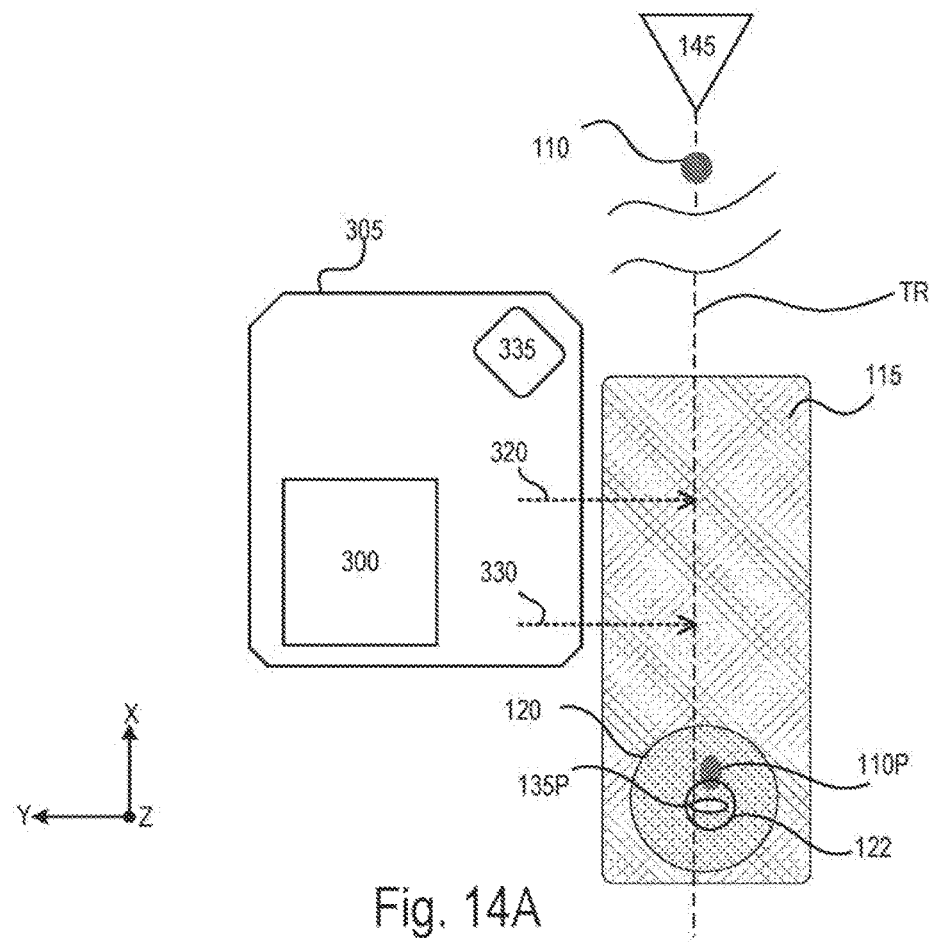
FIG. 14A is a schematic diagram of an exemplary diagnostic system, extended target region, and target space as viewed long the Z direction of the EUV light source of FIG. 1, showing a point in time just before a prior radiation pulse and a prior target interact with each other at a target location within a target space.
Figure 14B:
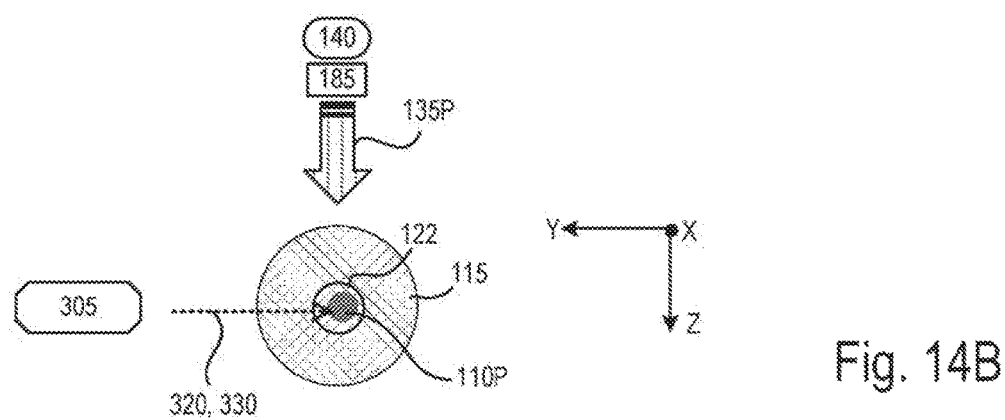
FIG. 14B is a schematic diagram of the exemplary diagnostic system, extended target region, and target space of FIG. 14A as viewed along the X direction, showing the same point in time as FIG. 14A.
Figure 15A:
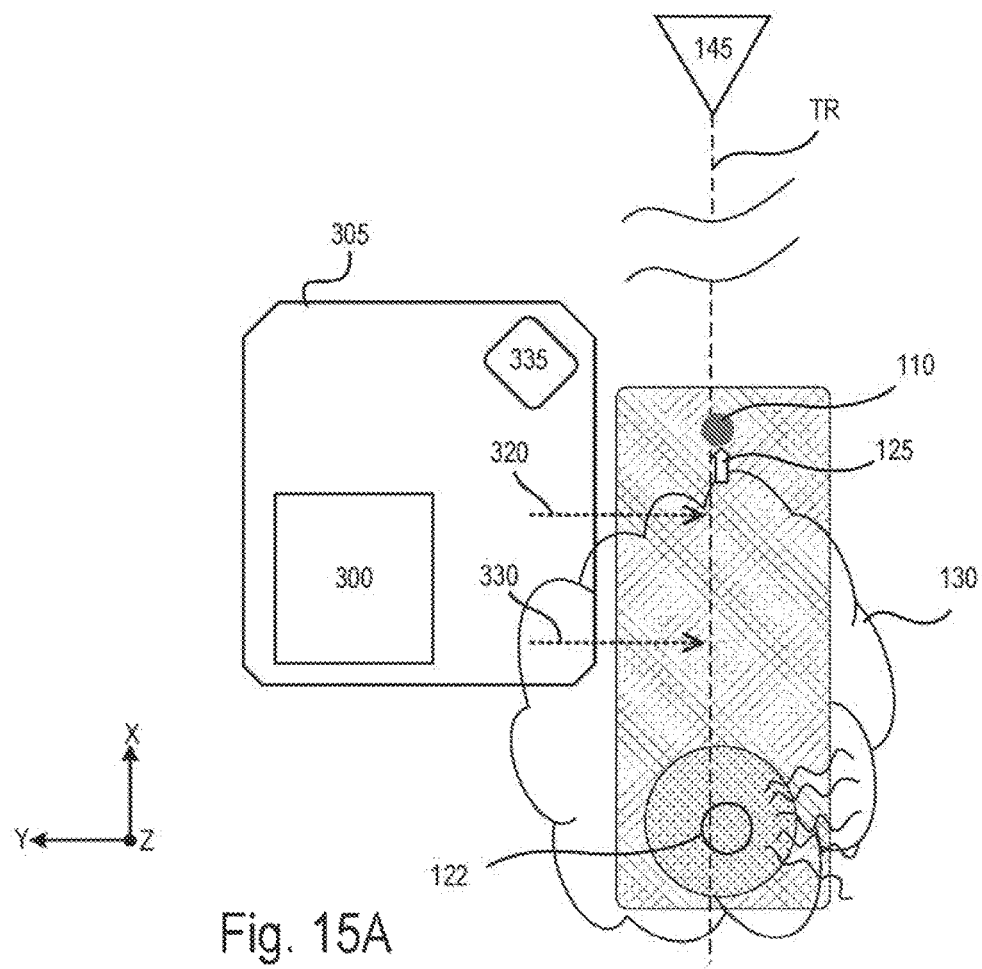
FIG. 15A is a schematic diagram of the exemplary diagnostic system, extended target region, and target space as viewed along the Z direction of the EUV light source of FIG. 1, showing a point in time just after the prior radiation pulse and the prior target interact with each other at the target location within the target space.
Figure 15B:
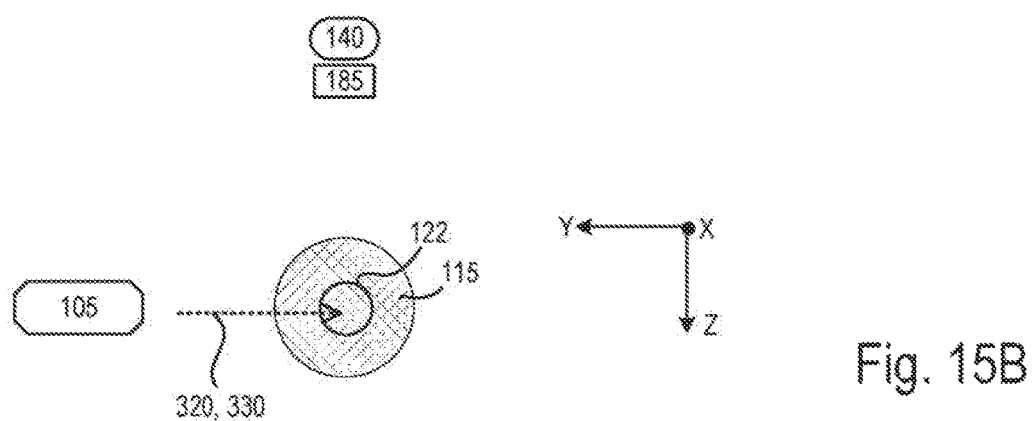
FIG. 15B is a schematic diagram of the exemplary diagnostic system, extended target region, and target space of FIG. 15A as viewed along the X direction, showing the same point in time as FIG. 15A.

Referring to FIG. 13, a procedure 1300 is performed by the EUV light source 100 (under control of the control system 170, 470, 670 or 870) for compensating for plasma pushback forces 125 on a present target 110'. Other procedures not discussed herein can be performed by the EUV light source 100 during operation. The procedure 1300 includes forming the remaining plasma 130 that at least partially coincides with the extended target region 115, the remaining plasma being a plasma formed from an interaction between a prior target 110P and a prior radiation pulse 135P in a target space 120 (1305). As shown in FIGS. 14A and 14B, the prior target 110P is approaching the target location 122 as the prior radiation pulse 135P is approaching the target location 122. After the prior radiation pulse 135P and the prior target 110P have interacted, the remaining plasma 130 is formed and plasma pushback forces 125 are produced, as shown in FIGS. 15A and 15B.

The current target 110 is released from the target delivery system 145 along the trajectory TR toward the target space 120 (1310). The current target 110 can be released (1310) prior to the remaining plasma 130 being formed from the interaction between the prior target 110P and the prior radiation pulse 135P (1305). For example, as shown in FIGS. 14A and 14B, the current target 110 has been released from the target delivery system 145 along the trajectory TR toward the target space 120 (1310).

One or more moving properties of the current target 110 (when the current target 110 is within the extended target region 115) are determined (1315). The moving property of the current target can be determined (1315) by detecting a first interaction between a first diagnostic light beam (such as beam 320) and the current target 110 at a first location (such as location 322) within the extended target region 115, detecting a second interaction between a second diagnostic light beam (such as beam 330) and the current target 110 at a second location (such as location 328) within the extended target region 115. The first diagnostic light beam (such as beam 320) is directed toward the current target 110 at the first location (such as location 322), and the second diagnostic light beam (such as beam 330) is directed toward the current target 110 at the second location (such as location 328).

The first interaction can be detected (for example, at the detection module 335) by detecting at least a portion of the first diagnostic light beam (such as light beam 320) that is reflected from the current target (for example, the light 340 is detected). The second interaction can be detected (for example, at the detection module 335) by detecting a portion of the second diagnostic light beam (such as light beam 33) that is reflected from the current target 110 (for example, the light 350 is detected) by the detection module 335. The moving property or properties of the current target 110 can be determined (1315) based on these detections of the reflected portions.

Figure 16A:
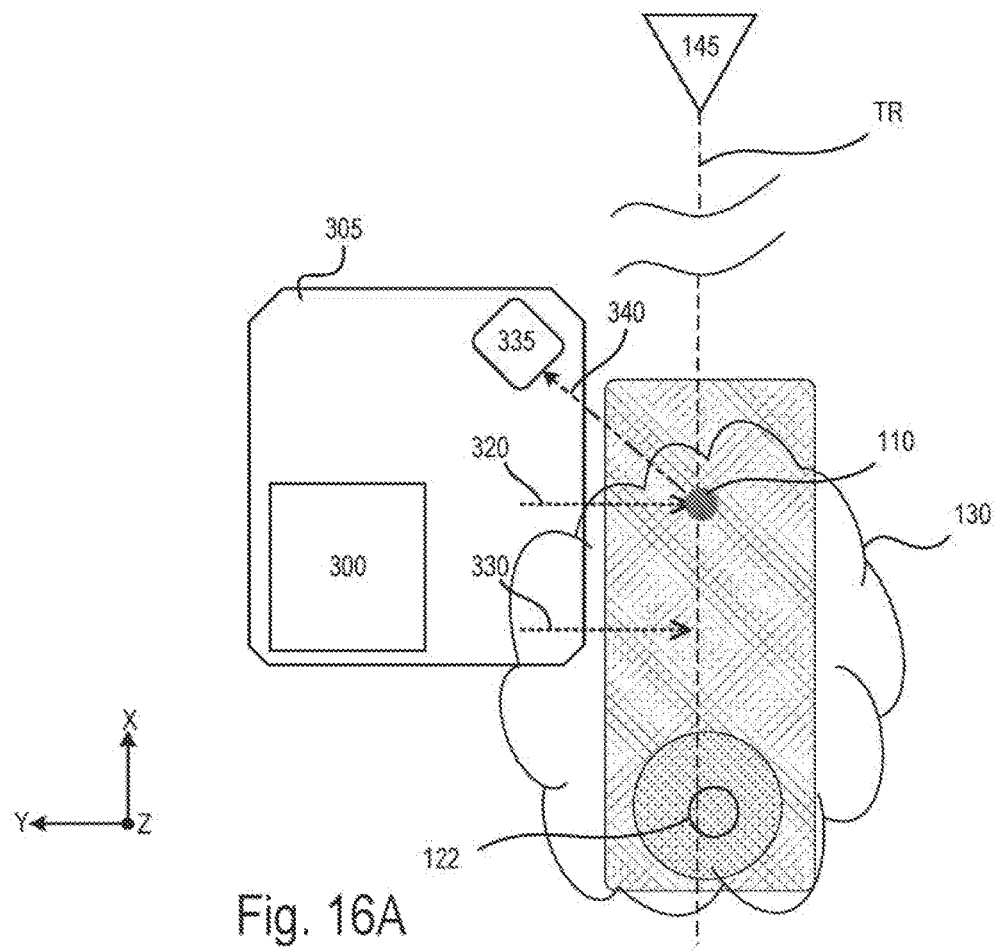
FIG. 16A is a schematic diagram of the exemplary diagnostic system, extended target region, and target space as viewed along the Z direction of the EUV light source of FIG. 1, showing a point in time when the current target interacts with a first diagnostic light beam of the diagnostic system within the extended target region.
Figure 16B:
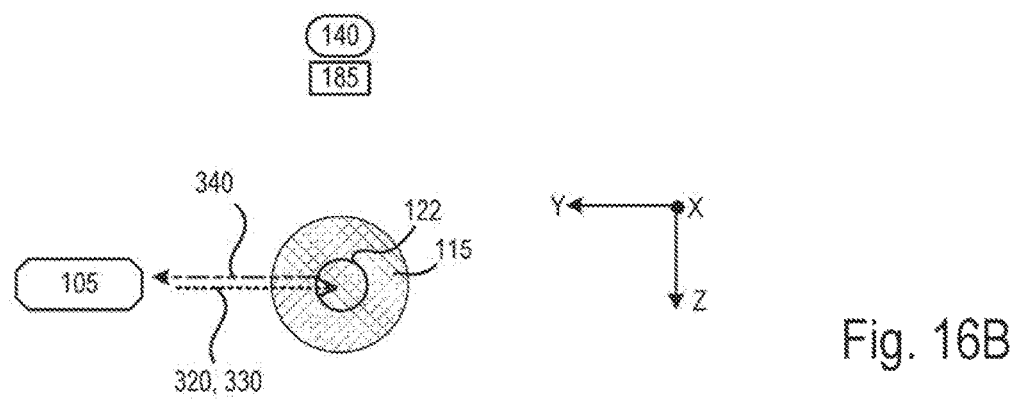
FIG. 16B is a schematic diagram of the exemplary diagnostic system, extended target region, and target space of FIG. 16A as viewed along the X direction, showing the same point in time as FIG. 16A.
Figure 17A:
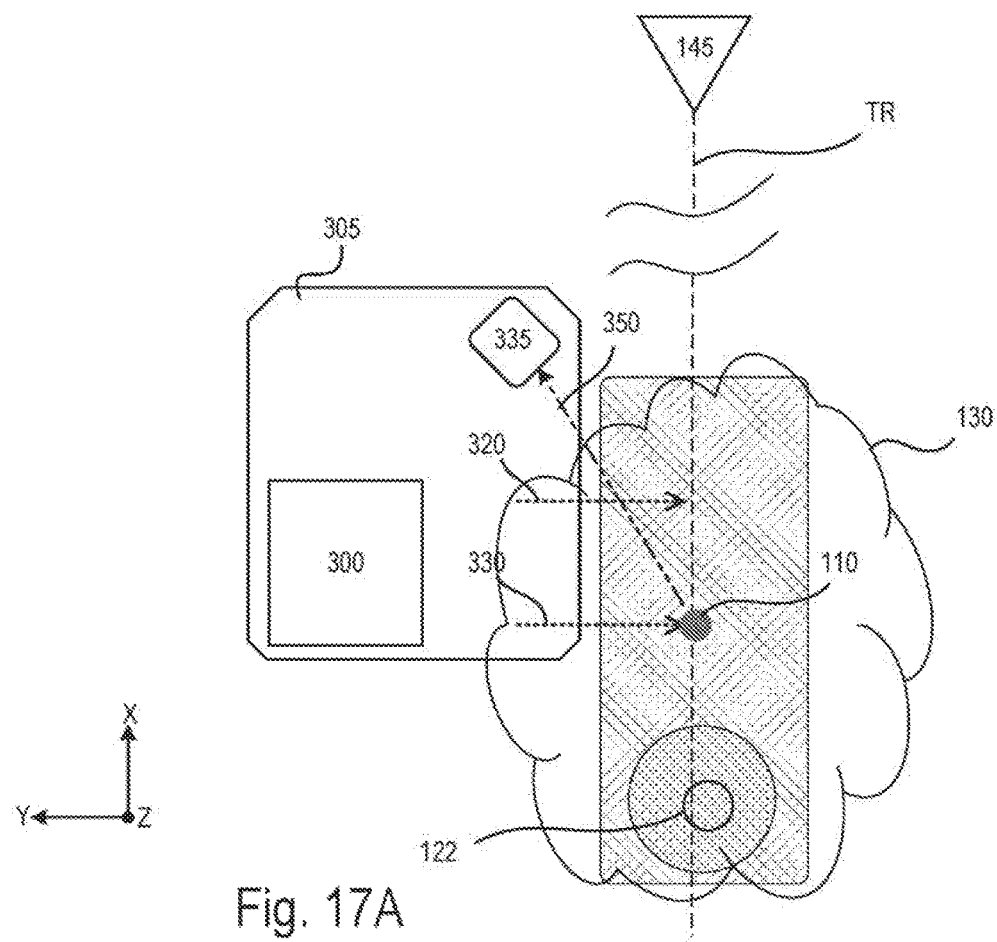
FIG. 17A is a schematic diagram of the exemplary diagnostic system, extended target region, and target space as viewed along the Z direction of the EUV light source of FIG. 1, showing a point in time when the current target interacts with a second diagnostic light beam of the diagnostic system within the extended target region.
Figure 17B:
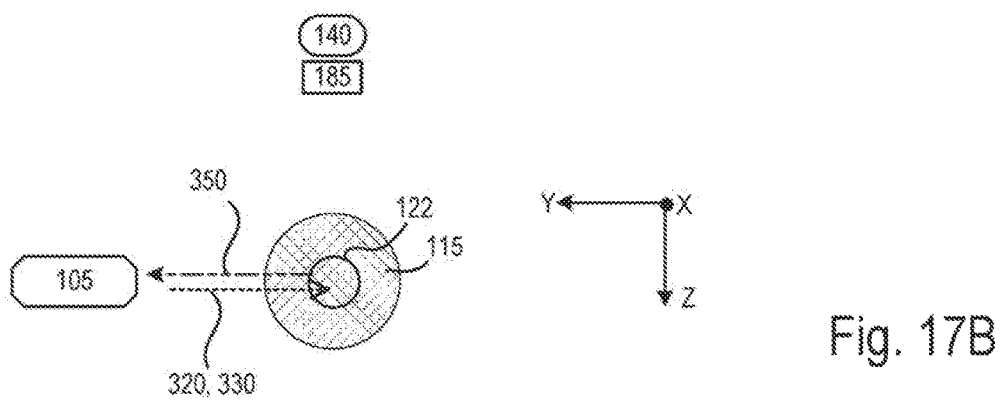
FIG. 17B is a schematic diagram of the exemplary diagnostic system, extended target region, and target space of FIG. 17A as viewed along the X direction, showing the same point in time as FIG. 17A.

For example, with reference to FIGS. 16A-17B, the diagnostic system 305 is used in combination with the control system 170, 470, 670, 870 to determine the one or more moving properties of the current target 110. In FIGS. 16A and 16B, the current target 110 interacts with the diagnostic light beam 320, and the light 340 from that interaction is detected by the detection module 335. In FIGS. 17A and 17B, the current target 110 then interacts with the diagnostic light beam 330, and the light 350 from that interaction is detected by the detection module 335. The detection module 335 outputs the data to the control system 170, 470, 670, 870 for processing, as discussed above, to determine the one or more moving properties of the current target 110.

Figure 18A:
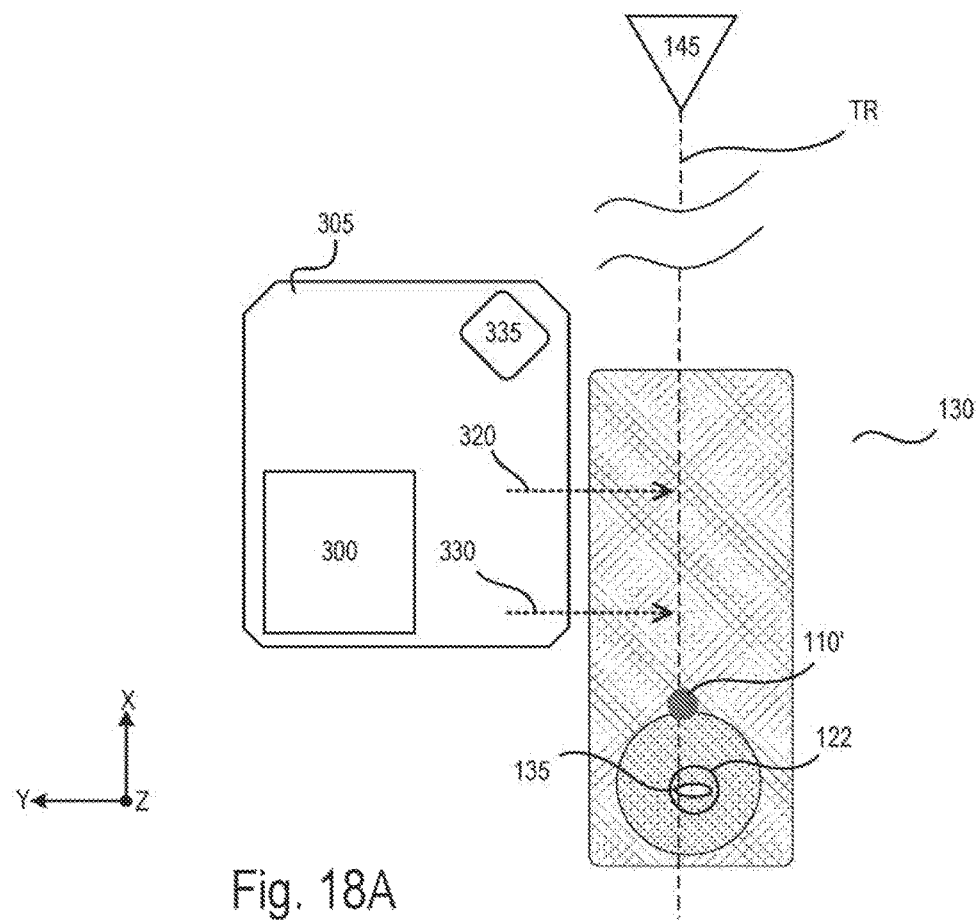
FIG. 18A is a schematic diagram of the exemplary diagnostic system, extended target region, and target space as viewed along the Z direction of the EUV light source of FIG. 1, showing a point in time after the current target has interacted with the second diagnostic light beam in the extended target region and during which the current radiation pulse is being directed to the target space.
Figure 18B:
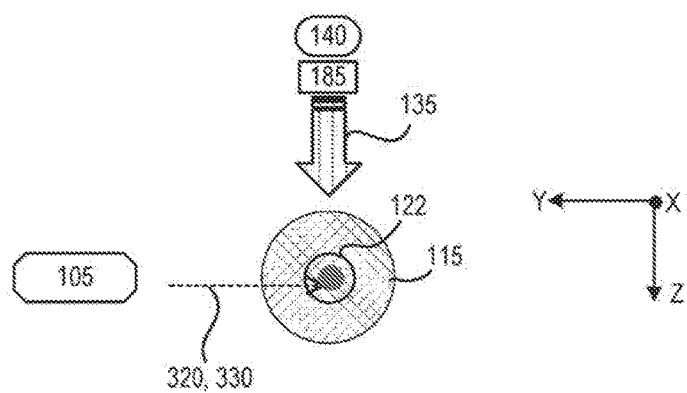
FIG. 18B is a schematic diagram of the exemplary diagnostic system, extended target region, and target space of FIG. 18A as viewed along the X direction, showing the same point in time as FIG. 18A.
Figure 19A:
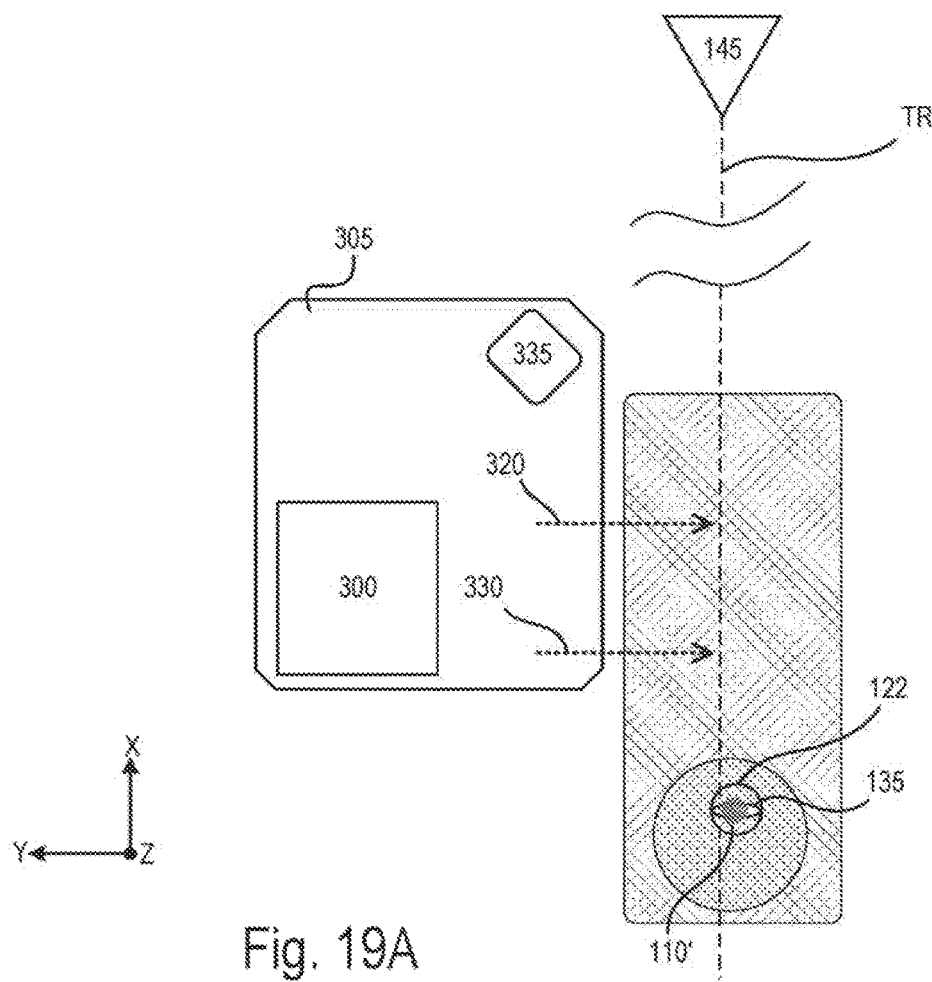
FIG. 19A is a schematic diagram of the exemplary diagnostic system, extended target region, and target space of the EUV light source of FIG. 1 as viewed along the Z direction, showing a point in time during which the current target is interacting with the current radiation pulse in the target space.
Figure 19B:
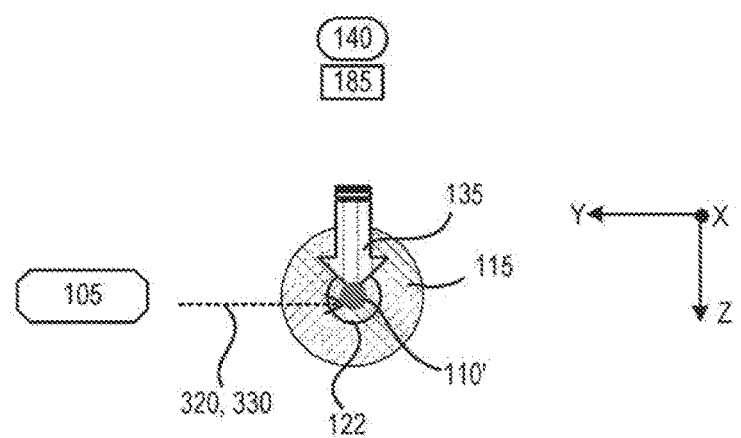
FIG. 19B is a schematic diagram of the exemplary diagnostic system, extended target region, and target space of FIG. 19A as viewed along the X direction, showing the same point in time as FIG. 19A.

The control system 170, 470, 670, 870 determines whether any of the determined moving properties are outside of an acceptable range (1320). If any of the moving properties is out of an acceptable range (1320), then the control system 170, 470, 670, 870 adjusts on or more characteristics of the radiation pulse 135 (for example, one or more characteristics of one or more of the preliminary radiation pulse 1135A and the main pulse 1135B) to thereby control a relative position between the radiation pulse 135 and the present target 110' based on the determined moving property or properties of the current target 110 (1325). The radiation pulse 135 (which may have been adjusted at 1325) is directed toward the target space 120 so that the radiation pule 135 and the present target 110' interact in the target space 120 (1330). For example, as shown in FIGS. 18A and 18B, the present target 110' is approaching the target location 122 within the target space 120 and the adjustments have been made to the radiation pulse 135, which is also directed toward the target location. And, as shown in FIGS. 19A and 19B, the present target 110' is interacting with the current radiation pulse 135 at the target location 122.

The moving property or properties that can be determined (1315) include one or more of a speed, velocity, direction, acceleration, or location of the current target 110 along any of the directions X, Y, or Z of the three dimensional coordinate system.

Figure 19C:
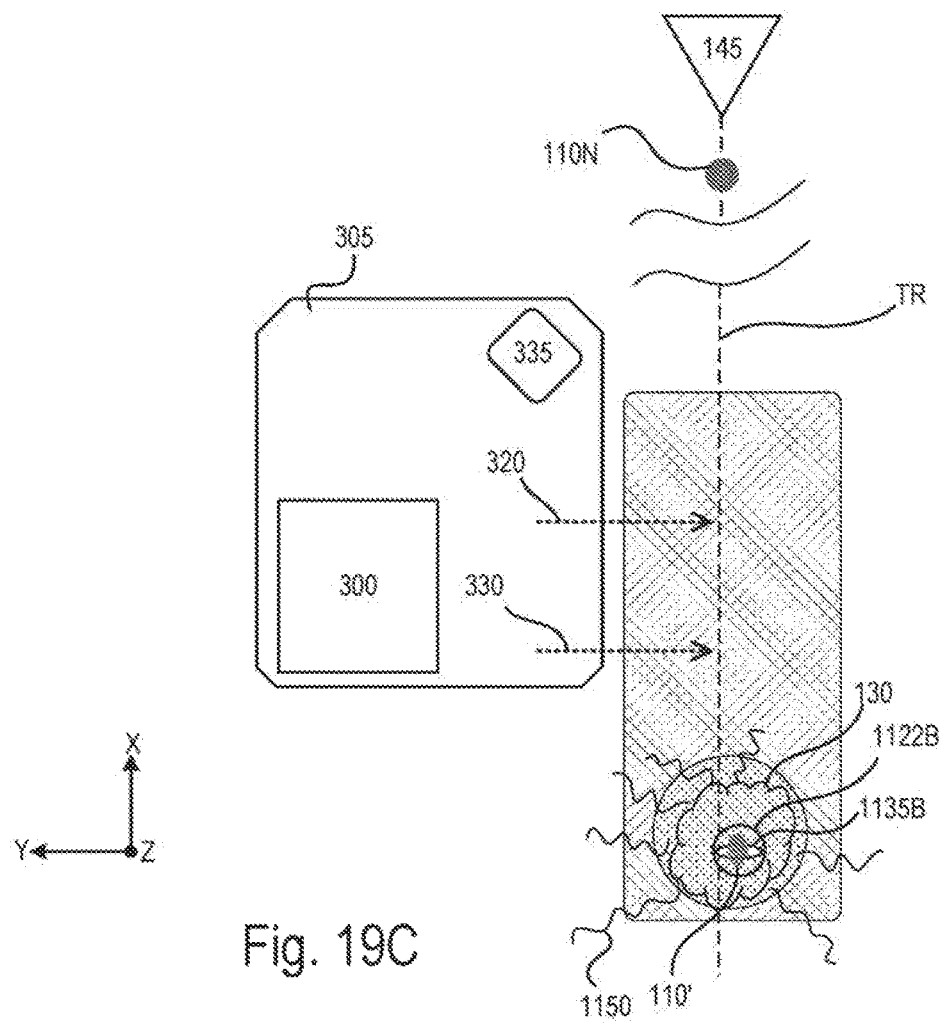
FIG. 19C is a schematic diagram of the exemplary diagnostic system, extended target region, and target space of the EUV light source of FIG. 1, as viewed along the Z direction, showing a point in time during which the current target is interacting with a current main radiation pulse in the target space and producing EUV light.
Figure 19D:
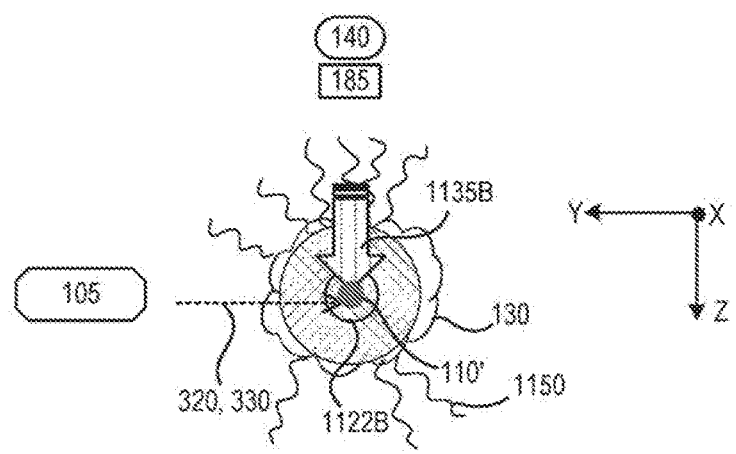
FIG. 19D is a schematic diagram of the exemplary diagnostic system, extended target region, and target space of FIG. 19C as viewed along the X direction, showing the same point in time as FIG. 19C.

In some implementations, such as shown in FIG. 11, the radiation pulse 135 can be a preliminary radiation pulse 1135A that delivers the energy to the present target 110' to modify a geometric distribution of the present target 110'. If this occurs, then the procedure 1300 can also include, after directing the current preliminary radiation pulse 1135A toward the present target 110', directing a main radiation pulse 1135B toward the present target 110' to thereby convert at least part of the present target 110' into plasma that emits EUV light 1150. FIGS. 19C and 19D show the interaction between the main radiation pulse 1135B and the present target 110' to produce the EUV light 1150.

The procedure 1300 can also include analyzing the one or more moving properties that were determined (1315). For example, the control system 170, 470, 670, 870 can determine the velocity of the current target 110 along the –X direction and predict when the present target 110' will reach the target location 122. The control system 170, 470, 670, 870 can adjust when the radiation pulse 135 is released or it can adjust the direction of the radiation pulse 135 so that the radiation pulse 135 and the present target 110' efficiently interact at the target location 122 (1325). This adjustment to the relative position between the radiation pulse 135 and the present target 110' is therefore based on the analysis of the determined moving property of the current target 110.

As also shown in FIG. 19C, the next current target 110N is released at a point in time in accordance with the rate at which the targets 110 are released from the target delivery system 145.

In some implementations, the acceleration A of the current target 110 can be determined (1315) as well as the velocity V. In such implementation, the determination (1315) would additionally include detecting a third interaction between a third diagnostic light beam and the current target at a third location within the extended target region, the third location being distinct from the first and second locations. For example, as shown in FIGS. 20A and 20B, the current target 110 is directed toward the target space 120, and, while in the extended target region 115, the current target 110 would interact sequentially with the diagnostic light beams 720, 725, 730 at respective locations 722, 724, 728. As discussed above, the resultant light 740, 745, 750 is detected by the detection module 735, which outputs data that is analyzed by the control system 170, 470, 670, 870, which can use the data to determine the acceleration A as well as the velocity V of the current target 110. Additionally, the control system 170, 470, 670, 870 can use the additional information obtained from the interaction between the current target 110 and the third diagnostic beam 725 to determine one or more moving properties of the current target 110 along a direction (such as the Y direction) perpendicular to the −X direction.

Referring again to FIG. 3, in other implementations, the detection module 335 of the diagnostic system 305 is designed to detect, additionally or alternatively, a two-dimensional representation (such as an image) of the light 340 and 350 produced from the interaction between respective diagnostic light beams 320 and 330 and the target 110 at the distinct diagnostic locations 322 and 328. To this end, the detection module 335 includes an image recording device (such as a camera), as discussed below. Moreover, it is possible to implement the detection of two-dimensional representations of the light 540, 550 and 740, 745, 750 in the respective detection modules 535 and 735 as well. In some implementations, the control system 170, 470, 670, 870 can analyze the two-dimensional representation to determine all of the moving properties of the target 110 without the need for analyzing the one-dimensional aspect (such as the intensity of the light).

Alternatively, it is possible to configure a diagnostic system 105 to detect and record two-dimensional representations and use only the information from these two-dimensional representations to determine one or more moving properties of the target 110. Initially, designs that use only two-dimensional representations are described and discussed below with reference to FIGS. 24 to 26, followed by a description and discussion of designs that use both the two-dimensional representations as well as the one-dimensional aspect (such as the intensity of the light) with reference to FIG. 27.

An exemplary design of a diagnostic system 2105 that is configured to detect a two-dimensional representation (such as an image) of the light produced from the interaction between a diagnostic probe (for example, a light beam) and the target 110 is shown in FIG. 21A, and is described next. By detecting a two-dimensional representation of the light, the diagnostic system 2105 provides enough information to the control system 170 to enable all of the diagnostic capabilities, as discussed next. The diagnostic system 2105 is configured to detect the two-dimensional representation of the light produced from the interactions between the diagnostic probe and each target 110 that is emitted from the target delivery system 145.

For example, the control system 170 can determine a position of the current target 110 along any of the X, Y, and Z directions of the three dimensional coordinate system within close range (for example, 1 mm) of a focus of the current radiation pulse 135. The control system 170 can determine a velocity of the current target 110 along any of the X, Y, and Z directions, and at the same time adjust one or more characteristics of the radiation pulse 135 that interacts with the present target 110' prior to another target 110 entering the extended target region 115. This detection and analysis can be performed for every target 110 and if the actuation system for modifying the radiation pulse 135 is fast enough, the feedback control can be performed on the same target 110 for which detection and analysis is performed. The control system 170 can determine the moving properties (such as the position) of the current target 110 along any of the X, Y, or Z directions. The control system 170 can determine the moving property or properties of each target 110 along any or all of the X, Y, and Z directions, and adjust one or more characteristics of the radiation pulse 135 that interacts with the present target 110' for each target 110 that enters the extended target region 115. Thus, this determination and adjustment is made at a repetition rate that is greater than or equal to the rate at which targets 110 are released from the target delivery system 145. For example, this repetition rate can be at least 50 KHz. This means that the determination of the moving properties of the current target 110 and the adjustment of the radiation pulse 135 that interacts with the present target 110' occurs within a 20 µs time frame. The control system 170 can determine dynamics and motion of the target 110 near the focus of the radiation pulse 135 to observe effects of the plasma pushback forces 125 on the target 110.

The diagnostic system 2105 includes a probe module 2100 that is designed to produce at least two diagnostic probes 2120, 2130. While only two diagnostic probes 2120, 2130 are shown in FIG. 21A, it is possible for more than two to be used. A diagnostic probe 2120 or 2130 can interact with the target 110 at one or more locations along its trajectory TR and at one or more times. For example, the diagnostic probe 2120 can interact with the target 110 at a first location $L_{TR1}$ and a first time $T_{2120}$, and the diagnostic probe 2130 can interact with the target 110 at a second location $L_{TR2}$ and a second time $T_{2130}$. As another example, the diagnostic probe 2120 can interact with the target 110 at both the first time $T_{2120}$ and the second time $T_{2130}$, and the diagnostic probe 2130 can interact with the target 110 at both the first time $T_{2120}$ and the second time $T_{2130}$.

The probe module 2100 can be an imaging module that produces diagnostic light beams as the diagnostic probes 2120, 2130. In some implementations, the probe module 2100 is a laser source that produces, as the diagnostic probes 2120, 2130, diagnostic laser beams. The wavelength of the diagnostic probes 2120, 2130 impacts or affects other aspects of the interaction with the target 110. For example, the wavelength of the diagnostic probes 2120, 2130 can impact whether the target 110 is scattered. As another example, any one or more of the responsivity, the optical resolution, the sampling rate, the frame rate, and the exposure time of the detection module 2135 (discussed below) depends on the wavelength of the diagnostic probes 2120, 2130.

The diagnostic laser beams can have a wavelength that is distinct from the wavelength of the radiation pulse 135 and can have a power that is low enough to prevent or reduce any interference between the diagnostic light beam 2120, 2130 and the target 110. The wavelength of the diagnostic probes 2120, 2130 is also selected to avoid or reduce overlap with the emission lines of plasma 130 produced in the target space 120. The wavelength of the diagnostic probes 2120, 2130 should be selected to match with or coincide with the wavelength bands of any of the optical elements through which the diagnostic probes 2120, 2130 are directed. Moreover other aspects, such as the beam quality, stability, power level, of the diagnostic probes 2120, 2130 can be selected or adjusted depending on the application. The wavelength of the diagnostic probes 2120, 2130 is selected to enable a high signal to noise ratio that is recorded by the detection module 2135 (discussed below). For example, the wavelength of the diagnostic light beam 2120, 2130 can be in the infrared region, such as about 1030 nm, and can have a power of about 9.6 W. The diagnostic light beams 2120, 2130 can be laser light. In other examples, the wavelength of the diagnostic light beam 2120, 2130 is in the visible region.

The diagnostic light beams 2120, 2130 can be collimated beams of light (as shown in FIGS. 24 and 25) or can be beams of light that are focused on or near the trajectory TR (as shown in FIGS. 26 and 27). The diagnostic light beams 2120, 2130 can be directed along a direction that is in a plane defined by the X and Y directions (the XY plane). As shown in the example of FIG. 21A, the diagnostic light beams 2120, 2130 are directed along the −Y direction. The diagnostic light beams 2120, 2130 can overlap with each other depending on their directions. Moreover, it is possible for the diagnostic light beams 2120, 2130 to overlap with each other (as shown in FIG. 24) or to overlap with the target 110 at a plurality of locations and times as it travels along a distance along the trajectory TR, as shown in FIGS. 24 and 25.

The probe module 2100 can be an adjustable continuous wave laser producing diagnostic light beams 2120, 2130 at an infrared wavelength for example, between 1020 nm and 1070 nm, and a power of up to 50 W, with a beam quality of $M^2$ approaching 1. The laser can be a fiber laser source. In other implementations, the probe module 2100 can be a pulsed laser.

In some implementations, the diagnostic light beams 2120, 2130 can be continuously produced as a curtain that crosses the trajectory TR. In other implementations, the diagnostic light beams 2120, 2130 are produced only at certain times, for example, only when the target 110 is expected to be at a specific location along the trajectory TR. In this case, the probe module 2100 can be triggered (or pulsed) by a timing signal from the control system to produce one or more diagnostic light beams 2120, 2130 at specific times.

The diagnostic system 2105 also includes a detection module 2135 that records one or more two-dimensional representations 2141, 2151 of light 2140, 2150 that is produced due to the interaction between the current target 110 and one or more of the diagnostic probes 2120, 2130 as the target 110 travels along the trajectory TR through the extended target region 115. The detection module 2135 includes one or more two-dimensional recording devices 2135A, 2135B for recording the two-dimensional representations 2141, 2151. The detection module 2135 can also include other optical elements such as imaging lenses or mirrors, as needed, as discussed below.

Although only two recording devices 2135A, 2135B are shown in FIG. 21A, more than two or only one recording device can be used, depending on the application. Specifically, at least two recording devices 2135A, 2135B are used in order to gather enough information about the motion of the target 110 to reconstruct the trajectory of the target 110 in all three directions (X, Y, and Z). If reasonable assumptions regarding the acceleration of the target 110 are made, then the trajectory of the target 110 in all three directions (X, Y, and Z) can be reconstructed with just one recording device.

In some implementations in which the diagnostic probes 2120, 2130 are light beams, the light 2140, 2150 that is produced is the diagnostic light beam 2120, 2130 that traverses or passes across the target 110, such traversed light including a shadow of the target 110 obscuring at least a portion of the diagnostic light beam, as shown in FIG. 24. This sort of arrangement produces shadows within the traversed light beam as the two-dimensional representations 2141, 2151 and can be considered a shadowgraph arrangement. In such an implementation, the two-dimensional recording device 2135A, 2135B can be arranged on a side of the target trajectory TR that is opposite to the side on which the probe module 2100 is arranged.

In other implementations in which the diagnostic probes 2120, 2130 are light beams, the light 2140, 2150 that is produced is the light that is scattered or reflected from the current target 110 as it travels along its trajectory TR, as shown in FIGS. 25-27. In such an implementation, the two-dimensional recording device 2135A, 2135B can be arranged on a side of the target trajectory TR that is the same side on which the probe module 2100 is arranged.

Each two-dimensional recording device 2135A, 2135B can be a camera that captures the two-dimensional representation 2141, 2151 (which can be considered an image) of the light 2140, 2150. Thus, for example, the two-dimensional recording device 2135A, 2135B includes a two-dimensional array of thousands or millions of photo-sites (or pixels). The light 2140, 2150 is directed onto the photo-sensitive area of each pixel where it is converted into electrons that are collected into a voltage signal and the array of these signals forms the two-dimensional image 2141, 2151. The recording device 2135A is arranged so that its two-dimensional array is in a plane defined by the following two areas: a first axis, which is the Z direction, and a second axis, which is an axis lying in the XY plane. Thus, the normal to the two-dimensional array of the recording device 2135A is in the XY plane. As shown in the example of FIG. 21A, the recording device 2135A is arranged so that its two-dimensional array is in the XZ plane and its normal is along the Y direction. Similarly, the recording device 2135B is arranged so that its two-dimensional array is in a plane defined by a first axis which is the Z direction and a second axis, which is an axis in the XY plane. Thus, the normal to the two-dimensional array of the recording device 2135B is in the XY plane. As shown in the example of FIG. 21A, the recording device 2135B is also arranged so that its two-dimensional array is in the XZ plane and its normal is along the Y direction. Other exemplary arrangements are shown below.

The two-dimensional recording device 2135A, 2135B can be controlled by the control system 170 to record an image at a specific time. The two-dimensional recording device 2135A, 2135B sends the representations 2141, 2151 to the control system 170 for analysis. The control system 170 analyzes the two-dimensional representations 2141, 2151 to determine moving properties of the target 110 along one or more of the X, Y, and Z directions.

The recording devices 2135A, 2135B should be "high speed" cameras that are fast enough to detect, record, and output the two-dimensional image 2141, 2151 of the light 2140, 2150 for a current target 110 before the next target enters the extended target region 115 but after the prior target 110P has interacted with the prior radiation pulse 135P. The frame rate of the camera should be greater than or equal to the rate at which the target delivery system 145 generates targets to enable the diagnostic system 2105 to perform an analysis on every target directed toward the target space 120. Thus, if the target delivery rate is 50 kHz, then the frame rate of the camera should be greater than or equal to 50 kHz. An example of a suitable high speed camera 2135A, 2135B is a complementary metal-oxide semiconductor (CMOS). The cameras can have an exposure time of about 300 µs, an exemplary resolution of about 1696×1710 pixels, a pixel size of about 8 µm, and a gain of 1.0.

In other implementations, the camera 2135A, 2135B is a charged coupled device (CCD) or infrared camera.

As discussed herein, the diagnostic system 2105 is useful for determining the moving properties of the target 110 in the extended target region 115. Nevertheless, the diagnostic system 2105 can be useful for determining the moving properties of the target 110 at locations other than those within the extended target region 115. Thus, in other implementations, the diagnostic system 2150 is set up in a region outside of the extended target region 115. For example, in such an implementation, the diagnostic system 2105 is set up so that the diagnostic probes 2120, 2130 interact with the target 110 either completely or partially in the first region 165, which is between the extended target region 115 and the target delivery system 145. The first region 165 can be considered as a region in which the plasma pushback forces 125 have a much lower or insignificant effect on the current target 110.

As discussing above, the target 110 interacts with one or more of the diagnostic probes 2120, 2130 at two locations, namely, the first location $L_{TR1}$ at the first time $T_{2120}$ and the second location $L_{TR2}$ at the second time $T_{2130}$. By performing an interaction between the target 110 and one or more diagnostic probes 2120, 2130 at two locations, the control system 170 can derive the position P1(X,Y,Z) of the target 110 in the X, Y, and Z directions of the chamber 175 at the location $L_{TR1}$ and the position P2(X,Y,Z) of the target 110 in the X, Y, and Z directions of the chamber 175 at the location $L_{TR2}$. Specifically, the positions P1(X,Y,Z) and P2(X,Y,Z) of the target 110 within the chamber 175 can be determined by first identifying the location of one or more regions of interest (ROI) within the two-dimensional images 2141, 2151 captured by the sensors of the recording devices 2135A, 2135B. The positions P1(X,Y,Z) and P2(X,Y,Z) of the target 110 are calculated using one or more of the following data: the one or more regions of interest (ROIs) in the recorded images, the time that the target 110 crosses the first location $L_{TR1}$ (which corresponds to the time that the target 110 interacts with the diagnostic probe 2120), the time that the target 110 crosses the second location $L_{TR2}$ (which corresponds to the time that the target 110 interacts with the diagnostic probe 2130), and the respective planes of the sensors of the recording devices 2135A, 2135B. The plane of the sensor 2135A is defined by two lines: a line along the Zs direction, which is parallel with the Z direction of the chamber 175, and a line along a direction in the Xs-Ys plane, in which the Xs direction is parallel with the X direction of the chamber 175 and the Ys direction is parallel with the Y direction of the chamber 175.

With reference to FIG. 21B, the one or more regions of interest (ROIs) within an image correspond to the pixels in the image at which the light 2140, 2150 strikes the sensor of the respective recording devices 2135A, 2135B. For example, with reference to FIG. 21B, an exemplary representation 2151 captured by the camera 2135B is shown. In this example, the control system 170 identifies a single ROI that represents the area within the image that corresponds to the location of the target 110 as it passes across the location $L_{TR2}$. The control system 170 analyzes this representation 2151 and determines the center moment of the ROI which can be referred to as the centroid. The center moment of the ROI can be designated as C(Xs, Ys, Zs).

For example, the centroid of the ROI along the Y direction could be given by this calculation:

$$\text{Centroid}(Y) = \frac{\sum m_i Y_i}{\sum m_i},$$

where mi is the value of the voltage or current at pixel i and Yi is the coordinate of pixel i and I is contained within the ROI. A similar calculation can be performed for the X and Z directions. Moreover, a similar analysis is performed for the representation 2141 captured by the camera 2135A.

Once the center moment of the ROI is set, the control system 170 defines the complete ROI be adjusting the number of pixel rows and column that are read out, the number of pixels that are read out depending on the frame rate of the recording device 2135A, 2135B. The ROI can be defined to match the volume of the target 110 that is being viewed.

Once the control system 170 identifies each ROI within the representation 2151, the control system 170 analyzes the ROI to determine the position P2 of the target 110 along the X, Y, and Z directions at the location $L_{TR2}$ within the chamber 175. For example, the control system 170 could determine a center moment (such as a centroid) C(Xs, Ys, Zs) of each ROI along each of the Xs, Ys, and Zs directions, and once each centroid C(Xs, Ys, Zs) is determined, the control system 170 can estimate the position P2 of the target 110 along the X, Y, and Z directions at the location $L_{TR2}$ of the chamber 175.

The position P2 of the target 110 along the Z direction of the chamber 175 is linearly correlated with the center of the ROI (the control) along the Zs direction (CZs) of the sensor because the Zs direction of the sensor of the recording device 2135A is parallel with the Z direction of the chamber 175. Thus, P2(Z)=Factor*CZs, where the Factor is a constant value that can depend on one or more of a size of a pixel and an optical magnification of the recording device 2135B or 2135A.

The position P2 of the target 110 along the X direction of the chamber 175 and the position P2 of the target 110 along the Y direction of the chamber 175 can be estimated using the centroid taken along the Xs-Ys direction (CXsYs). However, because the centroid along the Xs-Ys direction CXsYs lies in the Xs-Ys plane, it is not possible to determine the position P2 of the target 110 along the X direction of the chamber 175 and the position P2 of the target 110 along the Y direction of the chamber 175 without additional information.

In some implementations, the additional information that is used for determining the position P2 along both the X direction and the Y direction of the chamber 175 includes obtaining an image of the target 110 at the location $L_{TR2}$ at a second recording device (such as recording device 2135A) that has a sensor that is in a plane that is distinct from the plane of the sensor of the recording device 2135B. In other implementations the additional information that is used could be a time difference between the time $T_{2120}$ that the target 110 crosses the location $L_{TR1}$ and the time $T_{2130}$ that the target 110 crosses the location $L_{TR2}$.

Other additional information that is needed to transform the values of the centroid at the sensor plane of the recording device 2135B (or 2135A) to coordinate system of the chamber 175 includes the angle at which the recording device 2135B (or 2135A) is positioned relative to the X and Y directions of the chamber 175. This value is a known value and can be measured or determined when the recording devices 2135A, 2135B are set up in the chamber 175.

Once the positions P1(X,Y,Z) and P2(X,Y,Z) are determined, the control system 170 can derive the average velocity V(X,Y,Z) of the target 110 in the X, Y, and Z directions between the locations $L_{TR1}$ and $L_{TR2}$ as follows. The average velocity V(X) in the X direction is given by [P2(X)−P1(X)]/[T2130−T2120]; the average velocity V(Y) in the Y direction is given by [P2(Y)−P1(Y)]/[T2130−T2120]; and the average velocity V(Z) in the Z direction is given by [P2(Z)−P1(Z)]/[T2130−T2120].

In another exemplary implementation, the target 110 interacts with one or more of the diagnostic probes 2120, 2130 (or a third diagnostic probe not shown) at a third location $L_{TR3}$ that is distinct from the first location $L_{TR1}$ and the second location $L_{TR2}$. For example, the third location $L_{TR3}$ could be between the second location $L_{TR2}$ and the target space 120 along the trajectory TR. This additional interaction is recorded by the detection module 2135. The control system 170 can derive additional information about the moving properties of the target 110. For example, the control system 170 can derive the position P3(X,Y,Z) of the target 110 in the X, Y, and Z directions at the third location $L_{TR3}$. The control system 170 can also derive the acceleration A(X,Y,Z) of the target 110 along each of the X, Y, and Z directions, using the following three linear equations.

The first equation provides the relationship between the position of the target 110 along the X direction at the location $L_{TR3}$, P3(X), and the acceleration A23(X) of the target 110 along the X direction between the location $L_{TR2}$ and the location $L_{TR3}$ as follow:

$$P3(X)=P2(X)+V(X)*T_{23}+\tfrac{1}{2}A23(X)*T_{23}^2,$$

where $T_{23}$ is the time it takes the target 110 to travel from the location $L_{TR2}$ to the location $L_{TR3}$.

The second equation provides the relationship between the position of the target 110 along the Y direction at the location $L_{TR3}$, P3(Y), and the acceleration A23(Y) of the target 110 along the Y direction as follows:

$$P3(Y)=P2(Y)+V(Y)*T_{23}+\tfrac{1}{2}A23(Y)*T_{23}^2,$$

where $T_{23}$ is the time it takes the target 110 to travel from the location $L_{TR2}$ to the location $L_{TR3}$.

The third equation provides the relationship between the position of the target 110 along the Z direction at the location $L_{TR3}$ P3(Z), and the acceleration A23(Z) of the target 110 along the Z direction as follows:

$$P3(Z)=P2(Z)+V(Z)*T_{23}+\tfrac{1}{2}A23(Z)*T_{23}^2,$$

where $T_{23}$ is the time it takes the target 110 to travel from the location $L_{TR2}$ to the location $L_{TR3}$.

These three linear equations can be solved for A23(X), A23(Y), and A23(Z). This exemplary approach that uses linear equations can be extended to any number of locations L and positions P(X,Y,Z) to obtain additional data for determining the trajectory of the target 110.

Referring to FIG. 22, an exemplary control system 2270 is shown. The control system 2270 is configured to control the diagnostic system 2105, analyze information from the diagnostic system 2105, and determine how to modify aspects of the light source 100 based on this analysis. To this end, the control system 2270 includes a diagnostic sub-controller 2200 that includes a trigger source 2271, an analysis module 2272, and a decision module 2274. The output of the decision module 2274 is sent to one or more of the optical source sub-controller 2205, the beam delivery sub-controller 2210, the target delivery sub-controller 2215, and other sub-controller 2220 that can control other aspects of the light source 100. The output of the decision module 2274 can also be sent to a probe sub-controller 2212, which controls operation of the probe module 2100.

The trigger source 2271 can be any suitable source that provides one or more digital trigger signals to the diagnostic system 2105 in order to instruct one or more components of the diagnostic system 2105 to operate. In some implementations, the trigger source 2271 is associated with the release of the target 110 from the target delivery system 145. In other implementations, the trigger source 2271 is associated with an output from a photon detection device such as a photodiode placed along the trajectory TR to detect light scattered from the target 110 at a specific location. In such an implementation, the trigger source 2271 could include a discriminator that receives the output from the photodiode and outputs one or more digital time stamp signals. The trigger signal or signals from the trigger source 2271 are supplied to the detection module 2135 in order to instruct the one or more two-dimensional recording devices 2135A, 2135B when to record the two-dimensional representations. It is also possible for the trigger source 2271 to include a time delay signal that is added to each trigger signal before outputting to the detection module 2135, depending on the initiation of the trigger signal. For example, if the trigger source 2271 receives the output from a photodiode for a prior target 110P, then a time delay signal can be added to each trigger signal in order to operate the detection module 2135 to record light only when the current target 110 passes the diagnostic probes 2120, 2130.

Moreover, each trigger signal from the trigger source 2271 can have a length or duration that is variable or adjustable, depending on how long the recording devices 2135A, 2135B in the detection module 2135 should be recording the light produced from the interaction between the target 110 and the diagnostic probes 2120, 2130. Thus, the duration of each trigger signal from the trigger source 2271 acts as a shutter on the recording devices 2135A, 2135B.

Referring to FIG. 22, the analysis module 2271 receives the two-dimensional representations (the images) from the detection module 2135, and performs processing on the images. The analysis module 2272 includes various sub-modules that are configured to perform various types of analysis on the images. For example, the analysis module 2272 can include an input sub-module 2300 that receives the images from the detection module 2135 and converts the data into a format suitable for processing. The analysis module 2272 can include a pre-processing sub-module 2305 that prepare the images from the detection module 2135 (for example, removing background noise, filtering the images, and gain compensation). The analysis module 2272 can include an image sub-module 2310 that processes the image data such as identifying one or more regions of interest (ROIs) within an image, where each ROI corresponds to a location of the target 110 along its trajectory TR. The image sub-module 2310 also calculates an are of each ROI in the image and calculates a centroid of each region of interest. The analysis module 2272 can include an output sub-module 2315 that prepares the calculated data (such as the are and centroid of the ROIs) for output to the decision module 2274.

The decision module 2274 determines the one or more moving properties of the target 110 based on the output from the analysis module 2272, and determines whether any of the moving properties are outside an acceptable range. The decision module 2274 also determines whether other aspects of the light source 100 need to be adjusted if any of the moving properties are outside of an acceptable range.

Referring to FIG. 24, an exemplary diagnostic system 2405 is designed in a shadowgraph arrangement in which light illuminates the target 110 from one side of the target 110 while the imaging is performed at the other side of the target 110. The diagnostic system 2405 includes a probe module 2400 and a detection module 2435.

The probe module 2400 includes two or more light sources 2402, 2404, each light source 2402, 2404 configured to produce and direct a respective diagnostic light beam 2420, 2430 toward the trajectory TR. The diagnostic light beam 2420, 2430 in this example is expanded along a transverse direction to the respective axis A2 and A4 of the light beam 2420, 2430 and is collimated by use of a respective refractive optic 2412, 2414. The light sources 2402, 2404 can be continuous wave laser sources. In this example, each diagnostic light beam 2420, 2430 interacts with the target 110 as it travels along a probe distance $D_P$ of its trajectory TR. The probe distance $D_P$ has an extent that enables the detection module 2435 to record light produced from the interaction between the diagnostic light beam 2420, 2430 and the target 110 at a plurality of locations along the trajectory TR. Thus, in the example of FIG. 24, the interaction between the target 110 and each diagnostic light beam 2420, 2430 produces light 2140, 2150, respectively, that is recorded at two times t1, which corresponds to the target passing through location $L_{TR1}$, and t2, which corresponds to the target passing through location $L_{TR2}$. Although two recording locations are shown in FIG. 24, it is possible to accurately determine moving properties of the target 110 by recording at only one location or recording at three or more locations, depending on how much information about the moving properties of the target 110 is desired.

The detection module 2435 includes two or more two-dimensional recording devices 2435A and 2435B that are arranged on a side of the trajectory TR that is opposite to a side on which the light sources 2402, 2404 are arranged. In this way, the recording device 2435A is placed to record a two-dimensional representation 2441 of the light 2440 that is produced from the interaction between the diagnostic light beam 2420 and the target 110, and the recording device 2435B is placed to record a two-dimensional representation 2451 of the light 2450 that is produced from the interaction between the diagnostic light beam 2430 and the target 110. The recording device 2435A is positioned so that the normal to its sensor plane is at an angle αA relative to the X direction of the chamber 175 and the recording device 2435B is positioned so that the normal to its sensor plane is at an angle αB relative to the X direction of the chamber 175.

There are two ways to arrange the timing of the production of the diagnostic light beam 2420, 2430 and the recording of the representations 2441, 2451 at the respective recording devices 2435A, 2435B. In both ways, the recording device 2435A records the representation 2441 of the light 2440 and the recording device 2435B records the representation 2451 of the light 2450.

In a first way, the diagnostic light beam 2420, 2430 is continuously produced and directed to traverse the trajectory TR. The shutters on the recording devices 2435A, 2435B are configured so that the representations 2441, 2451 are only recorded at two times for a particular target; the first time occurs when the target 110 passes the location $L_{TR1}$ (at which point the shutters are briefly opened) and the second time occurs when the target 110 passes the location $L_{TR2}$ (at which point the shutters are briefly opened).

In a second way, the diagnostic light beam 2420, 2430 is pulsed to produce light at two times; first when the target 110 passes the location $L_{TR1}$ and second when the target passes the location $L_{TR2}$. The shutters on the recording devices 2435A, 2435B are open long enough so that the recording device 2435A records the representation 2441, which includes the light 2440 produced at both times from the pulsed diagnostic beam 2420 as it interacts with the target 110 at locations $L_{TR1}$ and $L_{TR2}$, and the recording device 2435B records the representation 2451, which includes the light 2450 produced at both times from the pulsed diagnostic beam 2430 as it interacts with the target 110 at both locations $L_{TR1}$ and $L_{TR2}$.

The presence of the target 110 as it passes across location $L_{TR1}$ shows up in the representation 2441 as a shadow 2442 formed by the target 110 obscuring the diagnostic light beam 2420. The presence of the target 110 as it passes across the location $L_{TR1}$ also shows up in the representation 2451 as a shadow 2452 formed by the target 110 obscuring the diagnostic light beam 2430. Similarly, the presence of the target 110 as it passes across location $L_{TR2}$ shows up in the representation 2441 as a shadow 2443 formed by the target 110 obscuring the diagnostic light beam 2420. The presence of the target 110 as it passes across the location $L_{TR2}$ also shows up in the representation 2451 as a shadow 2453 formed by the target 110 obscuring the diagnostic light beam 2430.

Referring to FIG. 25, an exemplary diagnostic system 2505 is designed in a scatter imaging arrangement in which imaging is performed at a side of the target 110 that is the same side at which light illuminates the target 110. The diagnostic system 2505 includes a probe module 2500 and a detection module 2535.

The probe module 2500 includes a light source 2502 that is configured to produce and direct a diagnostic light beam 2520 toward the trajectory TR. The diagnostic light beam 2520 is expanded along its transverse direction to its axis and is collimated by use of a refractive optic 2512. The light source 2502 can be a continuous wave laser. The diagnostic light beam 2520 interacts with the target 110 as it travels along a probe distance $D_P$ of its trajectory TR. The probe distance $D_P$ has an extent that enables the detection module 2535 to record light 2540A, 2540B, 2550A, 2550B produced from the interaction between the diagnostic light beam 2520 and the target 110 at a plurality of locations $L_{TR1}$ and $L_{TR2}$ that correspond to time t1 and t2, respectively, along the trajectory TR. Although two recording locations are shown in FIG. 25, it is possible to accurately determine moving properties of the target 110 by recording at only one location or recording at three or more locations, depending on how much information about the moving properties of the target 110 is desired.

The detection module 2535 includes two or more two-dimensional recording devices 2535A and 2535B that are arranged on the same side as the light source 2502. In this way, the recording device 2535A is place to record a two-dimensional representation 2541 of the light 2540A produced from the interaction between the diagnostic light beam 2520 and the target 110 at the location $L_{TR1}$ and the light 2540B produced from the interaction between the diagnostic light beam 2520 and the target 110 at the location $L_{TR2}$. Additionally, the recording device 2535B is placed to record a two-dimensional representation 2551 of the light 2550A produced from the interaction between the diagnostic light beam 2520 and the target 110 at the location $L_{TR1}$ and the light 2550B produced from the interaction between the diagnostic light beam 2520 and the target 110 at the location $L_{TR2}$.

Similar to the discussion above, there are two primary ways to time the recording and imaging performed by the diagnostic system 2505. In a first way, the light beam 2520 is continuously produced and directed to traverse the trajectory TR. The shutters on the recording devices 2535A, 2535B are configured so that the representations 2541, 2551 are only recorded at two times for a particular targets, the first time occurs at t1 when the target 110 passes the location $L_{TR1}$ (at which point the shutters are briefly opened to acquire data) and the second time occurs at t2 when the target 110 passes the location $L_{TR2}$ (at which point the shutters are briefly opened again to acquire data). If more locations are being recorded then the shutters would be configured to open for those additional locations. In a second way, the light beam 2520 is pulsed to produce light at the two times t1 and t2 and the shutters on the recording devices 2535A, 2535B are open long enough to cover the entire probe distance $D_P$ and thus capture the interactions at both pulses.

The presence of the target 110 as it passes across location $L_{TR1}$ shows up in the representation 2551 as a bright spot 2552 formed from the light beam 2520 reflecting or scattering off the target 110 toward the recording device 2535B. The presence of the target 110 as it passes across location $L_{TR1}$ also shows up in the representation 2541 as a bright spot 2542 formed from the light beam 2520 reflecting or scattering off the target 110 toward the recording device 2535A. The presence of the target 110 as it passes across location $L_{TR2}$ shows up in the representation 2551 as a bright spot 2553 formed from the light beam 2520 reflecting or scattering off the target 110 toward the recording device 2535B. The presence of the target 110 as it passes across location $L_{TR2}$ also shows up in the representation 2541 as a bright spot 2543 formed from the light beam 2520 reflecting or scattering off the target 110 toward the recording device 2535A.

Referring to FIG. 26, in other implementations, the diagnostic system 2605 is designed so that the diagnostic light beams 2620, 2625, 2630 are focused on or near the trajectory TR. The diagnostic system 2605 includes a probe module 2600 that includes a single light source 2602 that produces a light beam 2610. The diagnostic system 2605 produces the diagnostic light beams 2620, 2625, 2630 that serve as diagnostic probes.

To this end, the probe module 2600 also includes a splitting optic 2615 and a refractive optic 2617 such as a focusing lens. The light beam 2610 is directed through the splitting optic 2615, which splits the light beam 2610 into a plurality of light beams, which travel along distinct directions and are directed through the refractive optic 2617 to produce the diagnostic light beams 2620, 2625, 2630. The diagnostic light beams 2620, 2625, 2630 are directed toward the trajectory TR of the current target 110. The splitting optic 2615 can split the light beam 110 so that the diagnostic light beams 2620, 2625, 2630 are separated by a set distance (for example, 0.65 mm) at the trajectory TR. Moreover, the refractive optic 2617 can ensure that the foci (or beam waist) of each of the diagnostic light beams 2620, 2625, 2630 overlaps the trajectory TR.

Because of the design of the splitting optic 2615 and the refractive optic 2617, the diagnostic light beams 2620, 2625, 2630 are directed so that they fan out toward the trajectory TR and intersect the trajectory TR at different and distinct angles. For example, the diagnostic light beam 2625 can intersect the trajectory TR at a right or approximately right angle to the –X direction. The diagnostic light beam 2620 can intersect the trajectory TR at an angle that is less than 90° relative to the –X direction and the diagnostic light beam 2630 can intersect the trajectory TR at an angle that is greater than 90° relative to the –X direction. Each of the diagnostic light beams 2620, 2625, 2630 can be Gaussian beams so that the transverse profile of the optical intensity of each diagnostic light beam 2620, 2625, 2630 can be described with a Gaussian function. The beam waist of each diagnostic light beam 2620, 2625, 2630 can be configured to overlap at the trajectory TR or the –X direction.

In some implementations, the splitting optic 2615 is a diffractive optic such as a rectangular or binary phase diffraction grating that produces discrete and spatially spaced replicas of the input light beam 2610. The separation between the diagnostic light beams 2620, 2625, 2630 can be adjusted or customized depending on the rate at which the targets are released from the target delivery system 145 as well as the size and material of the targets. In some implementations, the spitting optic 2615 is a diffractive optic such as a binary phase diffractions grating.

It is also possible to produce more than three diagnostic light beams 2620, 2625, 2630 with the splitting optic 2615. By producing so many diagnostic light beams, it is possible to record or detect the position of the current target 110 through the extended target region 115, thus allowing for a more accurate determination of the velocity and acceleration of the current target 110 and also providing a tool for understanding the dynamics of the current target 110 as a result of the plasma pushback forces 125.

While a diffractive optic is described above, it is alternatively possible to use other kinds of optics as the splitting optic 2615. For example, the splitting optic 2615 can alternatively or additionally include any one or more of a birefringent crystal, an intensity beam splitter, a polarization beam splitter, or a dichroic beam splitter.

The diagnostic system 2605 also includes a detection module 2635 that receives the light 2640, 2645, 2650 reflected from the current target 110 as it passes across the respective diagnostic light beams 2620, 2625, 2630. The detection module 2635 includes an imaging lens 2637 and a two-dimensional recording device 2636. The imaging lens 2637 captures as much of the light 2640, 2645, 2650 as possible and focuses it to an image plane of the image recording device 2636.

The image recording device 2636 is a camera that captures a two-dimensional representation (image) of each reflected light 2640, 2645, 2650. The camera 2636 outputs the set of two-dimensional images to the control system 2270, which uses the set of two-dimensional images to determine moving properties of the target 110 along not only the X direction but also the Y and Z directions, as discussed above. The camera 2636 should be a "high speed" camera in that it is fast enough to detect, record, and output the two-dimensional image of each reflected light 2640, 2645, 2650 for a particular target 110 prior to the next target entering the extended target region 115.

The camera 2636 captures each image of the reflected light 2640, 2645, 26450 and outputs the set of images to the control system 2270, which analyzes the image set and calculates a centroid of each ROI within the images so as to determine a position of the target 110 along each of the X, Y, and Z directions of the chamber 175, as discussed above.

Referring to FIG. 27, a diagnostic system 2705 is designed to detect both a one-dimensional characteristic or value (such as the number of photons, as discussed above) and two-dimensional representations of the light produced from the interaction between the diagnostic probe and the target 110. To this end, the diagnostic system 2705 is designed similarly to the diagnostic system 2605 except that its detection module 2735 is designed to split the light 2740, 2745, 2750 so that a portion of this light impinges upon a photodiode 2738 and a portion of the light impinges upon the two-dimensional recording device 2736. In this way, the photodiode 2738 captures a one-dimensional aspect of each reflected light 2740, 2745, 2750; for example, the photodiode 2738 captures the number of photons and outputs a voltage signal that corresponds to the number of photons. The photodiode 2738 operates similarly to the photodiode of the detection module 535 described above. The two-dimensional recording device 2736 operates similarly to the recording device 2636 described above.

The control system 170 connected to the diagnostic system 2705 includes a detection sub-controller 600 or 800 such as shown in FIGS. 6 and 8 for receiving and processing the pulses from the photodiode 2738 to determine the time stamps and therefore the time differences for use in calculating the moving properties. The control system 170 connected to the diagnostic system 2705 also includes a diagnostic sub-controller 2200 such as shown in FIG. 22 for receiving and processing the images output from the two-dimensional recording device 2736. The control system 170 can determine the position P of the target 110 along the X direction of the chamber 175 at various locations along the trajectory based on the data obtained from the photodiode 2738. The control system 170 can determine the position P of the target 110 along the Y and Z directions of the chamber 175 based on the data obtained from the two-dimensional recording device 2736 in a manner similar to that discussed above with respect to FIGS. 21A and 21B.

Referring to FIG. 28, a procedure 2800 is performed by the EUV light source 100 (under control of the control system 2270) for compensating for plasma pushback forces 125 on the target 110. The procedure 2800 includes releasing a plurality of targets 110 along their respective a trajectory trajectories toward the target space 120 (2805). The target space 120 is positioned to receive the plurality of radiation pulses 135. Prior to the target 110 reaching the target space 120 and after a prior and adjacent target 110P has interacted with a prior radiation pulse 135P in the target space 120, a plurality of diagnostic light probes (such as probes 2120, 2130) are interacted with the target 110 at diagnostic locations (such as locations $L_{TR1}$, $L_{TR2}$) along the trajectory TR of the target 110 (2810). Under control of the control system 2270, the detection module 2135 detects a plurality of two-dimensional representations (such as two-dimensional images) of light (such as light 2140, 2150) produced due to the interactions between the target 110 and the diagnostic light probes (2815). The control system 2270 analyzes the detected two-dimensional representations (for example, the images) (2820). The control system 2270 (via the decision module 2274) determines one or more moving properties of the target 110 based on the analysis of the detected two-dimensional representations (2825).

The plurality of diagnostic light probes that interact with the target 110 at the diagnostic locations (2810) can be any of the diagnostic light probes described herein, such as, for example, the diagnostic light probes 2420, 2430 of FIG. 24, the diagnostic light probe 2520 of FIG. 25, or the diagnostic light probes 2620, 2625, 2630 of FIG. 26.

The control system 2270 analyzes the two-dimensional images as follows. For example, the input sub-module 2300) can convert the data of the images into a format suitable for processing. The pre-processing sub-module 2305 prepares the images by, for example, removing background noise, filtering the images, and amplifying the signals. The image sub-module 2310 determines one or more regions of interest (ROIs) within each image, where each ROI corresponds to a location of the target 110 along its trajectory TR. The image sub-module 2310 also calculates an encircled energy of each ROI in the image and calculates a centroid of each region of interest. The output sub-module 2315 prepares the calculated data (such as the area and centroid of the ROIs) for output to the decision module 2274.

The decision module 2274 also determines whether any of the moving properties are outside an acceptable range (2830) as well as determine whether aspects of the light source 100 need to be adjusted if any of the moving properties are outside of an acceptable range (2835). For example, the decision module 2274 may determine that a timing of the radiation pulse 135 or a direction at which the radiation pulse 135 travels needs to be adjusted so that the radiation pulse 135 and the present target 110' efficiently interact with each other (2840). The decision module 2274 may determine that an aspect of the target delivery system 145 needs to be adjusted to compensate for some long term dynamic issue with the targets 110. After adjustments are made (such as at 2840), the radiation pulse 135 is directed toward the present target 110' while the present target 110' is in the target space 120 to thereby interact the radiation pulse 135 with the present target 110' (2845).

The one or more moving properties of the target can be determined for any of the system coordinates; for example, the X, Y, or Z directions of the chamber 175. The moving properties of the target 110 that are determined include one or more of a position, a velocity, and an acceleration of the target along any of the X, Y, or Z directions of the chamber 175, as discussed above.

The detected two-dimensional image can be analyzed by identifying one or more regions of interest within the image, such regions of interest corresponding to a location of the target 110 within the image, and calculating a central region or moment (centroid) for each identified region of interest.

The two-dimensional representations of light can be detected and analyzed and the one or more moving properties of the target can be determined for a specific target prior to that specific target entering the target space 120. Moreover, in some implementations, the target 110 interacts with the plurality of diagnostic probes 2140, 2150 while the target 110 is being influenced by plasma pushback forces 125.

If a photodiode 2738 is also implemented in the diagnostic system 2705 then the procedure 2800 can also include detecting a time associated with each interaction between the target and a diagnostic probe: analyzing the detected times; and determining one or more moving properties of the target along the axial direction (X direction) based on the analysis of the detected times.

A photodiode 2738 (used in conjunction with the two-dimensional recording device 2736) can be used for the purposes of time stamping and therefore could be used to provide a trigger source 2271 of the control system 2270 for controlling timing aspects of the diagnostic system 2705. For example, the time stamps could be used to trigger one or more of the detection module 2735 and the probe module 2700.

Other implementations are within the scope of the following claims.

In other implementations, the moving property of the current target 110 that is detected is a speed of the current target 110, a direction or trajectory of the current target 110, and an acceleration of the current target 110.

In some implementations, the diagnostic system 105 is arranged to provide the one or more diagnostic probes 107 so that they interact with the target 110 in the first region 165 or partially within the first region 165. For example, the diagnostic system 2105 can be arranged in this manner.

What is claimed is:
1. An apparatus comprising:
a diagnostic system configured to diagnostically interact with a current target moving toward a target space prior to the current target entering the target space, the target space being within a chamber and positioned to receive a plurality of radiation pulses, each radiation pulse capable of interacting with a target in the target space to cause at least part of that target to be converted into plasma that emits light;

a diagnostic detection module configured to detect light that is produced from an interaction between the diagnostic system and the current target prior to the current target entering the target space and after an immediately preceding target has interacted with a prior radiation pulse in the target space, wherein the diagnostic detection module includes two or more detection apparatuses; and a control system in communication with the diagnostic detection module and configured to:
receive output from the diagnostic detection module;
analyze the received output; and
determine one or more moving properties of the current target based on the analysis.

2. The apparatus of claim 1, wherein the control system is configured to determine one or more moving properties of the current target by determining one or more of a speed, a velocity, and an acceleration of the current target.

3. The apparatus of claim 1, wherein the control system is in communication with a light source that produces the radiation pulses, and the control system is configured to send a signal to the light source to thereby adjust one or more characteristics of a radiation pulse directed to the target space based on the determination of the one or more moving properties of the current target.

4. The apparatus of claim 1, further comprising interacting a radiation pulse with a present target in the target space, the present target being either the current target that has entered the target space or another target that has entered the target space, wherein the other target enters the target space after the current target enters the target space.

5. The apparatus of claim 1, wherein the diagnostic system comprises two or more diagnostic probes that diagnostically interact with the current target prior to the current target entering the target space.

6. The apparatus of claim 5, wherein each diagnostic probe comprises a diagnostic light beam that is directed toward the current target such that each diagnostic light beam interacts with the current target at a distinct location and time.

7. The apparatus of claim 6, wherein the diagnostic light beams each have a wavelength that is distinct from a wavelength of the radiation pulses.

8. The apparatus of claim 5, wherein the diagnostic system includes:
a single light source that produces a light beam that is split into each of the diagnostic light beams, or
two or more light sources, each producing a respective diagnostic light beam.

9. The apparatus of claim 1, wherein each detection apparatus is configured to detect light that is scattered off a surface of the current target due to the interaction between the diagnostic system and the current target.

10. The apparatus of claim 1, wherein a detection apparatus comprises a camera, a high-speed camera, a charged coupled device, an infrared camera, a complementary metal-oxide semiconductor, or a photodiode.

11. The apparatus of claim 1, wherein the plasma emits extreme ultraviolet (EUV) light.

12. An apparatus comprising:
a diagnostic system configured to diagnostically interact with a current target moving toward a target space, the target space being within a chamber and positioned to receive a plurality of radiation pulses, each radiation pulse capable of interacting with a target in the target space to cause at least part of that target to be converted into plasma that emits light, wherein the diagnostic interaction occurs prior to the current target entering the target space and after an immediately preceding target has interacted with a prior radiation pulse in the target space;

a diagnostic detection module configured to detect light produced from an interaction between the diagnostic system and the current target, wherein the diagnostic detection module includes two or more detection apparatuses; and a control system in communication with the diagnostic detection module and configured to:
receive output from the diagnostic detection module;
analyze the received output; and
determine one or more moving properties of the current target based on the analysis.

13. The apparatus of claim 12, wherein the control system is configured to determine one or more moving properties of the current target by determining one or more of a speed, a velocity, and an acceleration of the current target.

14. The apparatus of claim 12, wherein each detection apparatus is configured to detect light that is scattered off a surface of the current target due to the interaction between the diagnostic system and the current target.

15. The apparatus of claim 12, wherein the detection apparatus comprises a camera, a high-speed camera, a charged coupled device, an infrared camera, a complementary metal-oxide semiconductor, or a photodiode.

16. A method of measuring a moving property of a target as it travels toward a target space, the target including a component that emits light when converted to a plasma, the method comprising:
interacting a diagnostic probe system with a current target moving toward the target space, the target space being within a chamber and positioned to receive a plurality of radiation pulses, each radiation pulse interacting with a target in the target space to cause at least part of that target to be converted into plasma that emits light, wherein interacting occurs prior to the current target entering the target space and after an immediately preceding target has interacted with a prior radiation pulse in the target space;
detecting first and second light that is produced at least in part from the interaction between the diagnostic probe system and the current target prior to the current target entering the target space and after the immediately preceding target has interacted with the prior radiation pulse in the target space; and
determining one or more moving properties of the current target based on an analysis of the detected first and second light.

17. The method of claim 16, wherein detecting first light comprises detecting light that is scattered from the current target.

18. The method of claim 16, wherein determining one or more moving properties comprises determining one or more of a predicted time that the current target will be in the target space, a speed of the current target, a direction of the current target, a velocity of the current target, and an acceleration of the current target.

19. The method of claim 16, wherein determining one or more moving properties of the current target comprises determining one or more moving properties of the current target along each dimension of a three dimensional coordinate system.

20. The method of claim 16, further comprising adjusting one or more characteristics of a radiation pulse directed toward the target space based on the determination of the one or more moving properties.

21. The method of claim 20, wherein adjusting one or more characteristics of the radiation pulse comprises adjusting one or more of a timing of a release of a radiation pulse and a direction at which the radiation pulse travels.

22. The method of claim 20, wherein adjusting one or more characteristics of a radiation pulse directed toward the target space based on the determination of the one or more moving properties comprises determining whether one or more moving properties of the target are outside an acceptable range.

23. The method of claim 16, wherein interacting the current target with the diagnostic probe system occurs while the current target is being influenced at least in part by plasma pushback forces from plasma produced from an interaction between a prior radiation pulse and a prior target in the target space.

* * * * *